US012497315B2

(12) United States Patent
Aukema et al.

(10) Patent No.: US 12,497,315 B2
(45) Date of Patent: Dec. 16, 2025

(54) METHODS AND COMPOSITIONS FOR REMEDIATING CYANURIC ACID IN AQUEOUS LIQUIDS

(71) Applicant: DANISCO US INC., Palo Alto, CA (US)

(72) Inventors: Kelly Gardner Aukema, Mendota Heights, MN (US); Rajdeep S. Dhaliwal, Oakland, CA (US); Feng Guo, Los Altos, CA (US); Meng Hong Heng, Belmont, CA (US); Katherine Hoffmann, Mountain View, CA (US); Jacob Andrew Latone, San Jose, CA (US); Lawrence Philip Wackett, St. Paul, MN (US); Gregory M. Whited, Palo Alto, CA (US)

(73) Assignees: Danisco US Inc., Palo Alto, CA (US); Regent of the University of Minnesota, Minneapolis, MN (US)

( * ) Notice: Subject to any disclaimer, the term of this patent is extended or adjusted under 35 U.S.C. 154(b) by 528 days.

(21) Appl. No.: 17/770,270

(22) PCT Filed: Oct. 14, 2020

(86) PCT No.: PCT/US2020/055481
§ 371 (c)(1),
(2) Date: Apr. 19, 2022

(87) PCT Pub. No.: WO2021/086605
PCT Pub. Date: May 6, 2021

(65) Prior Publication Data
US 2022/0411301 A1 Dec. 29, 2022

Related U.S. Application Data

(60) Provisional application No. 62/926,661, filed on Oct. 28, 2019.

(51) Int. Cl.
  C02F 3/34 (2023.01)
  C02F 1/70 (2023.01)
  (Continued)

(52) U.S. Cl.
  CPC ............... *C02F 3/342* (2013.01); *C02F 1/70* (2013.01); *C12N 15/52* (2013.01);
  (Continued)

(58) Field of Classification Search
  None
  See application file for complete search history.

(56) References Cited

U.S. PATENT DOCUMENTS 5,004,549 A * 4/1991 Wood .................. C11D 3/3953
                                                     210/764
2013/0186837 A1* 7/2013 Somesla .................. C02F 1/70
                                                     252/176
(Continued)

FOREIGN PATENT DOCUMENTS

WO   2007107981 A1   9/2007
WO   2016141026 A1   9/2016
WO   2017021966 A1   2/2017

OTHER PUBLICATIONS

Yeom et al. (Applied and Environmental Microbiology, 2015, 81, 6660-6668). (Year: 2015).*
(Continued)

*Primary Examiner* — Clare M Perrin

(57) ABSTRACT

The present disclosure is generally related to the fields of biology, inorganic chemistry, organic chemistry, molecular biology, enzymology, chlorinated water treatment processes and the like. More particularly, certain embodiments are related to reducing cyanuric acid concentrations in aqueous
(Continued)

liquids, such as chlorinated swimming pool water, chlorinated hot tub water and the like.

10 Claims, 21 Drawing Sheets

Specification includes a Sequence Listing.

(51) Int. Cl.
  *C12N 15/52* (2006.01)
  *C02F 101/18* (2006.01)
  *C02F 103/42* (2006.01)
(52) U.S. Cl.
  CPC .. *C12Y 305/02015* (2013.01); *C02F 2101/18* (2013.01); *C02F 2103/42* (2013.01); *C02F 2305/00* (2013.01)

(56) References Cited

U.S. PATENT DOCUMENTS

2018/0044655 A1* 2/2018 Wackett ............... C12N 1/20
2018/0257963 A1* 9/2018 Harley ........... C12Y 305/01054

OTHER PUBLICATIONS

International Search Report from PCT Application No. PCT/US2020/055481 dated Feb. 3, 2021, 4 pages.
Written Opinion from PCT Application No. PCT/US2020/055481 dated Feb. 3, 2021, 6 pages.
International Preliminary Report on Patentability from PCT/US2020/055481 dated May 3, 2022, 7 pages.
Seffernick et al., "Defining Sequence Space and Reaction Products within the Cyanuric Acid Hydrolase (AtzD) Barbiturase Protein Family", Journal of Bacteriology, vol. 194, No. 17, Sep. 2012, pp. 4579-5488.

* cited by examiner

H₂O +

CONSERVED CYANURIC ACID HYDROLASE AMINO ACID SEQUENCE (SEQ ID NO: 15)

Xaa Xaa Ser Gly Gly Xaa Glu Xaa Gln Gly Pro Xaa Gly Gly Xaa
 1               5                  10                 15

FIG. 10

PROTEIN SEQUENCES DEMONSTRATED TO HAVE CAH ACTIVITY COMPRISE AN EXACT MATCH WITH CONSENSUS SEQ ID NO: 15

>WP_056911810.1 ring-opening amidohydrolase [Pseudolabrys sp. Root1462]
MPIAKVVHRISASSPNDVSGLEAAIASGRIDPKGVIAVLGKTEGNGLVNDFSRGLATTALTLLFERHLPQAEAAQICLVMSGGTEGGMAPHWIVFERGK
GEGGRSPALAIGRAHTLQLPYEQLGRLGEVDQVAAGVRAAMEDAGIADPADVHFVQIKCPLLTAQRIAEAEARGAAVATRDTLKSMSLSRAASALGA
AVALGEIDRAAITEAQIGSDWSLWSGRASTSAGIELVNHEIVVLGMSKDWSGPLAIDHAVMRDGIDIEPVRAALQRLGLGAAGQLDPAQRNKMVALLA
KAEASHDGRLRGHRHTMLDDSDIASTRHARGFVCGALAGLVGHAEIYVSGGAEHQGPDGGGPVAVIVDRG >YP_430955.1 barbiturase [Moorella thermoacetica ATCC 39073]
MQKVEVFRIPTASPDDISGLATLIDSGKINPAEIVAILGKTEGNGCVNDFTRGFATQSLAMYLAEKLGISREEVVKKVAFIMSGGTEGVMTPHITVFVRK
DVQEPAKPGKRLAVGVAFTRDFLPEELGRMEQVNEVARAVKEAMKDAQIDDPRDVHFVQIKCPLLTAERIEDAKRRGKDVVVNDTYKSMAYSRGAS
ALGVALALGEISADKISNEAICHDWNLYSSVASTSAGVELLNDEIIVVGNSTNSASDLVIGHSVMKDAIDADAVRAALKDAGLKFDCCPPAEELAKIVNV
LAKAEAASSGTVRGRRNTMLDDSDINHTRSARAVVNAVIASVVGDPMVYVSGGAEHQGPDGGGPIAVIARV >WP_011090016.1 ring-opening amidohydrolase [Bradyrhizobium diazoefficiens]
MRTTSVGVFKIVTKGPGDVSGLMAMIGSGAIDPKSILAVLGKTEGNGGVNDFTREYAVAALCTALAPQLGLSPEEVEQRIAFVMSGGTEGVLSPHITV
FTRREVERRPAGLSGKRLSIGMAHTRDFLPEELGRAAQIAETAAAVKAAMADAGIADPADVHFVQIKCPLLTSDRVEAASARGNKTATTSAYGSMAY
SRGASALGVAVALGETGSDISDGDVLRRYDLFSKVASTSAGIELMHNVVILGNSAASASEFEIGHAVMNDAIDAAAVTSALKCVGLGVAPQAEAGRE
LVNIFAKAEASPDGSVRGFRHTMLEDTDISSTRHARAAVGGLIAGLAGTGAVYVSGGAEHQGPAGGGPVAVIARLSD >WP_031302833.1 TrzD
MQAQVFRVPMSNPADVSGVAKLIDEGVIRAEEVVCVLGKTEGNGCVNDFTRGYTTLAFKVYFSEKLGVSRQEVGERIAFIMSGGTEGVMAPHCTIFT
VQKTDNKQKTAAEGKRLAVQQIFTREFLPEEIGRMPQVTETADAVRRAMREAGIADASDVHFVQVKCPLLTAGRMHDAVERGHTVATEDTYESMGY
SRGASALGIALALGEVEKANLSDEVITADYSLYSSVASTSAGIELMNNEIIVMGNSRAWGGDLVIGHAEMKDAIDGAAVRQALRDVGCCENDLPTVDE
LGRVVNVFAKAEASPDGEVRNRRHTMLDDSDINSTRHARAVVNAVIASIVGDPMVYVSGGSEHQGPAGGGPVAVIARTA >WP_012172412.1 ring-opening amidohydrolase [Azorhizobium caulinodans]
MPIAKVVHRIATASPDDVSGLAAAIATGAIAPAGILAIFGKTEGNGCVNDFSRGFAVQSLQMLLRGHMGAAADEVCLVMSGGTEGGMSPHFLVFERAE
GNAPEAAPALAIGRAHTPDLPFEALGRMGQVRMVAQAVRRAMAAAGITDPEDVHFVQVKCPLLTAMRVKEAEARGATTATSDTLKSMGLSRGASAL
GIALALGEVAEDALSDAVICADYGLWSARASCSSGIELLGHEIVVLGMSEGWSGPLAIAHGVMADAIDVTPVKAALSALGAEAGEATIVLAKAEPSRSG
RIRGKRHTMLDDSDISPTRHARAFVAGALAGVVGHTEIYVSGGEHQGPDGGGPVAVIAARTMG

FIG. 11

PROTEIN SEQUENCES DEMONSTRATED TO HAVE CAH ACTIVITY COMPRISE AN EXACT MATCH WITH CONSENSUS SEQ ID NO: 15

>WP_011117191.1 ring-opening amidohydrolase [Pseudomonas sp. ADP]
MYHIDVFRIPCHSPGDTSGLEDLIETGRVAPADIVAVMGKTEGNGCVNDYTREYATAMLAACLGRHLQLPPHEVEKRVAFVMSGGTEGVLSPHHTV
FARRPAIDAHRPAGKRLTLGIAFTRDFLPEEIGRHAQITETAGAVKRAMRDAGIASIDDLHFVQVKCPLLTPAKIASARSRGCAPVTTDTYESMGYSRG
ASALGIALATEEVPSSMLVDESVLNDWSLSSSLASASAGIELEHNVVIAIGMSEQATSELVIAHGVMSDAIDAASVRRTIESLGIRSDDEMDRIVNVFAK
AEASPDGVVRGMRHTMLSDSDINSTRHARAVTGAAIASVVGHGMVYVSGGAEHQGPAGGGPFAVIARA >WP_007596559.1 ring-opening amidohydrolase [Bradyrhizobium sp. WSM1253]
MRTTSVGVFKVATKGPGDVSGLMAMIGSGAIDPASILAILGKTEGNGGVNDFTREYAVAALCTALAPQLGLSPQEVEQRIAFVMSGGTEGVLSPHITV
FTRRDVLQRPAGISGKRLSIGMAHTRDFLPEELGRSAQITETAKAVKAAMADAGIADPADVHFVQIKCPLLTSERVEAANARGHKTATTSAYSSMAYS
RGASALGVAVALGEIATDLRDDVLRRYDLFSNVASTSSGIELTHNVVIVLGNSMSSTSEFEIGHAVMSDAIDAAAVLAALESVGLCAAPQTTTGRELV
NIFAKAEASPDGSVRGFRHTMLEDTDISSTRHARAAVGGLIAGLAGTGAVYVSGGAEHQGPAGGGPVAVIAKLSD >WP_040435831.1 ring-opening amidohydrolase [Melaminivora alkalimesophila]
MYKVDVYRLPMGSPDDLSALVALLDNGSIDPQNIIAVLAKTEGNGCVNDFTRGFTTLALKVLLSERLGLTREEVGKRVALVMSGGTEGVMTPHMNVF
VRQKVSDRGANPNGEKRLVAGIAFTRDFLPEEQGRMAQVLEVARAVREAMADAGITDPADVHFVQIKCPLLTADRIEDAHRRGQTVAVHDTYKSMG
YNRGASALGAAVALGQIKESDLSDEMICNDWSIYSDVASTSAGVEILNCEIIVMGNSTESASELVIGHDVMKDGIDMQAVLRAMKAAGLKFNELPGEA
ELAKIVNVLAKAEARSTGEVRGRRNTMLDDSDINHTRSARAVVNAVIASITGDPMVYVSGGAEHQGPDGGGPVAVIARA >AEX65082.1 cyanuric acid hydrolase (plasmid) [Rhodococcus sp. Mel]
MSSTALYTVPTAGPDDVAALKALDGHSASDILAVIGKTEGNGCVNDFSRTLSAAVMHPLLEDSAITVFSGGAEGVISPHVNIFVRDERQYSGHPRGLV
TAVGRTRVIGPEEIGRPAQVDAVHETVVALLTELGVGPDDVHLVLIKCPLLSSDAIAGVHRRGLRPVTTDTYESMSRSRAASALGIAMALKECDRDRA
LLALEGRDDVWSARASASSGAELDDCHILVVAESDAAANPLRAAHTAMRDALDIQALTEVFDRIAAEGGTVRQIFAKAEADPSGAIRGYRHTMLTDS
DVNATRHARAAVGGLIAALHGNGAVYVSGGAEHQGPSGGGSVTVIYDVPATANATGEASR >comaS4_02962, Cyanuric acid hydrolase, Comamonas CAH-2, (Wackett lab isolate)
MHHVDVIRIPSRSPGDISGLEELIASGRVAARDIVAVMGKTEGNGCVNDYTREYATSMLAACLGRHLELEPSEVEKRVAFVMSGGTEGVLSPHQTVF
TRRPAQGVPVAGSKRLTLGIAFTRDFLPEEIGRRAQIEETAEAVVRAMRDGGIASIDDLHFVQVKCPLLTPSKIAAARERGCEPVTADTYESMGYSRG
ATALGIALATEEAASSALVDDAVLHDWSLSSAVASVSAGIELEHNVVIAIGMSAQATSDLVIAHDVMADAIDAEAVRRTMQSLGLQGNEGLDRIVNVFC
KAEASPDGVVRGMRHTMLGDSDINSTRHARAVTGAVVASVVGHGMVYISGGAEHQGPAGGGPIAVIARA >Herb_03844, Cyanuric acid hydrolase, Herbaspirillum CAH-3, (Wackett lab isolate)
MTVHQVDLFRIQMRGPGDISGLHALVGEGRIDPKDIVAILGKTEGNGGVNDFTREYASKTFAAALAEYLGCTRDEVESRVALVMSGGTEGVLSPHAT
VFVRRAVAKKESGGKRLAIGVAHTRDFLPEELGTQKQIAETAQAVREAMSDAGIADVSDVHFVQIKCPLLTAERVEDAKRGHATVTADSYASMAYS
RGASALGVALGLGEIDEAAALESAVLSNWSHYSSVASTSAGVELFCNAIVVMGNSASAAGDNIIGHSVMRDAIDLRGVLEAFHSVGFDAASVLSGEA
GARVLNVFAKAEPSPEGLIRGMRHTMLDDSDINCTRHARAAVGGLVASVAGCGSVYISGGAEHQGPPGGGPIAVIAKSIAMS FIG. 11 (Continued)

PROTEIN SEQUENCES DEMONSTRATED NOT HAVING CAH ACTIVITY DO NOT COMPRISE AN EXACT MATCH WITH CONSENSUS
SEQ ID NO: 15

>AEX65050.1 putative cyanuric acid hydrolase (plasmid) [Rhodococcus sp. Mel]
MTSPEDTAGVEAALAAEGFSPTDVRAVMCMTESDGFGRGYASLAFAHAFAPALGCPPEDVAQQIPMIMIGGCSGLVTPYAAVFVDDPASSWVTDG
SGGGLSIGVTTTATLNPLDVGTPAMVDAVADAVRSAMAAAGIDKVADVHNVQIKTPWPSSAALLDGPLSGLDAGSVGAMARAAGALGVAVALGEVS
RADITADVFLRDPNLRSDVASVSAGTERVDAAVLVMGNSPTSASPYRIGHGVLRDGIDPHGVLDALRAVGIDSGWPFTADTTPVEHVFLKSAVDGTD
ECRGRRHVLRTDYLGPYSMLLGKAVVHATVASIVGDPMMQVSGGEHQGPPGGGTVAVIAR >CAC86669.1 barbiturase [Rhodococcus erythropolis]
MPEAIEVRKVPLHSVSDASELAKLIDDGVLEADRVIAVIGKTEGNGGVNDYTRIIADRAFREVLSAKGNRSPEEVAEVPIVWSGGTDGVISPHATIFATV
PADKVTKTDEPRLTVGVAMSEQLLPEDIGRTAMITKVAAAVKDAMADAGITDPADVHYVQTKTPLLTIHTIRDAKSRGKTVWTEQTHESMDLSNGGT
ALGIAVALGEIDMPTDEDVMHSRELFSSVASCSSGVELDRAQIVVGNARGVGGRYRIGHSVMKDPLDQDGIWAAIRDAGLELPERPHSNDLDGQL
VNVFLKCEASQDGTVRGRRNAMLDDSDVHWHRQIKSCVGGVTAAVTGDPAVFVSVSAAHQGPEGGGPVAAIVDLGQ >WP_009515690.1 MULTISPECIES: ring-opening amidohydrolase [Hydrogenophaga]
MNPANPPRQLQVHRLPMAHPGDLSALADLLDEGRVRAEDVVAVIGKTEGNGGVNDFTRGYFTQSLMHLLGARLGRAPAELQRELPCVLSGGTEGV
LSPHYSVFSRAEAAADAPPGPALAIGRAFSAPTPAADIGRWAQVRAVAGAVRAAMADAGIADPAEVRFVQVKGPCVTGARAAALAAGQSVASADP
NRSMALSRAAGAFGVALALGEMADDPALESALLTRFDLWCGRASVSTGVEVEANEVVLLGHSAQWRGPLRMACEPMADAMDLPAVARALARLGL
RAAPQLSADDSARVAAALVKCEPDRRGQVRGARHTMLDDTDINAQRHIRAAVGGLVAGTLGDGRLFVSGGAEHQGPDGGGLIAVIAHAA >WP_018906567.1 ring-opening amidohydrolase [Variovorax paradoxus]
MNAHTLLPPGTAPAHAATRPRLAVHRLPMAHPGDLSALAALFDQGAIEPAQVVAVIGKTEGNGGVNDFTRGYFTQTLMSLLAARLGRPAAELLRELP
CILSGGTEGVLSPHYVVFARSGRPATDAAAGPGPGALAIGTAVSAPLPAQHVGRWAQVASVAGAVREAMRGAGIVRAEDVAFVQVKCPCVTAARA
QAAAAAGHTVLTADSGRSMAAARAAGAFGVAIALGELPDDPALEAAMLVDFERFSRRASISSGVEVEANEVIVLGHSAAWEGTLRMACAPMRDALDI
GAVAEALRPLGMNAAPQLAAADAARVAAVFVKCEPDRRGHVRGVRHTMLDDTDINAQRHIRGAVGGMVAGVLGDARIFVSGGAEHQGPDGGGLV
AVIAHAA >ABL83767.1 barbiturase [Nocardioides sp. JS614]
MTRPIEVRKVPIEHVSDAAGLADLIDAGVFSADDVIAVVGKTEGNGGVNDYTRIISTHAYRAVLEEKGTRSKEEVAQVPLVWSGGTDGVISPHATIFAY
APEGRYLPTDEPRVTVGYAMSEVLLPEDIGRPAMVEKVAAGVRVAMERAGITDPADVHYVQTKTPLLVQDTINDAERRGETVYTHNTLESMDVSNA
TTALGIAVALGEIEMPTAEQIFHDLSLYSSVASCSSGVELDQAQIVVGNARGVGGRFRVGHSIMKDALDMDGVWAAIRDAGLDDMPVDCIHPRHIK
GRLVNLFLKCEADPTGRVRGRRNIMLDDSDVAWHRQIKACVGGVAAVSGDPMNFVSVAAVHQGPSGGGPVIAIVDLEA

FIG. 12

PROTEIN SEQUENCES DEMONSTRATED NOT HAVING CAH ACTIVITY DO NOT COMPRISE AN EXACT MATCH WITH CONSENSUS
SEQ ID NO: 15

>ABL81019.1 barbiturase [Nocardioides sp. JS614]
MPDAIEVRKVPIHSVADASELAKLIDDGVMQAERVIAIIGKTEGNGGVNDYTRIIADRAFREVLVEKGAPAEQVKQVPIVWSGGTDGVISPHATIFATVP
PEDLTGALAPSDEQRLTVGFAMSERLAPEDIGRTAMITKVADAVKVAMERAGISDPADVHYVQTKTPLLTIHTIRDAKSRGKTVWTEHTHESMDLSN
GCTALGIAVALGEIEMPSDEDVMHDRSLYSSVASCSSGVELDQAQVVVGNAPGVGGRYRIGHSVMKDALDQDGIWEAIKDAGLDLPERPRTSDLD
GRLVNVFLKCEASQDGLVRGRRNAMLDDSDVHWHRQIKSCVGGVTAAVTGDPAVFVSVSAAHQGPDGGGPVAAIVDLG >pdb|5HXU|B Chain B, Barbiturase
MGSSHHHHHHSSGLVPRGSHMPEAIEVRKVPLHSVSDASELAKLIDDGVLEADRVIAVIGKTEGNGGVNDYTRIIADRAFREVLSAKGNRSPEEVAE
VPIVWSGGTDGVISPHATIFATVPADKVTKTDEPRLTVGVAMSEQLLPEDIGRTAMITKVAAAVKDAMADAGITDPADVHYVQTKTPLLTIHTIRDAKSR
GKTVWTEQTHESMDLSNGGTALGIAVALGEIDMPTDEDVMHSRELFSSVASCSSGVELDRAQIVVGNARGVGGRYRIGHSVMKDPLDQDGIWAAI
RDAGLELPERPHSSDLDGQLVNVFLKCEASQDGTVRGRRNAMLDDSDVHWHRQIKSCVGGVTAAVTGDPAVFVSVSAAHQGPEGGGPVAAIVDL
GQ >WP_010641892.1 ring-opening amidohydrolase [Acidithiobacillus thiooxidans]
MRTDLSRFFTSGPADVSGLAEAIARGEIIPKDIVAIIGKTEGNGGINDFTRNLAITALSHLLAPFLECSPEDVEERIVLSFSGGSEGVTAPHLLVFTISGTV
STQKNPSKRLALATGFTRPFMADEVGRMPMILETARTVKSLMQKLQVAAEDVHLVQIKGAIPPVSLPHPNLRCDMAWSRGASALGVALALGEVSES
QLSDAVINSDWSLFSTRASVSAKPLLSRSEIVLFANSDYWEGELHIAHGVMKDIIDVPGIYSVLEQLDLKPQHGQLTAHDSEKILGVFAKSDAHPGNQI
RQRRHTMWTDADISDMRYSRCVVAAQLAGVLGDTGVYVSTRAEHQGPQGGGPLAIIGVAP FIG. 12 (Continued)

SEQUENCE LISTING

<160> NUMBER OF SEQ ID NOS: 15

<210> SEQ ID NO 1
<211> LENGTH: 1104
<212> TYPE: DNA
<213> ORGANISM: Moorella thermoacetica

<400> SEQUENCE: 1

```
atgcaaaaag ttgaagtctt tcgtatccca acagcctcac ctgatgatat cagcgggttg     60
gctactttga ttgactcagg gaagattaat ccggctgaaa ttgtagctat tctgggcaag    120
acggaaggta atggttgtgt taacgatttt actcgcggtt ttgctaccca atctctagca    180
```

```
atgtatctag cagaaaaatt gggaataagc cgcgaagaag ttgtaaaaaa agttgcgttt      240
ataatgtcag gcggtactga gggtgttatg acgccgcaca ttactgtctt tgtccgaaaa      300
gatgtccagg aaccagctaa gccaggaaag cgcttggcag taggcgtagc ttttacgcgg      360
gactttctgc cggaagaatt gggccggatg aacaggtaa acgaagtggc tcgagctgta      420
aaagaggcta tgaaagacgc ccaaatagat gatccccgcg acgttcactt tgttcagata      480
aagtgcccgc ttttgactgc tgaaagaatt gaggatgcca agcgacgcgg gaaagatgtt      540
gtggtaaatg acacttataa atcaatggct tactcacgtg gcgcctcagc tctcggagtg      600
gccctcgcac tgggcgagat atctgcggat aagattagca acgaagcaat ttgtcatgac      660
tggaatctct actctagtgt ggcttcgacg tcagcggggg ttgaacttct taatgacgaa      720
attatcgtag taggaaactc taccaatagt gccagtgatt tggttatagg ccactctgtt      780
atgaaggatg ccattgacgc tgatgcagta cgtgctgccc ttaaagatgc cggtttaaaa      840
tttgattgtt gcccgccagc agaagagctt gctaagatcg ttaatgtact ggccaaggct      900
gaggccgcat cttctggtac agtaaggggt aggcgtaaca cgatgcttga tgactctgat      960
atcaatcata cccgctcggc gcgagcagta gtaaatgctg ttattgccag cgtggtagga     1020
gatcctatgg tctacgtttc cggtggtgca gagcatcaag ggcctgatgg cggtggccca     1080
attgctgtta ttgccagggt gtag                                            1104
```

<210> SEQ ID NO 2
<211> LENGTH: 367
<212> TYPE: PRT
<213> ORGANISM: Moorella thermoacetica

<400> SEQUENCE: 2

```
Met Gln Lys Val Glu Val Phe Arg Ile Pro Thr Ala Ser Pro Asp Asp
1               5                   10                  15

Ile Ser Gly Leu Ala Thr Leu Ile Asp Ser Gly Lys Ile Asn Pro Ala
            20                  25                  30

Glu Ile Val Ala Ile Leu Gly Lys Thr Glu Gly Asn Gly Cys Val Asn
        35                  40                  45

Asp Phe Thr Arg Gly Phe Ala Thr Gln Ser Leu Ala Met Tyr Leu Ala
    50                  55                  60

Glu Lys Leu Gly Ile Ser Arg Glu Val Val Lys Lys Val Ala Phe
65                  70                  75                  80

Ile Met Ser Gly Gly Thr Glu Gly Val Met Thr Pro His Ile Thr Val
                85                  90                  95

Phe Val Arg Lys Asp Val Gln Glu Pro Ala Lys Pro Gly Lys Arg Leu
            100                 105                 110

Ala Val Gly Val Ala Phe Thr Arg Asp Phe Leu Pro Glu Glu Leu Gly
        115                 120                 125

Arg Met Glu Gln Val Asn Glu Val Ala Arg Ala Val Lys Glu Ala Met
    130                 135                 140

Lys Asp Ala Gln Ile Asp Asp Pro Arg Asp Val His Phe Val Gln Ile
145                 150                 155                 160

Lys Cys Pro Leu Leu Thr Ala Glu Arg Ile Glu Asp Ala Lys Arg Arg
                165                 170                 175

Gly Lys Asp Val Val Asn Asp Thr Tyr Lys Ser Met Ala Tyr Ser
            180                 185                 190

Arg Gly Ala Ser Ala Leu Gly Val Ala Leu Ala Leu Gly Glu Ile Ser
        195                 200                 205
```

Ala Asp Lys Ile Ser Asn Glu Ala Ile Cys His Asp Trp Asn Leu Tyr
    210                 215                 220

Ser Ser Val Ala Ser Thr Ser Ala Gly Val Glu Leu Leu Asn Asp Glu
225                 230                 235                 240

Ile Ile Val Val Gly Asn Ser Thr Asn Ser Ala Ser Asp Leu Val Ile
                245                 250                 255

Gly His Ser Val Met Lys Asp Ala Ile Asp Asp Ala Val Arg Ala
                260                 265                 270

Ala Leu Lys Asp Ala Gly Leu Lys Phe Asp Cys Cys Pro Pro Ala Glu
            275                 280                 285

Glu Leu Ala Lys Ile Val Asn Val Leu Ala Lys Ala Glu Ala Ala Ser
        290                 295                 300

Ser Gly Thr Val Arg Gly Arg Arg Asn Thr Met Leu Asp Asp Ser Asp
305                 310                 315                 320

Ile Asn His Thr Arg Ser Ala Arg Ala Val Val Asn Ala Val Ile Ala
                325                 330                 335

Ser Val Val Gly Asp Pro Met Val Tyr Val Ser Gly Gly Ala Glu His
                340                 345                 350

Gln Gly Pro Asp Gly Gly Pro Ile Ala Val Ile Ala Arg Val
        355                 360                 365

<210> SEQ ID NO 3
<211> LENGTH: 1104
<212> TYPE: DNA
<213> ORGANISM: Moorella thermoacetica

<400> SEQUENCE: 3
atgcaaaaag tcgaagtttt tagaatccca acggctagcc ccgatgatat ttcaggacta      60
gcgaccttaa tgatagtgg aaaaatcaat ccggcagaga ttgttgcaat tttgggaaaa     120
actgaaggga atggtgctgt gaacgatttt actagaggat cgcgacgca atccttagct     180 atgtatttag ccgaaaagtt aggtattagt cgtgaggaag ttgtcaaaaa agtcgcattc     240
attatgtctg gtggaactga gggtgtaatg actccacata ttacggtctt tgtccggaaa     300
gacgtacaag agccggccaa acctggaaaa cggttagcgg tgggtgttgc gtttacccgt     360
gatttcttgc cggaagaact cggacgcatg gaacaagtca cgaagtcgc cagggctgta     420 aaagaggcca tgaaagatgc ccagattgat gacccgcgag atgtacattt tgtccaaatc     480
aaatgtccgt tactgacagc ggagcgtatt gaagatgcaa aacgtcgcgg taaagatgta     540
gtagtaaacg acacctacaa gtcaatggcg tactcccgtg gggcatcagc gttaggtgta     600
gcattagcgc tcggtgagat ttctgcggat aagatttcta tgaagccat tgccatgat     660 tggaatctat atagctcggt cgcctccaca agtgccggag tagagttact aaacgatgaa     720
atcattgtag tcggcaacag tactaattct gcgagtgatc ttgtaattgg acactctgta     780
atgaaagatg caattgatgc ggacgcagtc agggcagcac tgaaagatgc gggactgaaa     840
tttgattgtt gtccaccggc agaggaatta gcgaaaattg ttaatgtatt agccaaagct     900
gaggcagcgt caagtggaac ggtgcgtgga cgccgtaaca ctatgttaga cgacagcgac     960
attaatcata cgcgcagcgc tcgcgccgta gtcaatgccg tcattgcttc cgtcgttggt    1020
gatccaatgg tatatgtcag tggtggagca gagcaccagg acccgacgg tgggggaccg    1080 attgcggtaa ttgcgcgtgt ttag                                            1104

<210> SEQ ID NO 4
<211> LENGTH: 367

<212> TYPE: PRT
<213> ORGANISM: Moorella thermoacetica

<400> SEQUENCE: 4

```
Met Gln Lys Val Glu Val Phe Arg Ile Pro Thr Ala Ser Pro Asp
1               5                   10                  15

Ile Ser Gly Leu Ala Thr Leu Ile Asp Ser Gly Lys Ile Asn Pro Ala
            20                  25                  30

Glu Ile Val Ala Ile Leu Gly Lys Thr Glu Gly Asn Gly Ala Val Asn
                35                  40                  45

Asp Phe Thr Arg Gly Phe Ala Thr Gln Ser Leu Ala Met Tyr Leu Ala
        50                  55                  60

Glu Lys Leu Gly Ile Ser Arg Glu Glu Val Val Lys Lys Val Ala Phe
65                  70                  75                  80

Ile Met Ser Gly Gly Thr Glu Gly Val Met Thr Pro His Ile Thr Val
                85                  90                  95

Phe Val Arg Lys Asp Val Gln Glu Pro Ala Lys Pro Gly Lys Arg Leu
            100                 105                 110

Ala Val Gly Val Ala Phe Thr Arg Asp Phe Leu Pro Glu Glu Leu Gly
            115                 120                 125

Arg Met Glu Gln Val Asn Glu Val Ala Arg Ala Val Lys Glu Ala Met
        130                 135                 140

Lys Asp Ala Gln Ile Asp Asp Pro Arg Asp Val His Phe Val Gln Ile
145                 150                 155                 160

Lys Cys Pro Leu Leu Thr Ala Glu Arg Ile Glu Asp Ala Lys Arg Arg
                165                 170                 175

Gly Lys Asp Val Val Asn Asp Thr Tyr Lys Ser Met Ala Tyr Ser
            180                 185                 190

Arg Gly Ala Ser Ala Leu Gly Val Ala Leu Ala Leu Gly Glu Ile Ser
        195                 200                 205

Ala Asp Lys Ile Ser Asn Glu Ala Ile Cys His Asp Trp Asn Leu Tyr
    210                 215                 220

Ser Ser Val Ala Ser Thr Ser Ala Gly Val Glu Leu Leu Asn Asp Glu
225                 230                 235                 240

Ile Ile Val Val Gly Asn Ser Thr Asn Ser Ala Ser Asp Leu Val Ile
                245                 250                 255

Gly His Ser Val Met Lys Asp Ala Ile Asp Ala Asp Ala Val Arg Ala
            260                 265                 270

Ala Leu Lys Asp Ala Gly Leu Lys Phe Asp Cys Cys Pro Pro Ala Glu
        275                 280                 285

Glu Leu Ala Lys Ile Val Asn Val Leu Ala Lys Ala Glu Ala Ala Ser
290                 295                 300

Ser Gly Thr Val Arg Gly Arg Arg Asn Thr Met Leu Asp Ser Asp
305                 310                 315                 320

Ile Asn His Thr Arg Ser Ala Arg Ala Val Asn Ala Val Ile Ala
                325                 330                 335

Ser Val Val Gly Asp Pro Met Val Tyr Val Ser Gly Gly Ala Glu His
            340                 345                 350

Gln Gly Pro Asp Gly Gly Pro Ile Ala Val Ile Ala Arg Val
        355                 360                 365
```

<210> SEQ ID NO 5
<211> LENGTH: 1113
<212> TYPE: DNA
<213> ORGANISM: Bradyrhizobium diazoefficiens

<400> SEQUENCE: 5

```
atgagaacaa catcagttgg cgtgtttaag atcgttacaa aaggaccggg tgatgtttca      60
ggccttatgg caatgattgg ctcaggcgca attgatccga aatcaattct ggcagttctg     120
ggcaaaacgg aaggcaatgg cggagttaat gattttacaa gagaatatgc agttgcagca     180
ctttgcacag cactggcacc gcaactgggc ctgtcaccgg aagaagttga acaaagaatt     240
gcatttgtta tgagcggagg cacagaaggc gttctgtcac cgcatattac agtctttaca     300
agaagagaag tcgaacgcag accggcaggc ctgtcaggca aaagactgtc aattggcatg     360
gcacatacaa gagattttct gccggaagaa ctgggcagag cagcacaaat tgcagaaaca     420
gcagcagcag ttaaagcagc aatggcagat gcaggcattg cagatccggc agatgttcat     480
tttgttcaga ttaaatgtcc gctgctgaca agcgatagag ttgaagcagc atcagcaaga     540
ggcaataaaa cagcaacaac aagcgcatat ggctcaatgg catattcaag aggcgcatca     600
gcactgggcg ttgcagttgc gctgggcgaa acaggctcag atatttcaga tggcgacgtt     660
ctgagaagat atgacctgtt ttcaaaagtt gcgtcaacat cagcgggaat tgaactgatg     720
cataatgttg ttattgtcct gggcaattca gcagcaagcg catcagaatt tgaaattggc     780
catgcagtta tgaacgatgc aattgatgca gcagcggtta catcagcgct taaatgcgtt     840
ggccttggcg ttgcaccgca agcagaagca ggcagagaac tggttaatat ctttgcaaaa     900
gcggaagcat caccggatgg ctcagttaga ggctttagac atacaatgct ggaagataca     960
gatattagct caacaagaca tgcaagagca gcagtcggag gcctgattgc aggactggca    1020
ggcacaggcg cagtttatgt ttctggcgga gcagaacatc aaggaccggc tggcggagga    1080
ccggttgcag ttattgcaag actgagcgat taa                                 1113
```

<210> SEQ ID NO 6
<211> LENGTH: 370
<212> TYPE: PRT
<213> ORGANISM: Bradyrhizobium diazoefficiens

<400> SEQUENCE: 6

```
Met Arg Thr Thr Ser Val Gly Val Phe Lys Ile Val Thr Lys Gly Pro
 1               5                  10                  15

Gly Asp Val Ser Gly Leu Met Ala Met Ile Gly Ser Gly Ala Ile Asp
             20                  25                  30

Pro Lys Ser Ile Leu Ala Val Leu Gly Lys Thr Glu Gly Asn Gly Gly
         35                  40                  45

Val Asn Asp Phe Thr Arg Glu Tyr Ala Val Ala Ala Leu Cys Thr Ala
     50                  55                  60

Leu Ala Pro Gln Leu Gly Leu Ser Pro Glu Glu Val Glu Gln Arg Ile
 65                  70                  75                  80

Ala Phe Val Met Ser Gly Gly Thr Glu Gly Val Leu Ser Pro His Ile
                 85                  90                  95

Thr Val Phe Thr Arg Arg Glu Val Glu Arg Arg Pro Ala Gly Leu Ser
            100                 105                 110

Gly Lys Arg Leu Ser Ile Gly Met Ala His Thr Arg Asp Phe Leu Pro
        115                 120                 125

Glu Glu Leu Gly Arg Ala Ala Gln Ile Ala Glu Thr Ala Ala Ala Val
    130                 135                 140

Lys Ala Ala Met Ala Asp Ala Gly Ile Ala Asp Pro Ala Asp Val His
145                 150                 155                 160
```

```
Phe Val Gln Ile Lys Cys Pro Leu Leu Thr Ser Asp Arg Val Glu Ala
            165                 170                 175
Ala Ser Ala Arg Gly Asn Lys Thr Ala Thr Ser Ala Tyr Gly Ser
        180                 185                 190
Met Ala Tyr Ser Arg Gly Ala Ser Ala Leu Gly Val Ala Val Ala Leu
        195                 200                 205
Gly Glu Thr Gly Ser Asp Ile Ser Asp Gly Asp Val Leu Arg Arg Tyr
    210                 215                 220
Asp Leu Phe Ser Lys Val Ala Ser Thr Ser Ala Gly Ile Glu Leu Met
225                 230                 235                 240
His Asn Val Val Ile Val Leu Gly Asn Ser Ala Ser Ala Ser Glu
                245                 250                 255
Phe Glu Ile Gly His Ala Val Met Asn Asp Ala Ile Asp Ala Ala
                260                 265                 270
Val Thr Ser Ala Leu Lys Cys Val Gly Leu Gly Val Ala Pro Gln Ala
            275                 280                 285
Glu Ala Gly Arg Glu Leu Val Asn Ile Phe Ala Lys Ala Glu Ala Ser
    290                 295                 300
Pro Asp Gly Ser Val Arg Gly Phe Arg His Thr Met Leu Glu Asp Thr
305                 310                 315                 320
Asp Ile Ser Ser Thr Arg His Ala Arg Ala Val Gly Gly Leu Ile
                325                 330                 335
Ala Gly Leu Ala Gly Thr Gly Ala Val Tyr Val Ser Gly Gly Ala Glu
            340                 345                 350
His Gln Gly Pro Ala Gly Gly Gly Pro Val Ala Val Ile Ala Arg Leu
            355                 360                 365
Ser Asp
    370

<210> SEQ ID NO 7
<211> LENGTH: 1113
<212> TYPE: DNA
<213> ORGANISM: Bradyrhizobium sp.

<400> SEQUENCE: 7
atgagaacaa caagcgttgg cgttttttaaa gttgcaacaa aaggaccggg tgatgtttca      60
ggccttatgg caatgattgg ctcaggcgca attgatccgg caagcattct ggcaattctg     120
ggcaaaacgg aaggcaatgg cggagttaat gattttacaa gagaatatgc agttgcagca     180
ctttgcacag cactggcacc gcaactgggc ctgtcaccgc aagaagttga acaaagaatt     240
gcatttgtta tgagcggagg cacagaaggc gttctttcac cgcatattac agtctttaca     300
agaagagatg ttctgcaaag accggcaggc atttcaggca aaagactgtc aattggcatg     360
gcacatacaa gagatttttt accggaagaa ctgggcagat cagcacaaat cacagaaaca     420
gcaaaagcag ttaaagcagc aatggcagat gcaggcattg cagatccggc agatgttcat     480
tttgttcaga ttaaatgtcc gctgctgaca tcagaacgcg ttgaagcagc aaatgcaaga     540
ggccataaaa cagcaacaac atcagcatat tcaagcatgg catatagcag aggcgcatca     600
gcactgggcg ttgcagttgc gctgggcgaa attgcgacag atctgagaga tgatgatgtc     660
ctgagaagat atgacctgtt ttcaaatgtt gcatcaacaa gctcaggcat cgaactgaca     720
cataatgttg ttattgttct cggcaatagc atgtcaagca aagcgaatt tgaaattggc     780
catgcagtta tgtcagatgc aattgatgca gcagcagttc ttgcagcgct ggaatcagtt     840
ggcctgtgcg cagcaccgca aacaacaaca ggcagagaac tggttaatat ctttgcaaaa     900
```

```
gcggaagcat caccggatgg ctcagttaga ggctttagac atacaatgct ggaagataca    960
gatatttcat caacacgcca tgcaagagca gcagtcggag gcctgattgc aggcctggca   1020
ggcacaggcg cagtttatgt ttctggcgga gcggaacatc aaggaccggc tggcggagga   1080
ccggttgcag ttattgcaaa acttagcgat taa                                1113
```

<210> SEQ ID NO 8
<211> LENGTH: 370
<212> TYPE: PRT
<213> ORGANISM: Bradyrhizobium sp.

<400> SEQUENCE: 8

```
Met Arg Thr Thr Ser Val Gly Val Phe Lys Val Ala Thr Lys Gly Pro
1               5                   10                  15

Gly Asp Val Ser Gly Leu Met Ala Met Ile Gly Ser Gly Ala Ile Asp
            20                  25                  30

Pro Ala Ser Ile Leu Ala Ile Leu Gly Lys Thr Glu Gly Asn Gly Gly
        35                  40                  45

Val Asn Asp Phe Thr Arg Glu Tyr Ala Val Ala Ala Leu Cys Thr Ala
50                  55                  60

Leu Ala Pro Gln Leu Gly Leu Ser Pro Gln Glu Val Glu Gln Arg Ile
65                  70                  75                  80

Ala Phe Val Met Ser Gly Gly Thr Glu Gly Val Leu Ser Pro His Ile
                85                  90                  95

Thr Val Phe Thr Arg Arg Asp Val Leu Gln Arg Pro Ala Gly Ile Ser
            100                 105                 110

Gly Lys Arg Leu Ser Ile Gly Met Ala His Thr Arg Asp Phe Leu Pro
        115                 120                 125

Glu Glu Leu Gly Arg Ser Ala Gln Ile Thr Glu Thr Ala Lys Ala Val
    130                 135                 140

Lys Ala Ala Met Ala Asp Ala Gly Ile Ala Asp Pro Ala Asp Val His
145                 150                 155                 160

Phe Val Gln Ile Lys Cys Pro Leu Leu Thr Ser Glu Arg Val Glu Ala
                165                 170                 175

Ala Asn Ala Arg Gly His Lys Thr Ala Thr Thr Ser Ala Tyr Ser Ser
            180                 185                 190

Met Ala Tyr Ser Arg Gly Ala Ser Ala Leu Gly Val Ala Val Ala Leu
        195                 200                 205

Gly Glu Ile Ala Thr Asp Leu Arg Asp Asp Val Leu Arg Arg Tyr
    210                 215                 220

Asp Leu Phe Ser Asn Val Ala Ser Thr Ser Ser Gly Ile Glu Leu Thr
225                 230                 235                 240

His Asn Val Val Ile Val Leu Gly Asn Ser Met Ser Ser Thr Ser Glu
                245                 250                 255

Phe Glu Ile Gly His Ala Val Met Ser Asp Ala Ile Asp Ala Ala Ala
            260                 265                 270

Val Leu Ala Ala Leu Glu Ser Val Gly Leu Cys Ala Ala Pro Gln Thr
        275                 280                 285

Thr Thr Gly Arg Glu Leu Val Asn Ile Phe Ala Lys Ala Glu Ala Ser
    290                 295                 300

Pro Asp Gly Ser Val Arg Gly Phe Arg His Thr Met Leu Glu Asp Thr
305                 310                 315                 320

Asp Ile Ser Ser Thr Arg His Ala Arg Ala Ala Val Gly Gly Leu Ile
                325                 330                 335
```

Ala Gly Leu Ala Gly Thr Gly Ala Val Tyr Val Ser Gly Gly Ala Glu
                340                 345                 350

His Gln Gly Pro Ala Gly Gly Pro Val Ala Val Ile Ala Lys Leu
            355                 360                 365

Ser Asp
    370

<210> SEQ ID NO 9
<211> LENGTH: 1092
<212> TYPE: DNA
<213> ORGANISM: Pseudolabrys sp.

<400> SEQUENCE: 9
atgccgattg caaaagtcca tagaatttca gcatcaagcc cgaatgatgt ttcaggcctg    60
gaagcagcaa ttgcatcagg cagaattgat ccgaaaggcg ttattgcagt tctgggcaaa   120
acagaaggca acggcctggt taatgatttt tcaagaggcc tggcaacaac agcactgaca   180
ctgctgtttg aaagacatct gccgcaagca gaagcagcac aaatttgcct ggttatgtca   240
ggcggaacgg aaggcggaat ggcaccgcat tggattgttt ttgaaagagg caaaggcgaa   300
ggcggacgct caccggcact ggcaattggc agagcacata cactgcaact gccgtatgaa   360
caactgggca gactgggcga agttgatcaa gttgcagcag gcgttagagc agcaatggaa   420
gatgcaggca ttgcagatcc ggctgatgtt cattttgttc agattaaatg tccgctgctg   480
acagcacaaa gaattgcaga gcggaagca agaggcgcag cagttgcaac aagagataca   540
ctgaaatcaa tgtcactgtc aagagcagca tcagcactgg gagcagcagt cgcacttggc   600
gaaattgata gagcagcgat tacagaagcg caaattggct cagattggtc actgtggtca   660
ggcagagcat caacatcagc tggcattgaa ctggtcaatc atgaaattgt tgttctcggc   720
atgagcaaag attggagcgg accgcttgca attgatcatg cagttatgag agatggcatt   780
gatattgaac cggttagagc ggcactgcaa agacttggcc ttggcgcagc gggacaactg   840
gatccggcac aacgcaataa aatggttgca ctgctggcaa aagctgaagc atcacatgat   900
ggcagactga gaggccatag acatacaatg ctggatgatt cagatattgc gtcaacaaga   960
catgcaagag gctttgtttg cggagcactg gcaggcctgg ttggccatgc agaaatttat  1020
gttagcggag cgcagaaaca tcaaggaccg gatggcggag accggttgca agttattgtt  1080
gatagaggct aa                                                      1092

<210> SEQ ID NO 10
<211> LENGTH: 363
<212> TYPE: PRT
<213> ORGANISM: Pseudolabrys sp.

<400> SEQUENCE: 10

Met Pro Ile Ala Lys Val His Arg Ile Ser Ala Ser Ser Pro Asn Asp
1               5                   10                  15

Val Ser Gly Leu Glu Ala Ala Ile Ala Ser Gly Arg Ile Asp Pro Lys
            20                  25                  30

Gly Val Ile Ala Val Leu Gly Lys Thr Glu Gly Asn Gly Leu Val Asn
        35                  40                  45

Asp Phe Ser Arg Gly Leu Ala Thr Thr Ala Leu Thr Leu Leu Phe Glu
    50                  55                  60

Arg His Leu Pro Gln Ala Glu Ala Ala Gln Ile Cys Leu Val Met Ser
65                  70                  75                  80

```
Gly Gly Thr Glu Gly Gly Met Ala Pro His Trp Ile Val Phe Glu Arg
                85                  90                  95
Gly Lys Gly Glu Gly Arg Ser Pro Ala Leu Ala Ile Gly Arg Ala
            100                 105                 110
His Thr Leu Gln Leu Pro Tyr Glu Gln Leu Gly Arg Leu Gly Glu Val
        115                 120                 125
Asp Gln Val Ala Ala Gly Val Arg Ala Ala Met Glu Asp Ala Gly Ile
    130                 135                 140
Ala Asp Pro Ala Asp Val His Phe Val Gln Ile Lys Cys Pro Leu Leu
145                 150                 155                 160
Thr Ala Gln Arg Ile Ala Glu Ala Glu Ala Arg Gly Ala Ala Val Ala
                165                 170                 175
Thr Arg Asp Thr Leu Lys Ser Met Ser Leu Ser Arg Ala Ala Ser Ala
            180                 185                 190
Leu Gly Ala Ala Val Ala Leu Gly Glu Ile Asp Arg Ala Ala Ile Thr
        195                 200                 205
Glu Ala Gln Ile Gly Ser Asp Trp Ser Leu Trp Ser Gly Arg Ala Ser
    210                 215                 220
Thr Ser Ala Gly Ile Glu Leu Val Asn His Glu Ile Val Val Leu Gly
225                 230                 235                 240
Met Ser Lys Asp Trp Ser Gly Pro Leu Ala Ile Asp His Ala Val Met
                245                 250                 255
Arg Asp Gly Ile Asp Ile Glu Pro Val Arg Ala Ala Leu Gln Arg Leu
            260                 265                 270
Gly Leu Gly Ala Ala Gly Gln Leu Asp Pro Ala Gln Arg Asn Lys Met
        275                 280                 285
Val Ala Leu Leu Ala Lys Ala Glu Ala Ser His Asp Gly Arg Leu Arg
    290                 295                 300
Gly His Arg His Thr Met Leu Asp Asp Ser Asp Ile Ala Ser Thr Arg
305                 310                 315                 320
His Ala Arg Gly Phe Val Cys Gly Ala Leu Ala Gly Leu Val Gly His
                325                 330                 335
Ala Glu Ile Tyr Val Ser Gly Gly Ala Glu His Gln Gly Pro Asp Gly
            340                 345                 350
Gly Gly Pro Val Ala Val Ile Val Asp Arg Gly
        355                 360

<210> SEQ ID NO 11
<211> LENGTH: 1113
<212> TYPE: DNA
<213> ORGANISM: Acidovorax citrulli

<400> SEQUENCE: 11
atgcaagcgc aagtttttag agttccgatg tcaaatccgg cagatgtttc aggcgttgca     60
aaactgattg atgaaggcgt tattagagca gaagaagttg tttgcgttct gggcaaaaca    120
gaaggcaacg gctgcgttaa tgattttaca agaggctata caacgctggc gtttaaagtc    180
tacttttcag aaaaactggg cgtgagcaga caagaagttg gcgaaagaat tgcgtttatt    240
atgtcaggcg aacggaagg cgtcatggca ccgcattgca caattttac agttcagaaa    300 acggataaca aacagaaaac agcagcggaa ggcaaaagac tggcagttca gcagattttt    360
acacgcgaat ttttgccgga gaaattggc agaatgccgc aagttacaga aacagcggat    420
gcagttagac gcgcaatgag agaagcaggc attgcagatg catcagatgt tcattttgtc    480
caagttaaat gtccgctgct tacagcggga agaatgcatg atgcagttga agaggccat     540
```

```
acagttgcaa cggaagatac atatgaatca atgggctatt caagaggcgc atcagcactg    600
ggcattgcac tggcactggg cgaagttgaa aaagcaaatc tgtcagatga agtcatcaca    660
gcagattatt cactgtattc atcagttgca tcaacaagcg ctggcattga attgatgaac    720
aacgaaatta ttgtcatggg caatagcaga gcatggggag gcgatctggt tattggccat    780
gcagaaatga aagatgcaat tgatggcgca gcagtcagac aagcactgag agatgttggc    840
tgctgcgaaa atgatctgcc gacagttgat gaactgggca gagttgttaa tgtttttgcg    900
aaagcggaag catcaccgga tggcgaagtc agaaatagac gccatacaat gctggatgat    960
agcgatatta acagcacaag acatgcaaga gcagttgtca atgcagttat tgcatcaatt   1020
gttggcgatc cgatggttta tgttagcgga ggctcagaac atcaaggacc ggcaggcgga   1080
ggaccggttg cagtcattgc aagaacagca taa                                1113
```

<210> SEQ ID NO 12
<211> LENGTH: 370
<212> TYPE: PRT
<213> ORGANISM: Acidovorax citrulli

<400> SEQUENCE: 12

```
Met Gln Ala Gln Val Phe Arg Val Pro Met Ser Asn Pro Ala Asp Val
1               5                   10                  15

Ser Gly Val Ala Lys Leu Ile Asp Glu Gly Val Ile Arg Ala Glu Glu
            20                  25                  30

Val Val Cys Val Leu Gly Lys Thr Glu Gly Asn Gly Cys Val Asn Asp
        35                  40                  45

Phe Thr Arg Gly Tyr Thr Thr Leu Ala Phe Lys Val Tyr Phe Ser Glu
    50                  55                  60

Lys Leu Gly Val Ser Arg Gln Glu Val Gly Glu Arg Ile Ala Phe Ile
65                  70                  75                  80

Met Ser Gly Gly Thr Glu Gly Val Met Ala Pro His Cys Thr Ile Phe
                85                  90                  95

Thr Val Gln Lys Thr Asp Asn Lys Gln Lys Thr Ala Ala Glu Gly Lys
            100                 105                 110

Arg Leu Ala Val Gln Gln Ile Phe Thr Arg Glu Phe Leu Pro Glu Glu
        115                 120                 125

Ile Gly Arg Met Pro Gln Val Thr Glu Thr Ala Asp Ala Val Arg Arg
    130                 135                 140

Ala Met Arg Glu Ala Gly Ile Ala Asp Ala Ser Asp Val His Phe Val
145                 150                 155                 160

Gln Val Lys Cys Pro Leu Leu Thr Ala Gly Arg Met His Asp Ala Val
                165                 170                 175

Glu Arg Gly His Thr Val Ala Thr Glu Asp Thr Tyr Glu Ser Met Gly
            180                 185                 190

Tyr Ser Arg Gly Ala Ser Ala Leu Gly Ile Ala Leu Ala Leu Gly Glu
        195                 200                 205

Val Glu Lys Ala Asn Leu Ser Asp Glu Val Ile Thr Ala Asp Tyr Ser
    210                 215                 220

Leu Tyr Ser Ser Val Ala Ser Thr Ser Ala Gly Ile Glu Leu Met Asn
225                 230                 235                 240

Asn Glu Ile Ile Val Met Gly Asn Ser Arg Ala Trp Gly Gly Asp Leu
                245                 250                 255

Val Ile Gly His Ala Glu Met Lys Asp Ala Ile Asp Gly Ala Ala Val
            260                 265                 270
```

```
Arg Gln Ala Leu Arg Asp Val Gly Cys Cys Glu Asn Asp Leu Pro Thr
        275                 280                 285

Val Asp Glu Leu Gly Arg Val Val Asn Val Phe Ala Lys Ala Glu Ala
    290                 295                 300

Ser Pro Asp Gly Glu Val Arg Asn Arg His Thr Met Leu Asp Asp
305                 310                 315                 320

Ser Asp Ile Asn Ser Thr Arg His Ala Arg Ala Val Val Asn Ala Val
                325                 330                 335

Ile Ala Ser Ile Val Gly Asp Pro Met Val Tyr Val Ser Gly Gly Ser
            340                 345                 350

Glu His Gln Gly Pro Ala Gly Gly Pro Val Ala Val Ile Ala Arg
        355                 360                 365

Thr Ala
    370

<210> SEQ ID NO 13
<211> LENGTH: 696
<212> TYPE: DNA
<213> ORGANISM: Herbaspirillum sp.

<400> SEQUENCE: 13
atgcctgaac tcttcatcaa agccgaaccc tatgcatggc cctatgacgg cgcactgacc       60
ccggccaata ccgcactcat cgtcatcgac atgcagaccg acttctgcgg catcggcggc      120
tacgtcgaca agatgggcta cgacctgtca ttgacgcgcg ctcccatcga gccgatcaag      180
cgcgtgctgg ccgccatgcg cgccgggggc tataccatca tccatacccg cgaaggccac      240
cgtcccgatc tctccgacct gcccgccaac aagcgctggc gttcgcgcca gatcggtacc      300
aatggcgtgg gcatcggtga cgctggtccg tgtggccgca tcctggtgcg gggtgaaccg      360
ggctgggaaa tcattcccga actggccccc atcgccggcg agatcatcat cgacaaaccc      420
ggcaagggtt ccttctgcgc caccgacctg gaaatgattt tgcacacgcg tggcatccgc      480
aacatcgtgc tgaccggcat caccaccgac gtctgcgtgc acaccaccat gcgcgaagcc      540
aacgaccgcg gcttcgaatg cgtgatgctg tcggactgct gcggtgcgac cgaccacaat      600
aaccacctgg cagcgctgtc catgatcaag atgcagggcg gcgtgttcgg tgccgtctcc      660
gattcggcgg cactgatcga tgtgatcggg gcctga                                696

<210> SEQ ID NO 14
<211> LENGTH: 231
<212> TYPE: PRT
<213> ORGANISM: Herbaspirillum sp.

<400> SEQUENCE: 14

Met Pro Glu Leu Phe Ile Lys Ala Glu Pro Tyr Ala Trp Pro Tyr Asp
1               5                   10                  15

Gly Ala Leu Thr Pro Ala Asn Thr Ala Leu Ile Val Ile Asp Met Gln
            20                  25                  30

Thr Asp Phe Cys Gly Ile Gly Gly Tyr Val Asp Lys Met Gly Tyr Asp
        35                  40                  45

Leu Ser Leu Thr Arg Ala Pro Ile Glu Pro Ile Lys Arg Val Leu Ala
    50                  55                  60

Ala Met Arg Ala Gly Gly Tyr Thr Ile Ile His Thr Arg Glu Gly His
65                  70                  75                  80

Arg Pro Asp Leu Ser Asp Leu Pro Ala Asn Lys Arg Trp Arg Ser Arg
                85                  90                  95
```

```
Gln Ile Gly Thr Asn Gly Val Gly Ile Gly Asp Ala Gly Pro Cys Gly
            100                 105                 110

Arg Ile Leu Val Arg Gly Glu Pro Gly Trp Glu Ile Ile Pro Glu Leu
            115                 120                 125

Ala Pro Ile Ala Gly Glu Ile Ile Ile Asp Lys Pro Gly Lys Gly Ser
130                 135                 140

Phe Cys Ala Thr Asp Leu Glu Met Ile Leu His Thr Arg Gly Ile Arg
145                 150                 155                 160

Asn Ile Val Leu Thr Gly Ile Thr Thr Asp Val Cys Val His Thr Thr
                165                 170                 175

Met Arg Glu Ala Asn Asp Arg Gly Phe Glu Cys Val Met Leu Ser Asp
            180                 185                 190

Cys Cys Gly Ala Thr Asp His Asn Asn His Leu Ala Ala Leu Ser Met
            195                 200                 205

Ile Lys Met Gln Gly Gly Val Phe Gly Ala Val Ser Asp Ser Ala Ala
            210                 215                 220

Leu Ile Asp Val Ile Gly Ala
225                 230

<210> SEQ ID NO 15
<211> LENGTH: 16
<212> TYPE: PRT
<213> ORGANISM: Artificial Sequence
<220> FEATURE:
<223> OTHER INFORMATION: consensus amino acid sequence
<220> FEATURE:
<221> NAME/KEY: MISC_FEATURE
<222> LOCATION: (1)..(1)
<223> OTHER INFORMATION: Xaa isTyr or Phe
<220> FEATURE:
<221> NAME/KEY: MISC_FEATURE
<222> LOCATION: (2)..(2)
<223> OTHER INFORMATION: Xaa is any amino acid
<220> FEATURE:
<221> NAME/KEY: MISC_FEATURE
<222> LOCATION: (6)..(6)
<223> OTHER INFORMATION: Xaa is any amino acid
<220> FEATURE:
<221> NAME/KEY: MISC_FEATURE
<222> LOCATION: (8)..(8)
<223> OTHER INFORMATION: Xaa is His or Asn
<220> FEATURE:
<221> NAME/KEY: MISC_FEATURE
<222> LOCATION: (12)..(12)
<223> OTHER INFORMATION: Xaa is any amino acid
<220> FEATURE:
<221> NAME/KEY: MISC_FEATURE
<222> LOCATION: (16)..(16)
<223> OTHER INFORMATION: Xaa is Pro or Ser

<400> SEQUENCE: 15

Xaa Xaa Ser Gly Gly Xaa Glu Xaa Gln Gly Pro Xaa Gly Gly Gly Xaa
1               5                   10                  15
```

METHODS AND COMPOSITIONS FOR REMEDIATING CYANURIC ACID IN AQUEOUS LIQUIDS

CROSS-REFERENCE TO RELATED APPLICATIONS

The present application is a U.S. National Stage Application under 35 U.S.C. § 371 of International Application No. PCT/US2020/055481, filed Oct. 14, 2020, which claims priority to U.S. Provisional Patent Application No. 62/926,661, filed Oct. 28, 2019, all of which are incorporated herein by reference in their entirety.

CROSS REFERENCE TO RELATED APPLICATIONS

This application claims benefit to U.S. Provisional Patent Application No. 62/926,661, filed Oct. 28, 2019, which is incorporated herein by referenced in its entirety.

TECHNICAL FIELD

The present disclosure is generally related to the fields of biology, inorganic chemistry, organic chemistry, molecular biology, enzymology, chlorinated water treatment processes and the like. More particularly, certain embodiments of the disclosure are related to reducing cyanuric acid concentrations in aqueous liquids, which aqueous liquids include, but are not limited to, chlorinated swimming pool water, chlorinated hot tub water and the like. As set forth herein, the methods and compositions of the present disclosure are particularly suited for use in reducing (remediating) cyanuric acid concentrations in aqueous liquids, wherein such aqueous liquids comprise hypochlorite at concentration ranges typically used in swimming pool disinfection processes, hot tub disinfection processes, treated waste water and the like.

REFERENCE TO A SEQUENCE LISTING

The contents of the electronic submission of the text file Sequence Listing, named "NB41643-WO-PCT_Sequence-Listing.txt" was created on Oct. 6, 2020 and is 32 KB in size, which is hereby incorporated by reference in its entirety.

BACKGROUND OF THE DISCLOSURE

The use of the halogen chlorine as an antimicrobial agent is known in the art for its multiple mechanisms of microbial killing, thereby mitigating the spread of microorganisms such bacteria, fungi, viruses, parasites, and the like. For example, chlorine provided in the form of hypochlorite is often added to an aqueous solution (e.g., swimming pool water, hot tub water, treated waste water) as an antimicrobial agent, thereby mitigating the spread of such microorganisms (Gardiner, 1973). However, free chlorine in an aqueous solution is rapidly photodegraded by UV sunlight and/or high temperatures, and as such, chlorine stabilizers are necessarily added to the aqueous solution to mitigate such photochemical decomposition of the chlorine. Chlorine stabilizers such as cyanuric acids are therefore widely used in water treatment programs to mitigate photochemical decomposition of the free chlorine.

As an example, the introduction of chlorine into swimming pool water, hot tub water and the like may be in the form of trichloroisocyanuric acid (1,3,5-triazine-2,4,6-trione), which stabilizes the chlorine from light-catalyzed decomposition, and is therefore the standard mechanism for long-term protection of people in outdoor pools from the spread of infection. For example, cyanuric acid is a tribasic acid in which hydrogens may successively be replaced by positive (+1) chlorine ($Cl^+$), wherein in aqueous solutions there is a labile equilibrium among the various chlorinated derivatives (Brady et al., 1963), wherein up to fourteen (14) species of cyanuric acid and its chlorinated derivatives may be present in solution. A subsequent study of chloroisocyanurates used in the treatment of swimming pool water suggested that at relevant pH and chlorine concentrations found in swimming pools, three (3) species are likely most relevant (Gardiner, 1973). Furthermore, to maintain adequate chlorine disinfection in the aqueous solution, it becomes essential to remove cyanuric acid (CYA) when its concentration generally rises above 100 ppm. For example, the accepted CYA working range is generally above 40 ppm and below 100 ppm, i.e., due to the equilibrium between cyanuric acid and hypochlorite resulting in sequestration of most reactive (free) chlorine species (i.e., chlorine "lock") at high cyanuric acid concentrations.

Currently the most common and reliable method in the art to reduce high cyanuric acid levels in swimming pool water includes, at least partially, or completely emptying the pool water, and then refilling with clean water to remove the high levels of cyanuric acid. For example, the US Centers for Disease Control and Prevention (CDC) recently published an article related to controlling the spread of *Cryptosporidium* in swimming pools, wherein the CDC recommended the following steps for hyperchlorination when chlorine stabilizer (e.g., cyanuric acid) is present in the pool water: (a) using unstabilized chlorine, raise the water's free chlorine concentration and maintain water at pH 7.5 or less, and (b) hyperchlorinate the pool water; noting that the chlorine stabilizer slows the rate at which free chlorine inactivates or kills the *Cryptosporidium*, and the more chlorine stabilizer present in the water the longer it takes to kill the *Cryptosporidium*.

As noted by the CDC, if the cyanuric acid concentration is within 1-15 ppm, use unstabilized chlorine to (i) raise the free chlorine concentration to 20 ppm and maintain it for 28 hours; or (ii) raise the free chlorine concentration to 30 ppm and maintain it for 18 hours, or (iii) raise the free chlorine concentration to 40 ppm and maintain it for 8.5 hours. Additionally, the CDC notes that if the chlorine concentration is more than 15 ppm, one must first lower the cyanuric acid concentration to 1-15 ppm by partially or completely draining the water and adding fresh water without chlorine stabilizer before attempting to hyperchlorinate as described above.

However, it is generally understood and accepted in the art that such biological compositions and methods set forth above to remove cyanuric acid in swimming pool water (e.g., using immobilized cells, isolated enzymes, immobilized enzymes) provide less than satisfactory results, and as such, have not been adopted nor utilized in the relevant arts. For example, partially, or completely emptying the swimming pool water, and then refilling with clean water remains the industry standard for removing high levels of cyanuric acid. In contrast to the methods and compositions described above, Applicant of the instant disclosure has identified surprising and unexpected results related to the use cyanuric acid hydrolase enzymes to remove (remediate) cyanuric acid in an aqueous solution when its concentration is too high.

More particularly, as described hereinafter, the instant disclosure addresses unmet needs in the art related to cyanuric acid (CYA) remediation in aqueous liquids, including, but not limited to, methods and compositions for remediating cyanuric acid (CYA) in aqueous liquids comprising chlorine (hypochlorite), methods and compositions for mitigating chlorine inactivation of cyanuric acid hydrolase (CAH) enzymes in aqueous liquids comprising chlorine, methods and compositions for reducing the time (rate) needed to lower CYA concentrations in aqueous liquids comprising chlorine, methods and compositions for using reduced amounts of CAH enzyme in aqueous liquids comprising hypochlorite, formulations thereof, CYA remediation kits and the like.

SUMMARY OF THE INVENTION

As presented and exemplified herein, the instant disclosure is related to novel methods and compositions for remediating cyanuric acid concentrations in aqueous liquids comprising hypochlorite ($ClO^-$). In certain embodiments, the disclosure is therefore related methods for remediating cyanuric acid (CYA) in an aqueous liquid comprising hypochlorite, the methods generally comprising contacting the liquid with a reductant and a protein (enzyme) comprising cyanuric acid hydrolase (CAH) activity.

In certain embodiments of the methods, the liquid is simultaneously contacted with a reductant and an enzyme comprising CAH activity. In other embodiments, the liquid is first contacted with a reductant followed by contacting the liquid with an enzyme comprising CAH activity. In certain other embodiments, the aqueous liquid is first contacted with a reductant for a sufficient period of time to lower the free hypochlorite concentration in the liquid to about 0.5 ppm or less, followed by contacting the liquid with an enzyme comprising CAH activity.

In other embodiments of the methods, the liquid is first contacted with a reductant for a sufficient period of time to lower the free hypochlorite concentration to an undetectable level, followed by contacting the liquid with an enzyme comprising CAH activity. In certain embodiments of the methods, a sufficient period of time to lower the free hypochlorite concentration in the liquid is about six (6) to twenty-four (24) hours. In yet other embodiments of the methods, an enzyme comprising CAH activity is a solid enzyme or a liquid enzyme. In certain other embodiments, the methods further comprise a protein (enzyme) having biuret hydrolase (BH) activity, wherein the enzyme comprising BH activity is a solid enzyme or a liquid enzyme.

In other embodiments of the methods, an enzyme comprising CAH activity comprises about 50% amino acid sequence identity to an amino acid sequence selected from the group consisting of SEQ ID NO: 2, SEQ ID NO: 6, SEQ ID NO: 8, SEQ ID NO: 10 and SEQ ID NO: 12.

In other embodiments of the methods, an enzyme comprising CAH activity is obtained or derived from a microbial cell selected from the group consisting of *M. thermoacetica* cell, a *Bradyrhizobium diazoefficiens* cell, a *Bradyrhizobium* sp. cell, a *Pseudolabrys* sp. cell and an *Acidovorax citrulli* cell.

In other embodiments of the methods, an enzyme comprising CAH activity comprises an amino acid sequence of SEQ ID NO: 15 near the C-terminus.

In certain other embodiments of the methods, a reductant is selected from sulfate, sulfite, thiosulfate, sodium bisulfite, sodium metabisulfite, hydrogen peroxide, potassium iodide, iodate, ferrous iron (salts), copper, nickel, molybdenum, manganese (reduced salts), ascorbate, aldehydes, organosulfur compounds, poly-vinyl-pyrrolidone (PVP), vulcanized rubber and electrochemical reduction.

In other embodiments of the methods, the aqueous liquid is contacted with a molar equivalent of the reductant relative to the concentration of the hypochlorite in the aqueous liquid. In certain other embodiments, aqueous liquid is contacted with a 1.2:1 ratio of reductant/hypochlorite, a 1.4:1 ratio of reductant/hypochlorite, a 1.6:1 ratio of reductant/hypochlorite, a 1.8:1 ratio of reductant/hypochlorite or a 1:2 ratio of reductant/hypochlorite.

In other embodiments of the methods, an enzyme comprising CAH activity is a formulated granule and/or the enzyme comprising BH activity is a formulated granule. In certain embodiments, the granule comprises at least an outer core and an inner core of active enzyme or reagent. In certain other embodiments, wherein the inner core of the granule comprises an enzyme comprising CAH activity and/or BH activity, and the outer core comprises a reductant.

In certain other embodiments of the methods, the enzyme comprising CAH activity retains at least 25% or greater activity relative to the same CAH enzyme in the absence of reductant. In other embodiments, enzyme comprising CAH activity retains at least 50% or greater activity relative to the same CAH enzyme in the absence of reductant. In yet other embodiments, the enzyme comprising CAH activity retains at least 75% or greater activity relative to the same CAH enzyme in the absence of reductant.

In other embodiments, methods for remediating cyanuric acid (CYA) in an aqueous liquid comprising hypochlorite include (a) obtaining a sample of an aqueous liquid and determining the hypochlorite concentration and (b) contacting the aqueous liquid with an enzyme comprising CAH activity and a 1.2 molar equivalent of a reductant, wherein the reductant removes the hypochlorite and the enzyme comprising CAH activity remediates the CYA in the aqueous liquid. In certain embodiments, the methods further comprise an enzyme having BH activity.

Thus, in certain other embodiments, the disclosure is related to compositions for remediating cyanuric acid (CYA) in an aqueous liquid comprising hypochlorite. In certain embodiments, the disclosure is therefore related to compositions for remediating cyanuric acid (CYA) in an aqueous liquid comprising hypochlorite, wherein the compositions include a reductant and an enzyme comprising cyanuric acid hydrolase (CAH) activity. In certain embodiments, the compositions further comprise an enzyme comprising biuret hydrolase (BH) activity. In certain embodiments of the compositions, the liquid is simultaneously contacted with a reductant and an enzyme comprising CAH activity. In certain other embodiments of the compositions, the liquid is first contacted with a reductant followed by contacting the liquid with an enzyme comprising CAH activity. In other embodiments, the liquid is first contacted with a reductant for a sufficient period of time to lower the free hypochlorite concentration in the liquid to about 0.5 ppm, followed by contacting the liquid with an enzyme comprising CAH activity. In other embodiments, the liquid is first contacted with a reductant for a sufficient period of time to lower the free hypochlorite concentration to an undetectable level, followed by contacting the liquid with an enzyme comprising CAH activity. In another embodiment, a sufficient period of time to lower the free hypochlorite concentration in the liquid is about 12 to 24 hours.

In certain embodiments of the compositions, an enzyme comprising CAH activity is a solid enzyme or a liquid enzyme and/or an enzyme comprising BH activity is a solid enzyme or a liquid enzyme.

In other embodiments of the compositions, an enzyme comprising CAH activity comprises about 50% amino acid sequence identity to an amino acid sequence selected from the group consisting of SEQ ID NO: 2, SEQ ID NO: 6, SEQ ID NO: 8, SEQ ID NO: 10 and SEQ ID NO: 12. In another embodiment, an enzyme comprising CAH activity is obtained or derived from a cell selected from the group consisting of *M. thermoacetica* cell, a *Bradyrhizobium diazoefficiens* cell, a *Bradyrhizobium* sp. cell, a *Pseudolabrys* sp. cell and an *Acidovorax citrulli* cell.

In other embodiments of the compositions, an enzyme comprising CAH activity comprises an amino acid sequence of SEQ ID NO: 15 near the C-terminus.

In other embodiments of the compositions, a reductant includes, but is not limited to, sulfate, sulfite, thiosulfate, sodium bisulfite, sodium metabisulfite, hydrogen peroxide, iodide, iodate, potassium iodide, ferrous iron (salts), copper, nickel, molybdenum, manganese (reduced salts), ascorbate, aldehydes, organosulfur compounds, poly-vinyl-pyrrolidone (PVP), vulcanized rubber, and electrochemical reduction.

In another embodiment of the compositions, the aqueous liquid is contacted with a molar equivalent of the reductant relative to the concentration of the hypochlorite in the aqueous liquid. In certain other embodiments, the aqueous liquid is contacted with a 1.2:1 ratio of reductant/hypochlorite, a 1.4:1 ratio of reductant/hypochlorite, a 1.6:1 ratio of reductant/hypochlorite, a 1.8:1 ratio of reductant/hypochlorite or a 1:2 ratio of reductant/hypochlorite.

In other embodiments of the compositions, the enzyme comprising CAH activity is a formulated granule and/or the enzyme comprising BH activity is a formulated granule. In another embodiment, a granule comprises at least an outer core and an inner core of active enzyme or reagent. In certain embodiments, the inner core comprises an enzyme comprising CAH activity and/or BH activity and the outer core comprises a reductant.

In other embodiments of the compositions, the enzyme comprising CAH activity retains at least 25% or greater activity relative to the same CAH enzyme in the absence of reductant. In another embodiment, the enzyme comprising CAH activity retains at least 50% or greater activity relative to the same CAH enzyme in the absence of reductant. In other embodiments, the enzyme comprising CAH activity retains at least 75% or greater activity relative to the same CAH enzyme in the absence of reductant.

BRIEF DESCRIPTION OF THE BIOLOGICAL SEQUENCES

SEQ ID NO: 1 is a nucleic acid sequence encoding a *M. thermoacetica* (ATCC 39703) protein of SEQ ID NO: 2 comprising cyanuric acid hydrolase (CAH) activity.

SEQ ID NO: 2 is the amino acid sequence of the *M. thermoacetica* (ATCC 39703) protein comprising CAH activity.

SEQ ID NO: 3 is a nucleic acid sequence encoding a *M. thermoacetica* (ATCC 39703) C46A variant protein of SEQ ID NO: 4 comprising CAH activity.

SEQ ID NO: 4 is the amino acid sequence of the variant (C46A) *M. thermoacetica* protein comprising CAH activity.

SEQ ID NO: 5 a nucleic acid sequence encoding a *Bradyrhizobium diazoefficiens* (USDA 110) protein of SEQ ID NO: 6 comprising CAH activity, which nucleic acid sequence has been codon-optimized for expression in a *Bacillus* sp. host cell.

SEQ ID NO: 6 is the amino acid sequence of the *B. diazoefficiens* (strain USDA 110) protein comprising CAH activity.

SEQ ID NO: 7 is a nucleic acid sequence encoding a *Bradyrhizobium* sp. (WSM1253) protein of SEQ ID NO: 8 comprising CAH activity, which nucleic acid sequence has been codon-optimized for expression in a *Bacillus* sp. host cell.

SEQ ID NO: 8 is the amino acid sequence of the *Bradyrhizobium* sp. (WSM1253) protein comprising CAH activity.

SEQ ID NO: 9 is a nucleic acid sequence encoding a *Pseudolabrys* sp. (Root1462) protein of SEQ ID NO: 10 comprising CAH activity, which nucleic acid sequence has been codon-optimized for expression in a *Bacillus* sp. host cell.

SEQ ID NO: 10 is the amino acid sequence of the *Pseudolabrys* sp. (Root1462) protein comprising CAH activity.

SEQ ID NO: 11 is a nucleic acid sequence encoding a *Acidovorax citrulli* (122227) protein of SEQ ID NO: 12 comprising CAH activity, which nucleic acid sequence has been codon-optimized for expression in a *Bacillus* sp. host cell.

SEQ ID NO: 12 is the amino acid sequence of the *A. citrulli* (122227) protein comprising CAH activity.

SEQ ID NO: 13 is a nucleic acid sequence encoding a *Herbaspirillum* sp. (BH-1) biuret hydrolase (BH) of SEQ ID NO: 14, which nucleic acid sequence has been codon-optimized for expression in a *Herbaspirillum rubris* cell.

SEQ ID NO: 14 is the amino acid sequence of the *Herbaspirillum* sp. (BH-1) BH.

SEQ ID NO: 15 is an artificial amino acid (consensus) sequence.

Figure 3:
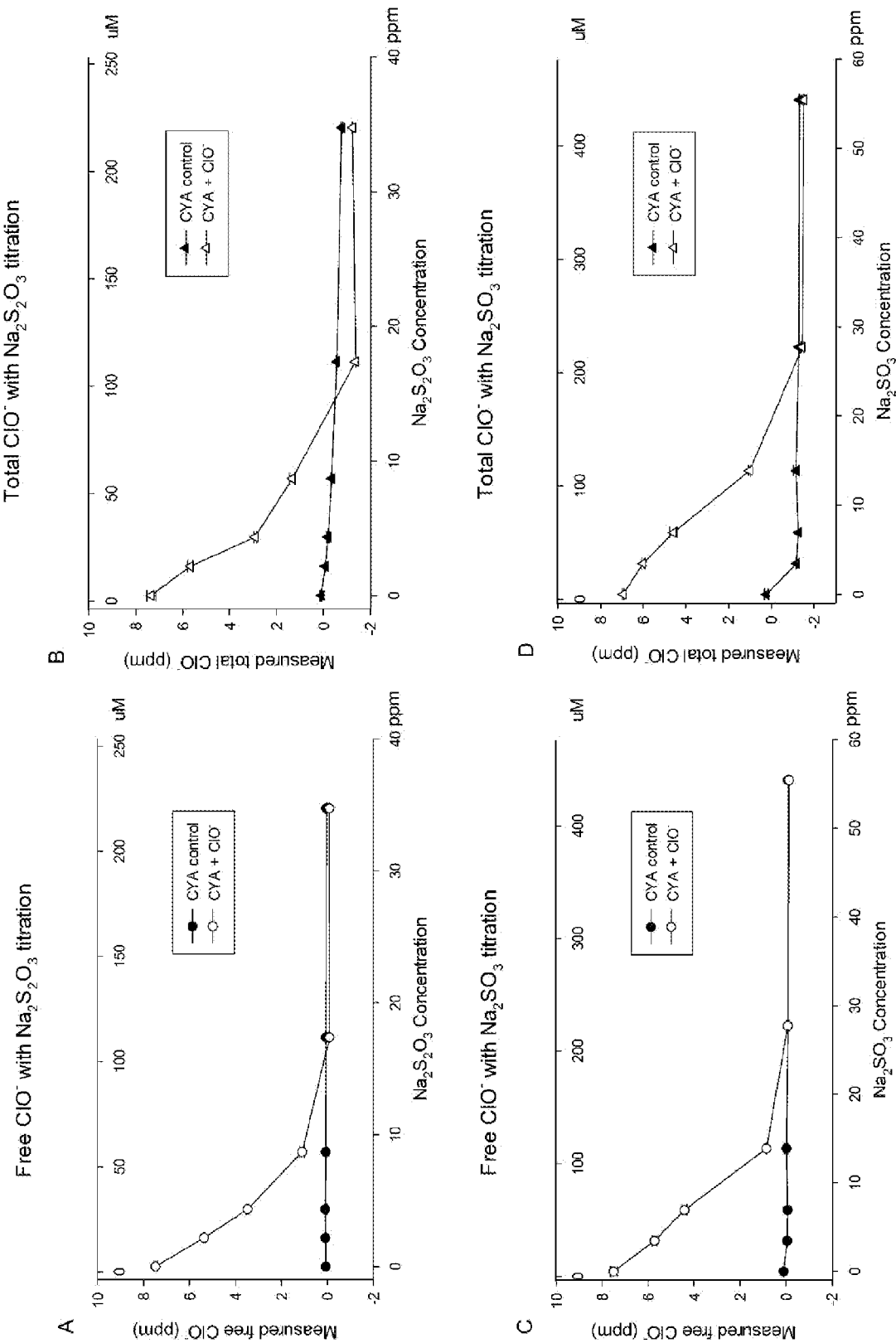

FIG. 3 shows the titration of hypochlorite (ClO$^-$) with sodium thiosulfate (Na$_2$S$_2$O$_3$) and sodium sulfite (Na$_2$SO$_3$). The simulated swimming pool water conditions used were as follows: 1 mM sodium bicarbonate (NaHCO$_3$; pH 7.33) with 200 ppm of cyanuric acid (CYA) and 5.72 ppm of hypochlorite (ClO$^-$). Samples were titrated with 0 ppm, 2.17 ppm, 4.34 ppm, 8.69 ppm, 17.38 ppm and 34.76 ppm of sodium thiosulfate (Na$_2$S$_2$O$_3$); and 200 ul of each sample was taken to measure the free ClO$^-$ (FIG. 3A) and total ClO$^-$ (FIG. 3B) by the modified DPD assay on 96-well plate (Corning 3641) with ClO$^-$ standard in H$_2$O. The same titration for sodium sulfite (Na$_2$SO$_3$) is shown in FIGS. 3C and 3D using; 0 ppm, 3.46 ppm, 6.93 ppm, 13.86 ppm, 27.72 ppm, and 55.44 ppm of sulfite.

Figure 4A:
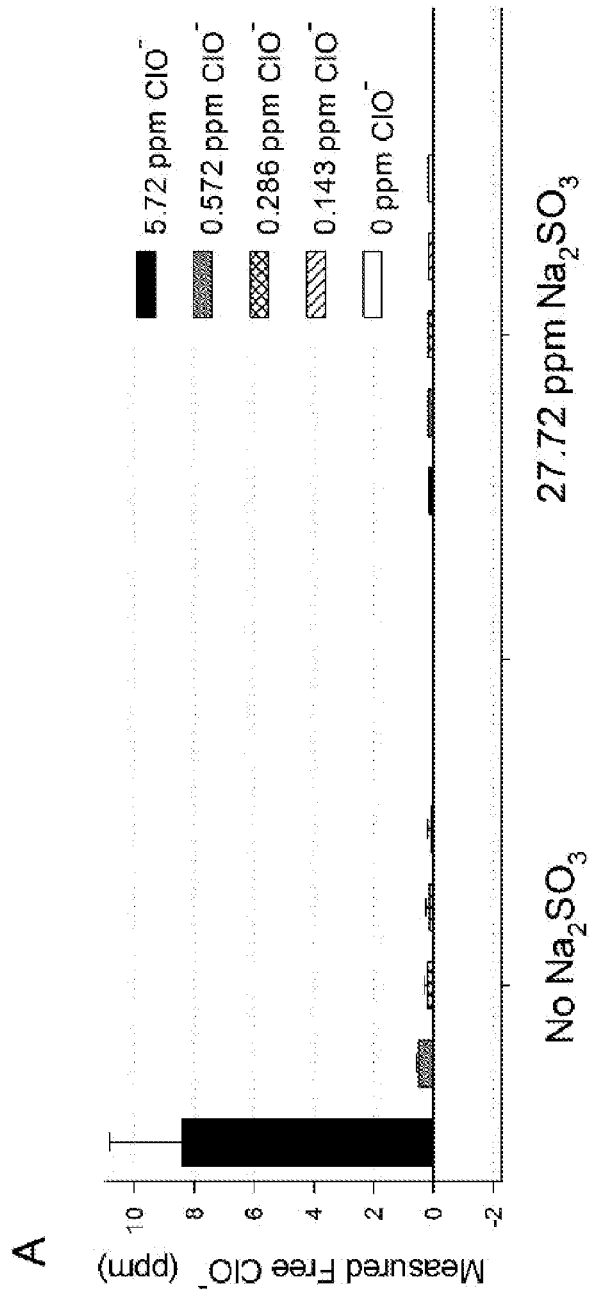
Figure 4B:
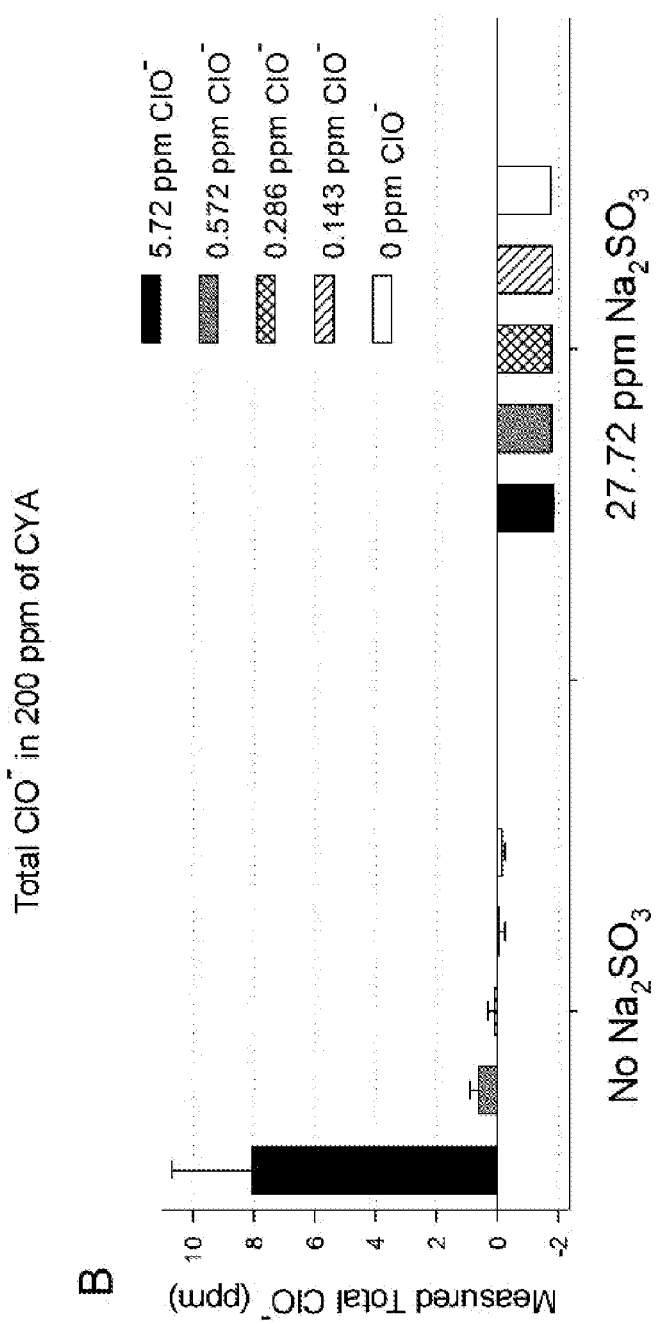

FIG. 4 shows the enzymatic activity of a CAH protein (SEQ ID NO: 6) incubated with 200 ppm cyanuric acid (CYA) in simulated swimming pool water, before and after hypochlorite (ClO$^-$) reduction with sodium sulfite (Na$_2$SO$_3$), For example, the free ClO$^-$ concentration was measured with and without sodium sulfite (Na$_2$SO$_3$), FIG. 4A and the total ClO$^-$ concentration was measured with and without sodium sulfite (Na$_2$SO$_3$), FIG. 4B The simulated swimming pool water conditions used were as follows: 1 mM sodium bicarbonate (NaHCO$_3$; pH 7.33) with 200 ppm of cyanuric acid (CYA) and 5.72 ppm of hypochlorite (ClO$^-$). The enzymatic activity of the CAH protein (SEQ ID NO: 6) was tested under the same concentrations of hypochlorite (ClO$^-$) and sodium sulfite (Na$_2$SO$_3$). As shown in FIG. 4C, 0.4 mg/L of the CAH (SEQ ID NO:6) was mixed (in 1 mL of the simulated pool water) to digest 200 ppm of cyanuric acid, in the presence of 27.72 ppm sodium sulfite (FIG. 4C, right data panel) or absence (0 ppm) sodium sulfite (FIG. 4C, left data panel), at the indicated hypochlorite ranges (0 ppm, 0.143 ppm, 0.286 ppm, 0.572 ppm and 5.72 ppm) and incubated at room temperature for seven (7) hours. As shown in FIG. 4C, the CAH protein (SEQ ID NO:6) was inactivated at all tested concentrations of hypochlorite (5.72 ppm to 0.143 ppm), wherein 27.72 ppm of reductant (Na$_2$SO$_3$) was sufficient to reduce 5.72 ppm of hypochlorite, wherein both free ClO$^-$ and total ClO$^-$ levels are close to, or below zero, as measured by the DPD assay. CAH protein SEQ ID: 10, was tested under the same conditions. As shown in FIG. 4D, 0.45 mg/L of the CAH (SEQ ID NO: 10) was mixed (in 1 mL of the simulated pool water) to digest 200 ppm of cyanuric acid, in the presence of 27.72 ppm sodium sulfite (FIG. 4D, right data panel) or absence (0 ppm) sodium sulfite (FIG. 4D, left data panel), at the indicated hypochlorite ranges (0 ppm, 0.143 ppm, 0.286 ppm, 0.572 ppm and 5.72 ppm) and incubated at room temperature for seven (7) hours. As shown in FIG. 4D, the CAH protein (SEQ ID NO: 10) was inactivated at all tested concentrations of hypochlorite (5.72 ppm to 0.143 ppm), wherein 27.72 ppm of reductant (Na$_2$SO$_3$) was sufficient to reduce 5.72 ppm of hypochlorite, wherein both free ClO$^-$ and total ClO$^-$ levels are close to, or below zero, as measured by the DPD assay.

Figure 5A:
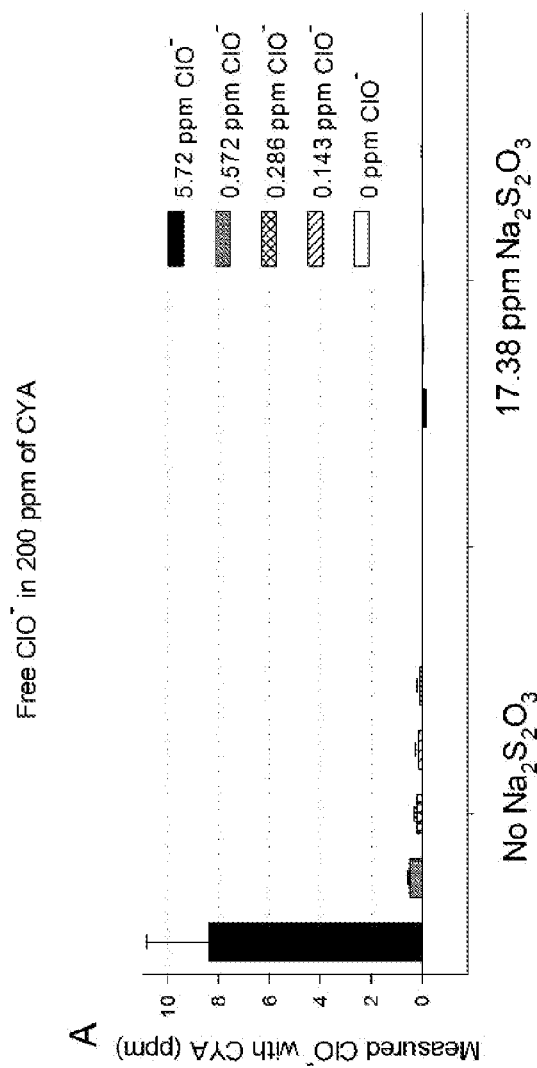
Figure 5B:
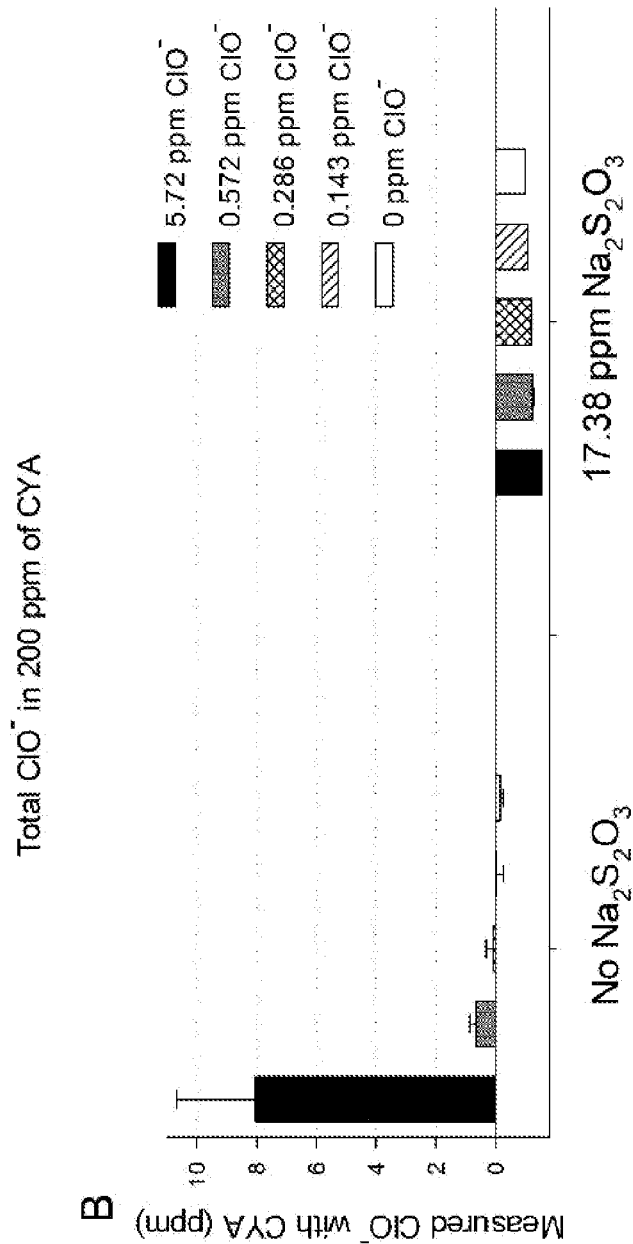
Figure 5C:
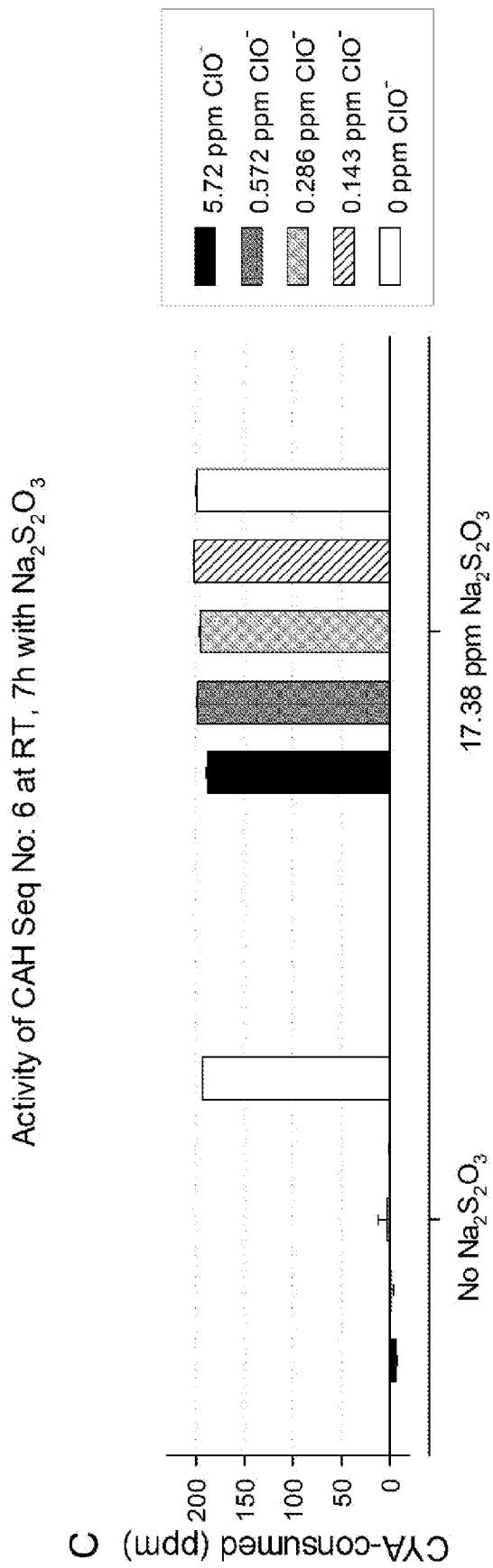

FIG. 5 shows the enzymatic activity of a CAH (SEQ ID NO: 6) incubated with 200 ppm cyanuric acid (CYA) in simulated swimming pool water, before and after hypochlorite (ClO$^-$) reduction with sodium thiosulfate (Na$_2$S$_2$O$_3$), FIG. 5A and the total ClO$^-$ concentration was measured with and without sodium thiosulfate (Na$_2$S$_2$O$_3$), FIG. 5B. The simulated swimming pool water conditions used were as follows: 1 mM sodium bicarbonate (NaHCO$_3$; pH 7.33) with 200 ppm of cyanuric acid (CYA) and 5.72 ppm of hypochlorite (ClO$^-$). FIG. 5C. For example, the free ClO$^-$ concentration was measured with and without sodium thiosulfate (Na$_2$S$_2$O$_3$). The enzymatic activity of the CAH (SEQ ID NO: 6) was tested under the same concentrations of hypochlorite (ClO$^-$) and sodium thiosulfate (Na$_2$S$_2$O$_3$). As shown in FIG. 5C, 0.4 mg/L of the CAH protein (SEQ ID NO:6) was mixed (in 1 mL of the simulated pool water) to digest 200 ppm of cyanuric acid, in the presence of 17.38 ppm sodium thiosulfate (FIG. 5C, right data panel) or absence (0 ppm) sodium thiosulfate (FIG. 5C, left data panel), at the indicated hypochlorite ranges (0 ppm, 0.143 ppm, 0.286 ppm, 0.572 ppm and 5.72 ppm) and incubated at room temperature for seven (7) hours. As shown in FIG. 5C, the CAH (SEQ ID NO:6) was inactivated at different concentrations of hypochlorite (5.72 ppm to 0.143 ppm), wherein 17.38 ppm of reductant (Na$_2$S$_2$O$_3$) was sufficient to reduce 5.72 ppm of hypochlorite, wherein both free ClO$^-$ and total ClO$^-$ levels are close to, or below zero, or below zero, as measured by the DPD assay.

Figure 6:
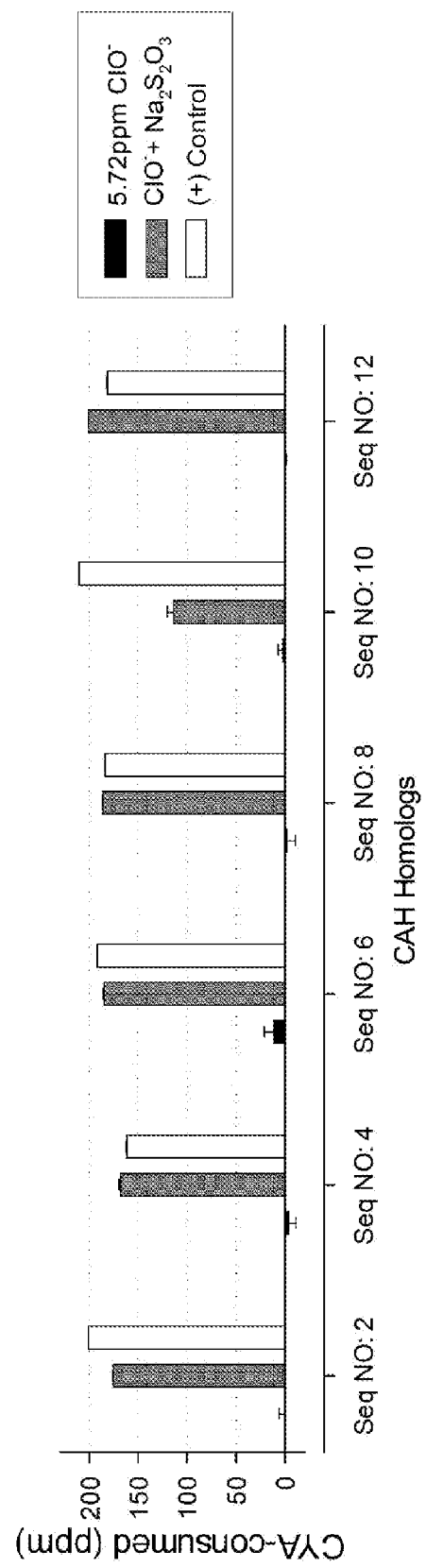

FIG. 6 shows the activity of CAH proteins in simulated swimming pool water containing 5.72 ppm ClO$^-$, before and after treating the water with thiosulfate. Six (6) different proteins comprising CAH activity were tested (i.e., SEQ ID NO: 2, SEQ ID NO: 4, SEQ ID NO: 6, SEQ ID NO: 8, SEQ ID NO: 10 and SEQ ID NO: 12). For example, 0.3-2.0 mg/L (protein concentrations were determined empirically to normalize the experimental results) of each indicated CAH protein was mixed (in the simulated pool water) to digest 200 ppm of cyanuric acid (CYA) and incubated at room temperature for 6-8.5 hours, under one of the following conditions: positive control (FIG. 6, white bars), 5.72 ppm hypochlorite (FIG. 6, black bars) or 5.72 ppm hypochlorite and 17.38 ppm of reductant, sodium thiosulfate (FIG. 6, grey bars). The positive (+) control includes the indicated CAH protein with no hypochlorite present.

Figure 7:
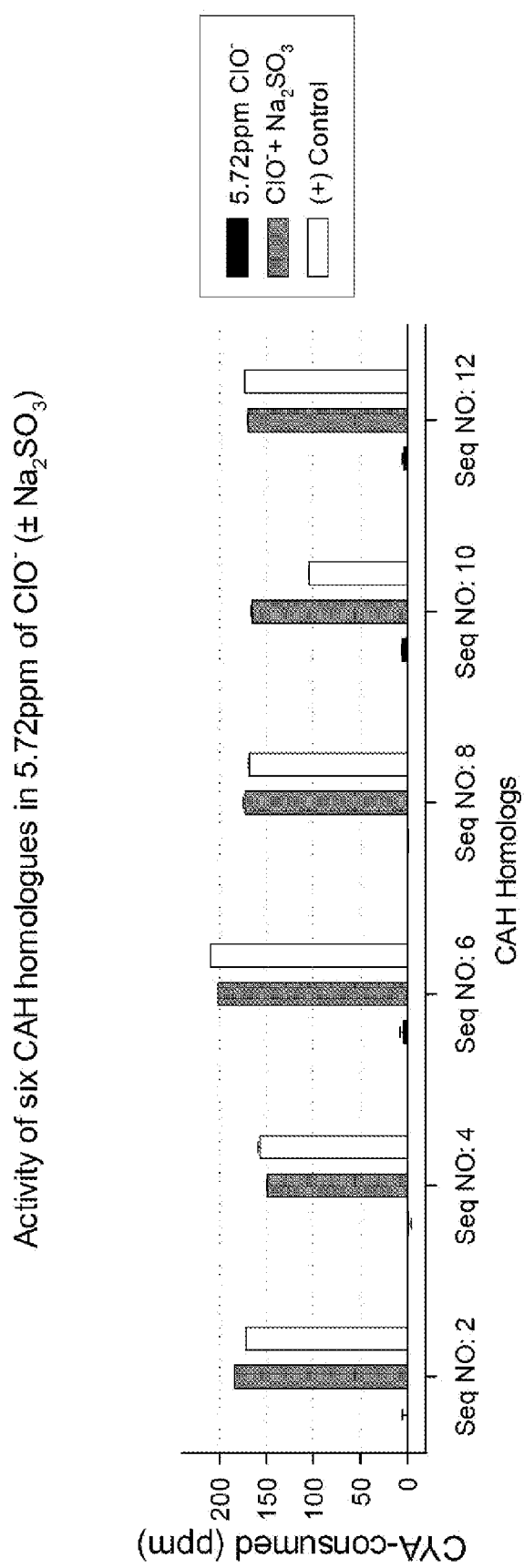

FIG. 7 shows the activity of CAH proteins in simulated swimming pool water containing 5.72 ppm ClO$^-$, before and after treating the water with sodium sulfite. Six (6) different proteins comprising CAH activity were tested (i.e., SEQ ID NO: 2, SEQ ID NO: 4, SEQ ID NO: 6, SEQ ID NO: 8, SEQ ID NO: 10 and SEQ ID NO: 12). For example, 0.3-2.0 mg/L (protein concentrations were determined empirically to normalize the experimental results) of each indicated CAH proteins was mixed (in the simulated pool water) to digest 200 ppm of cyanuric acid (CYA) and incubated at room temperature for 6-8.5 hours, under one of the following conditions: positive control (FIG. 7, white bars), 5.72 ppm hypochlorite (FIG. 7, black bars) or 5.72 ppm hypochlorite and 27.72 ppm of reductant, sodium sulfite (FIG. 7, grey bars). The positive (+) control includes the indicated CAH protein with no hypochlorite present.

Figure 8:
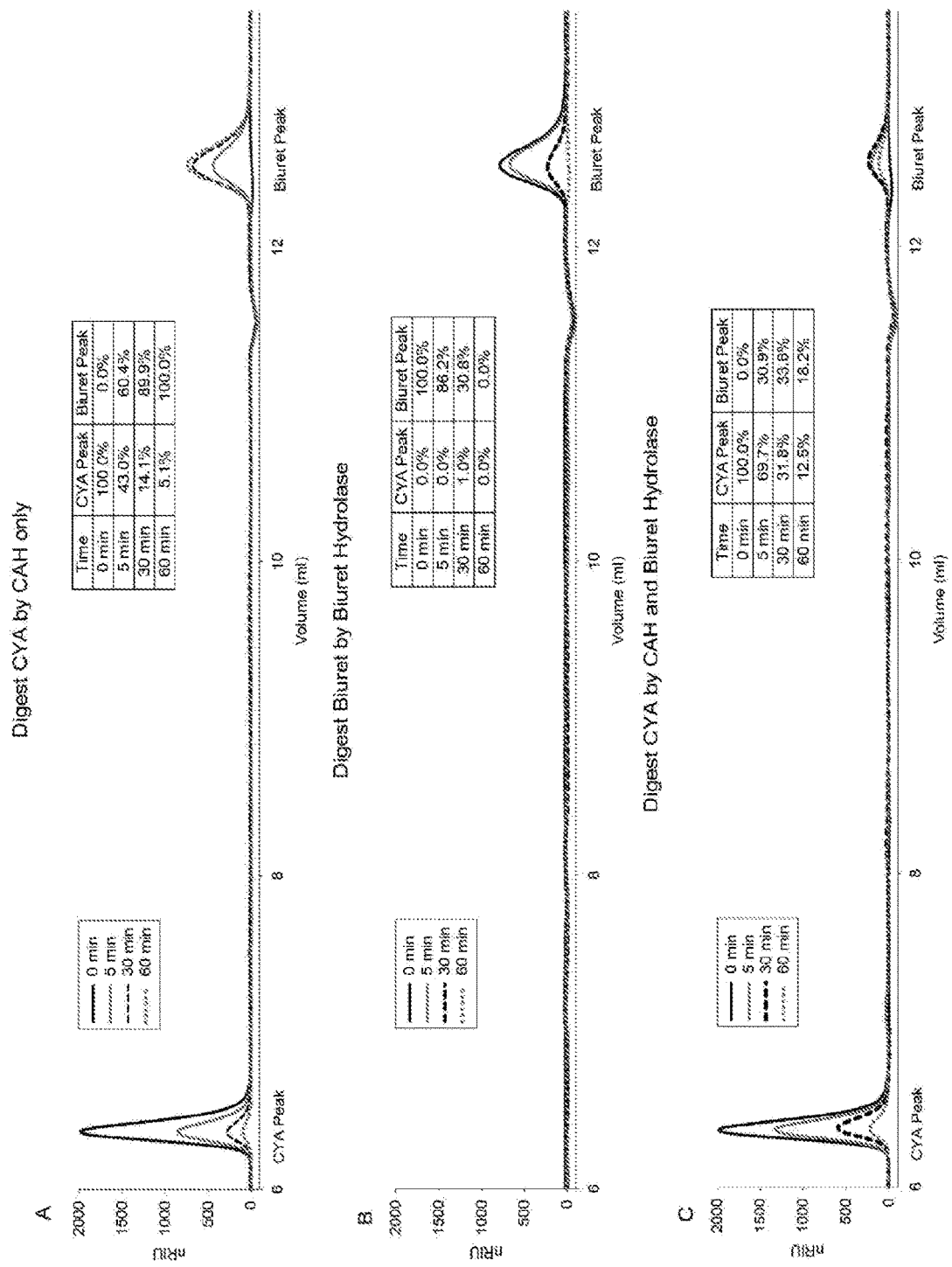

FIG. 8 shows the HPLC separation of CYA hydrolysis and products. FIG. 8A shows the HPLC separation of CYA hydrolyzed to biuret by a CAH protein (SEQ ID NO: 6), wherein 20 mg/L of CAH (SEQ ID NO: 6) was incubated with 200 ppm CYA at room temperature. FIG. 8B shows the HPLC separation of biuret hydrolysis by BH (SEQ ID NO: 14) (allophanic acid not shown). An empirically determined amount of BH was incubated with 160 ppm of biuret (i.e., the product of 200 ppm CYA) at room temperature. FIG. 8C shows the HPLC separation of CYA hydrolysis by both the CAH protein (SEQ ID NO: 6) and the BH protein (allophanic acid not shown), wherein 20 mg/L the CAH (SEQ ID NO: 6) and proper amount of the BH (SEQ ID NO: 14) were incubated with 200 ppm CYA at room temperature.

Figure 9:
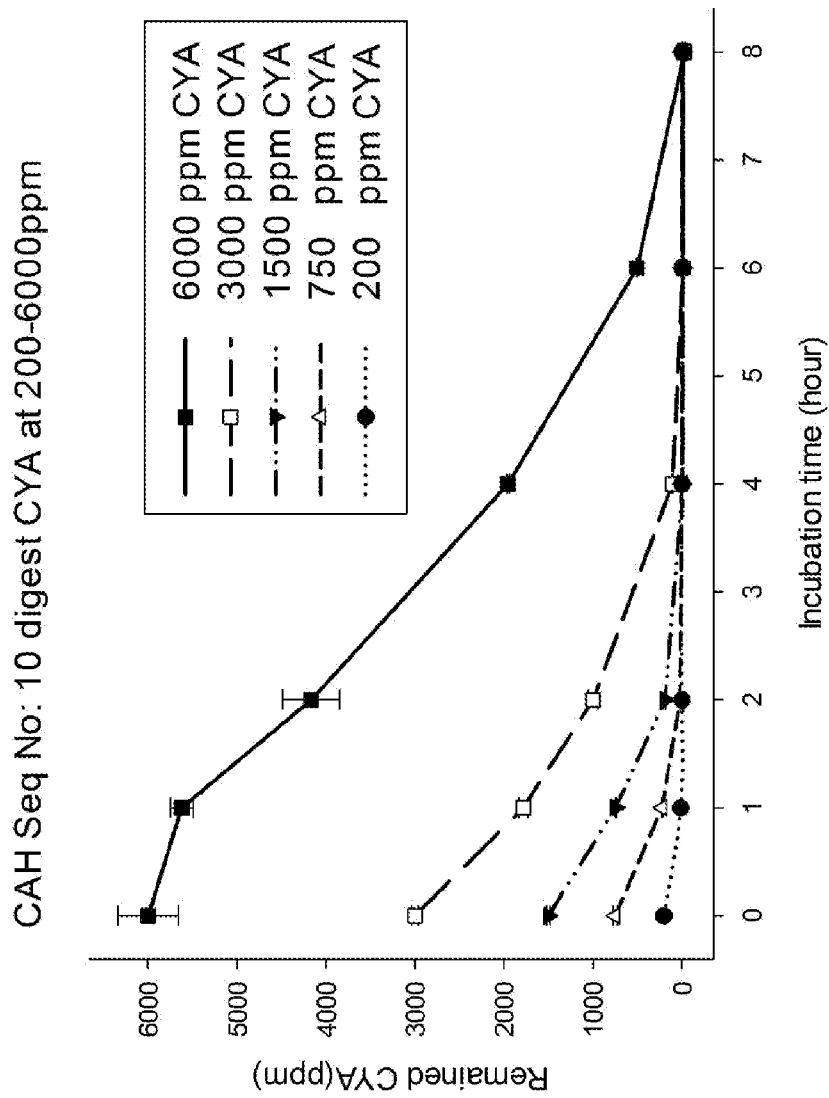

FIG. 9 shows the progress of CYA hydrolysis by CAH (SEQ ID NO: 10) at several CYA concentrations. The reactions all contained 7.5 mg/L of CAH SEQ ID NO: 10 with one (1) mL of CYA at 6,000 ppm, 3,000 ppm, 1,500 ppm, 750 ppm, and 200 ppm at room temperature. The reactions were terminated at the indicated times by addition of 5.72 ppm ClO$^-$, and frozen on dry-ice. All samples were thawed and diluted to about 200 ppm CYA for melamine assay to determine the remaining unhydrolyzed CYA.

FIG. 10 presents a conserved cyanuric acid hydrolase primary (1°) amino acid sequence (SEQ ID NO: 15) set forth and described below in Example 11. As shown in FIG. 10 (SEQ ID NO: 15), the amino acid "Xaa" in the first (1) position is a "Tyr" or "Phe", the amino acid "Xaa" in the second (2) position may be any amino acid, the amino acid "Xaa" in the sixth (6) position may be any amino acid, the amino acid "Xaa" in the eight (8) position is a "His" or "Asn", the amino acid "Xaa" in the twelfth (12) position may be any amino acid, and the amino acid "Xaa" in the six-tenth (16) position is a "Pro" or "Ser".

FIG. 11 shows the primary amino acid sequences of proteins empirically confirmed to comprise CAH activity and having an exact match to the full length consensus amino acid consensus sequence of SEQ ID NO: 15. For example, the C-terminal amino acid residues of these proteins comprising CAH activity are presented as bold underlined residues in FIG. 11, wherein these emphasized residues are an exact match to the full length consensus amino acid consensus sequence of SEQ ID NO: 15.

FIG. 12 shows the primary amino acid sequences of proteins which do not comprise CAH activity (e.g., see Example 11). As indicated in FIG. 12, the C-terminal residues of these proteins lacking CAH activity do not have an exact match to the full length consensus amino acid consensus sequence of SEQ ID NO: 15.

DETAILED DESCRIPTION

As presented and exemplified herein, the present disclosure addresses ongoing and unmet needs in the art related to cyanuric acid remediation in aqueous liquids. More particularly, certain embodiments of the disclosure are related to novel methods and compositions for reducing (remediating) cyanuric acid (CYA) concentrations in aqueous liquids comprising hypochlorite (ClO$^-$). Certain embodiments are related to reducing cyanuric acid concentrations in aqueous liquids comprising hypochlorite, wherein the CYA concentration thereof is reduced (remediated) using proteins (enzymes) comprising cyanuric acid hydrolase (CAH) activity, and optionally proteins (enzymes) comprising biuret hydrolase (BH) activity. Thus, certain embodiments are related to CYA remediation in aqueous liquids comprising hypochlorite, wherein the CYA is reduced/remediated using one or more proteins (enzymes) comprising cyanuric hydrolase (CAH) activity, and optionally one or more proteins (enzymes) comprising biuret hydrolase (BH) activity.

For example, as generally set forth and described hereinafter, Applicant performed simulated swimming pool water experiments to test/screen six (6) enzymes comprising CAH activity in the presence of hypochlorite (ClO$^-$), e.g., using hypochlorite concentration (ranges) typically found in swimming pool water disinfection processes, hot tub water disinfection processes and the like. More particularly, as set forth in the Examples Section below, it was surprisingly observed that the activity of all six (6) CAH (enzymes) tested/screened were significantly inactivated in the presence of (swimming pool) relevant concentrations of hypochlorite (FIG. 2B). Certain embodiments of the disclosure are therefore related to methods and compositions for mitigating hypochlorite inactivation of the proteins (enzymes) comprising CAH activity and/or BH activity. Certain embodiments are related to reducing compounds (reductants) for mitigating hypochlorite inactivation of proteins (enzymes) comprising CAH activity and/or BH activity. Thus, certain other embodiments are related to methods and compositions for enhancing CAH activity in aqueous liquids comprising hypochlorite, methods and compositions for reducing the amount of time needed to remediate cyanuric acid concentrations in aqueous liquids comprising hypochlorite, methods and compositions for using a reduced amount of a cyanuric acid hydrolase in an aqueous liquids comprising hypochlorite, formulations thereof, cyanuric acid remediation kits thereof and the like.

I. Definitions

Prior to describing the present compositions and methods in detail, the following terms are defined for clarity. Terms not defined should be accorded their ordinary meanings as used in the relevant art. Unless defined otherwise, all technical and scientific terms used herein have the same meaning as commonly understood by one of ordinary skill in the art to which the present compositions and methods apply.

Although any methods and materials similar or equivalent to those described herein can also be used in the practice or testing of the present compositions and methods, representative illustrative methods and materials are now described. All publications and patents cited herein are incorporated by reference in their entirety.

It is further noted that the claims may be drafted to exclude any optional element. As such, this statement is intended to serve as antecedent basis for use of such exclusive terminology as "solely," "only", "excluding", "not including" and the like, in connection with the recitation of claim elements, or use of a "negative" limitation or proviso thereof.

As will be apparent to those of skill in the art upon reading this disclosure, each of the individual embodiments described and illustrated herein has discrete components and features which may be readily separated from or combined with the features of any of the other several embodiments without departing from the scope or spirit of the present compositions and methods described herein. Any recited method can be carried out in the order of events recited, or in any other order which is logically possible.

As used herein, the terms "free chlorine" or "Cl" may be used interchangeably, and are used herein to describe the free (unbound) chlorine (Cl) in an aqueous liquid, a highly effective antimicrobial agent comprising a wide biocidal activity.

As used herein, the term "hypochlorous acid" may be abbreviated as "HOCl", and is known to be a strong oxidant.

As used herein, the terms "hypochlorite" or "hypochlorite ion" may be abbreviated as "ClO$^-$", and is known to be a strong oxidant, at concentration ranges typically used in swimming pool disinfection processes, hot tub disinfection processes, waste water treatment process and the like.

As used herein, the phrases "hypochlorite concentration ranges typically used in swimming pool disinfection processes" and "hypochlorite concentration ranges typically used in hot tub disinfection processes", generally refer to hypochlorite concentration ranges between about 1 ppm to about 5 ppm.

As used herein, the term "undetectable level(s)" as used in phrases such as contacting an aqueous liquid with a reductant to mitigate or reduce the hypochlorite concentration to "undetectable levels", the "undetectable levels" hypochlorite levels are with respect to general dipstick or DPD drop test equipment and methods of detection thereof known in the art.

In certain embodiments, free chlorine (e.g., as derived from the $^-OCl$ ion) may added or introduced into an aqueous liquid in the form of hypochlorous acid (HOCl) or hypochlorite salt, such as sodium hypochlorite (NaOCl), calcium hypochlorite $(Ca)(OCl)_2$ and the like.

As used herein, the terms "1,3,5-Triazine-2,4,6-trione" and "cyanuric acid" are used interchangeably.

Figure 1A:
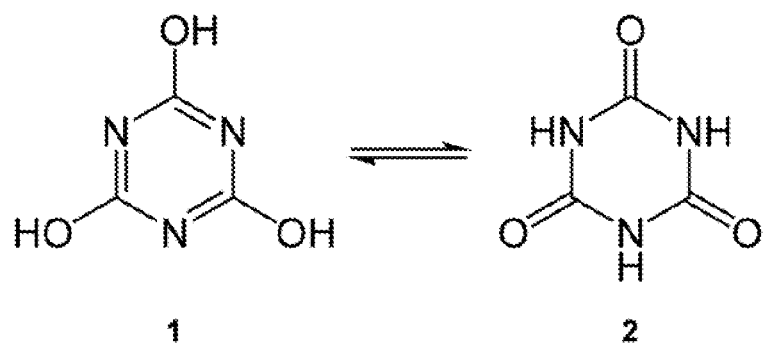
FIG. 1 presents the chemical structures of cyanuric acid (triol/trione) tautomers (FIG. 1A), 1,3,5-Trichloro-1,3,5-triazinane-2,4,6-trione or "Trichlor" (FIG. 1B), 1,3-dichloro-1,3,5-triazinane-2,4,6-trione or "Dichlor" (FIG. 1C) and a schematic diagram of the enzymatic hydrolysis (e.g., AtzD) of cyanuric acid to biuret (FIG. 1D). As presented in FIG. 1A, the cyanuric (triol) is labeled 1 and the isocyanuric (trione) is labeled 2. As presented in FIG. 1D, cyanuric acid is shown on the left of the arrow, the cyanuric acid hydrolase (CAH; above the arrow) and the biuret product is shown on the right of the arrow. As presented in FIG. 1E, biuret is shown on the left of the arrow, the biuret hydrolase (BH; above the arrow) and the allophonate product is shown on the right of the arrow.

As used herein, the term "cyanuric acid" (abbreviated hereinafter, "CYA") collectively refers to either of the CYA tautomers presented in FIG. 1A. For example, as shown in FIG. 1A, the cyanuric (triol) is labeled 1 and the isocyanuric (trione) is labeled 2. Thus, as used herein, the CYA tautomers shown in FIG. 1A may collectively be abbreviated as "$C_3N_3O_3$" or simply "CYA".

Figure 1B:
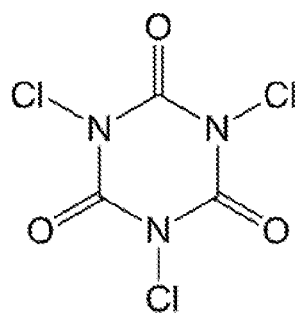

As used herein, the terms "1,3,5-Trichloro-1,3,5-triazinane-2,4,6-trione", "Trichloroisocyanuric acid" and "Trichlor" are used interchangeably, and refer to the structure shown in FIG. 1B.

Figure 1C:
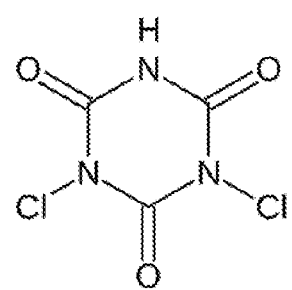

As used herein, the terms "1,3-dichloro-1,3,5-triazinane-2,4,6-trione", "Dichloroisocyanuric acid" and "Dichlor" are used interchangeably, and refer to the structure shown in FIG. 1C.

As used herein, "unstabilized chlorine" refers to chlorine (Cl), hypochlorous acid (HOCl), hypochlorite (ClO$^-$), or salts thereof such as sodium hypochlorite (NaOCl); calcium hypochlorite $(Ca(OCl)_2)$, and the like. As used herein, "unstabilized chlorine" is further described as unbound (free) chlorine susceptible to rapid photo (uv) degradation and/or heat degradation.

As used herein, "stabilized chlorine" refers to chlorine (Cl) bound to cyanuric acid (CYA).

Figure 1D:
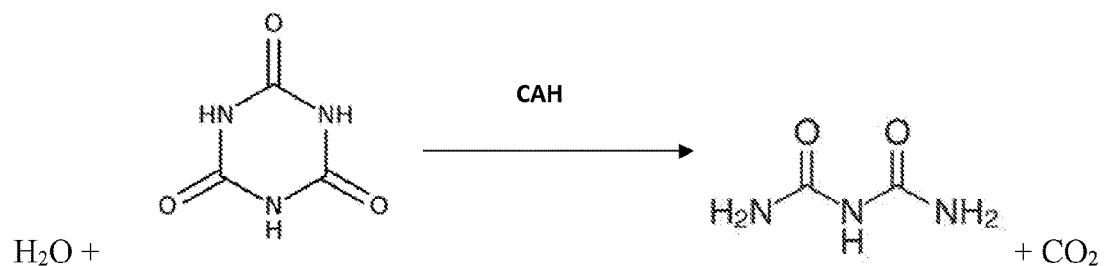

As used herein, the term "cyanuric acid hydrolase" may be abbreviated as "CAH", and includes, but is not limited to, any protein (i.e., enzyme) comprising cyanuric acid hydrolase activity (e.g., see, Table 1). In certain embodiments, a CAH comprises Enzyme Commission Number EC 3.5.2.15 and catalyzes the breakdown of $CYA+H_2O$ to biuret+$CO_2$ (e.g., see FIG. 1D). In certain embodiments, a gene (or ORF) encoding an enzyme comprising CAH activity is derived or obtained from a microbial cell, including, but not limited to, a *Moorella thermoacetica* cell, *Bradyrhizobium diazoefficiens* cell, a *Bradyrhizobium* sp. cell, a *Pseudolabrys* sp. cell and an *Acidovorax citrulli* cell.

As noted herein, a "*Bradyrhizobium diazoefficiens*" as used herein was originally named "*Bradyrhizobium japonicum* (USDA 110)" (Sugawara et al., 2017).

As used herein, a "*Moorella thermoacetica* (C46A) variant" comprises a mutated gene (SEQ ID NO: 3) encoding a variant cyanuric acid hydrolase (SEQ ID NO: 4) comprising a cysteine to alanine substitution at amino acid position 46 (SEQ ID NO: 4).

Figure 1E:
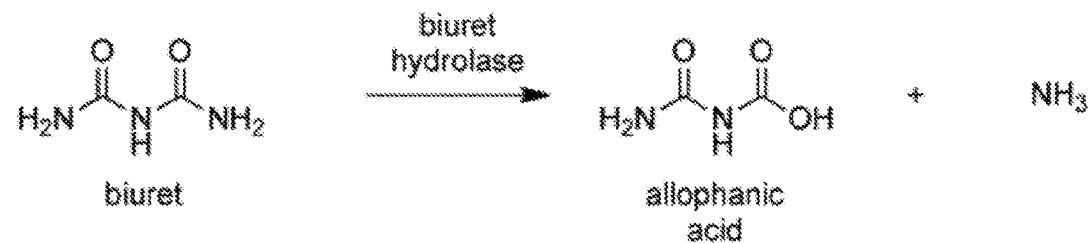

As used herein, the term "biuret hydrolase" may be abbreviated as "BH", and includes, but is not limited to, any protein (i.e., enzyme) comprising biuret hydrolase activity. In certain embodiments, a BH comprises Enzyme Commission Number EC 3.5.1.84 and catalyzes the breakdown of biuret+$H_2O$ to allophonate+$NH_3$ (e.g., see, FIG. 1E).

As used herein, a parental *Moorella thermoacetica* cell named "*M. thermoacetica*" comprises an endogenous gene (SEQ ID NO: 1) encoding a native cyanuric acid hydrolase (SEQ ID NO: 2), a parental *Bradyrhizobium diazoefficiens* cell named "*B. diazoefficiens*" comprises an endogenous gene (SEQ ID NO: 5) encoding a native cyanuric acid hydrolase (SEQ ID NO: 6), a parental *Bradyrhizobium* sp. cell named "*Bradyrhizobium* sp. (strain WSM1253)" comprises an endogenous gene (SEQ ID NO: 7) encoding a native cyanuric acid hydrolase (SEQ ID NO: 8), a parental *Pseudolabrys* sp. cell named "*Pseudolabrys* sp. (strain Root1462)" comprises an endogenous gene (SEQ ID NO: 9) encoding a native cyanuric acid hydrolase (SEQ ID NO: 10) and a parental *Acidovorax citrulli* cell named "*A. citrulli* (strain 122227)" comprises an endogenous gene (SEQ ID NO: 11) encoding a native cyanuric acid hydrolase (SEQ ID NO: 12).

As used herein, the term "contacting" as used in phrases such as "contacting an aqueous liquid", "contacting pool water" and the like, is not meant to be limiting. Thus, as used herein, the term "contacting" includes any means of administering or dispensing one or more molecules of the disclosure (e.g., enzymes, reducing agents, cyanuric acid, hypochlorite, hypochlorous acid, etc.).

As used herein, the term "circulating reservoir" refers to a structure for holding a relatively large amount of water. More particularly, given the large volume of water in such circulating reservoirs, it is highly desirable that the water does not have to be replaced after every use, and more preferably that the water does not have to be replaced all. In general, to maintain the water in a circulating reservoir (e.g. swimming pool water), the water is typically pumped or otherwise circulated in the reservoir (e.g., through a filtration system, etc.).

As used herein, a "swimming pool", a "hot tub" and the like may be referred to as a "circulating reservoir", wherein the reservoir water is circulated by means of water pumping systems and the like. More particularly, for the reservoir water to remain clean and clear, the entire (total) volume of the water must be completely filtered at least once a day, which is referred to in the art as the "turnover rate". In general, most swimming pool and hot tub water pumps have a one (1) day turnover rate or less (e.g., 16 hours, 12 hours, 8 hours). For example, the equation "total water volume (gallons) divided by turn over time (hours)" may be used to estimate water pump flow rate needed to completely circulate (turn over) the water in the reservoir in the given amount of turn over time. As an example, to determine a water pump flow rate (gallons per hour; GPH) needed to completely circulate (turn over) the water in a 10,000 gallons swimming pool in a eight (8) hour period of time, the total volume of the water (10,000 gallons) is divided by desired turn over time (8 hours) yielding a flow rate of 1,250 GPH needed to turn over the water in an eight (8) hour period of time, to completely circulate (turn over) the water in a 10,000 gallons swimming pool in a twelve (12) hour period of time, the volume of the water (10,000 gallons) is divided by twelve (12), yielding a flow rate of 833 GPH, and to completely circulate (turn over) the water in a 10,000 gallons swimming pool in a twenty-four (24) hour period of time, the volume of the water (10,000 gallons) is divided by twenty-four (24), yielding a flow rate of 416 GPH.

As used herein, phrases such as "contacting water" in circulating reservoir with an enzyme and/or a reductant, "contacting swimming pool water" with an enzyme and/or a reductant, and "contacting hot tub water" with an enzyme and/or a reductant, "contacting the water" includes mixing/ distributing the enzyme(s) and/or reductant(s) via the circulating reservoir's water pumping systems and the like.

As used herein, the terms "reductant(s)" and "reducing agent(s)" refer to molecules which can react with hypochlorite ($ClO^-$) to reduce its redox potential. For example, an aqueous liquid comprising hypochlorite ($ClO^-$) is contacted with a "reductant" to remove (mitigate) residual hypochlorite ($ClO^-$) present in the aqueous liquid (e.g., swimming pool water). Non-limiting examples of suitable reductants include, thiosulfate and sulfite (e.g., standard chemicals used in recreational water treatment). However, the use of thiosulfate or sulfite should not be construed as limiting, as variety of reductants are known in the art and are suitable for use herein (e.g., to react with hypochlorite ($ClO^-$) to reduce its redox potential). For example, suitable reducing agents include, but are not limited to inorganic molecules such as thiosulfate, sulfite, sodium bisulfite, sodium metabisulfite, hydrogen peroxide, potassium iodide, iodate, ferrous iron salts, copper, nickel, molybdenum, manganese (reduced salts); organic molecules such as ascorbate, certain aldehydes and organosulfur compounds; polymers such as polyvinylpyrrolidone (PVP), vulcanized rubber, electrochemical reduction and the like.

As used herein, the term "sufficient period of time" as used in phrases such as a "sufficient period of time to lower the free chlorine (Cl) concentration" in an aqueous liquid, a "sufficient period of time to lower the hypochlorite ($ClO^-$) concentration" in an aqueous liquid", a "sufficient period of time" to lower a concentration is between about four (4) hours to about twenty-four (24) hours (e.g., about 3.5 to 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 23 hours, 24 hours). For example, in certain embodiments an aqueous liquid comprising hypochlorite is contacted with a reductant for a sufficient period of time lower the free chlorine/hypochlorite concentration (in the aqueous liquid), wherein a sufficient period of time is the amount of time needed to circulate (turn over) the entire volume of water in the reservoir. For example, contacting the aqueous liquid with a reductant for a sufficient period of time to completely circulate (turn over) the entire volume of water in the reservoir (e.g., swimming pool water) ensures that all of the hypochlorite present in the water has been sufficiently mixed for reaction with the reductant.

In certain embodiments, a sufficient period of time to lower the hypochlorite concentration in an aqueous liquid is less than about six (6) hours, wherein the sufficient period of time is reduced (e.g., less than about 5.5 hours, 5.0 hours, 4.0 hours, 3.0 hours or less than 2.5 hours) by employing a second (auxiliary circulating) pumping system to increase the rate of mixing the enzyme(s) and/or reductant(s) in the aqueous liquid.

As used herein, the term "organic burden" refers to an organic molecule in an aqueous liquid. More particularly, as used herein, an "organic burden" includes any organic molecule in an aqueous liquid at a concentration which supports the growth of a microorganism. Stated another way, an "organic burden" in an aqueous liquid (e.g., swimming pool water) is not desirable, as it may further exacerbate the growth of unwanted microorganisms in such aqueous liquids. Examples of an organic burden include, but are not limited to, organic molecules such as carbohydrates, lipids, phosphates, oxidizable carbons and the like.

As used herein, proteins (enzymes) of the disclosure (e.g., comprising CAH activity, biuret hydrolase (BH) activity, and the like) may be in the form of a solid or a liquid.

In certain embodiments, enzymes comprising CAH activity are conjugated to a protective functional group, wherein the enzyme-conjugate remains soluble in water.

As used herein, the terms "wild-type" and "native" are used interchangeably and refer to genes, promoters, proteins, protein mixes, cells or strains, as found in nature.

As used herein, the terms "polypeptide" and "protein" are used interchangeably, and refer to polymers of any length comprising amino acid residues linked by peptide bonds. The conventional one (1) letter or three (3) letter codes for amino acid residues are used herein. The polypeptide may be linear or branched, it may comprise modified amino acids, and it may be interrupted by non-amino acids. The term polypeptide also encompasses an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art.

As used herein, a "variant polypeptide" refers to a polypeptide that is derived from a parent (or reference) polypeptide by the substitution, addition, or deletion of one or more amino acids, typically by recombinant DNA techniques. Variant polypeptides may differ from a parent polypeptide by a small number of amino acid residues and may be defined by their level of primary amino acid sequence homology/identity with a parent (reference) polypeptide.

As used herein, in the context of a polypeptide or a sequence thereof, the term "substitution" means the replacement (i.e., substitution) of one amino acid with another amino acid.

As defined herein, an "endogenous gene" refers to a gene in its natural location in the genome of an organism, wherein an endogenous gene encodes an endogenous protein thereof.

As defined herein, a "heterologous" gene, or a "foreign" gene refer to a gene (or ORF) not normally found in the host organism, but that is introduced into the host organism by gene transfer. As used herein, the term "foreign" gene(s) comprise native genes (or ORFs) inserted into a non-native organism and/or chimeric genes inserted into a native or non-native organism.

The term "derived" encompasses the terms "originated" "obtained," "obtainable," and "created," and generally indicates that one specified material or composition finds its origin in another specified material or composition, or has features that can be described with reference to the another specified material or composition.

As used herein, the term "homology" relates to homologous polynucleotides or polypeptides. If two or more polynucleotides or two or more polypeptides are homologous, this means that the homologous polynucleotides or polypeptides have a "degree of identity" of at least 45%, at least 50%, at least 60%, at least 70%, at least 85%, at least 90%, at least 95%, and at least 98%. Whether two polynucleotide or polypeptide sequences have a sufficiently high degree of identity to be homologous as defined herein, can suitably be investigated by aligning the two sequences using a computer program known in the art, such as "GAP" provided in the GCG program package (Program Manual for the Wisconsin Package, Version 8, August 1994, Genetics Computer Group, 575 Science Drive, Madison, Wis., USA 53711) (Needleman and Wunsch, (1970). Using GAP with the following settings for DNA sequence comparison: GAP creation penalty of 5.0 and GAP extension penalty of 0.3.

As used herein, the term "percent (%) identity" refers to the level of nucleic acid or amino acid sequence identity between the nucleic acid sequences that encode a polypeptide or the polypeptide's amino acid sequences, when aligned using a sequence alignment program.

As defined herein, the terms "purified", "isolated" or "enriched" are meant that a biomolecule (e.g., a polypeptide, a polynucleotide) is altered from its natural state by virtue of separating it from some, or all of, the naturally occurring constituents with which it is associated in nature. Such isolation or purification may be accomplished by art-recognized separation techniques such as ion exchange chromatography, affinity chromatography, hydrophobic separation, dialysis, protease treatment, ammonium sulphate precipitation or other protein salt precipitation, centrifugation, size exclusion chromatography, filtration, microfiltration, gel electrophoresis or separation on a gradient to remove whole cells, cell debris, impurities, extraneous proteins, or enzymes undesired in the final composition. It is further possible to then add constituents to a purified or isolated biomolecule composition which provide additional benefits, for example, activating agents, quenching agents, anti-inhibition agents, desirable ions, compounds to control pH or other enzymes or chemicals.

As used herein, "homologous genes" refers to a pair of genes from different, but usually related species, which correspond to each other and which are identical or very similar to each other. The term encompasses genes that are separated by speciation (i.e., the development of new species) (e.g., orthologous genes), as well as genes that have been separated by genetic duplication (e.g., paralogous genes).

II. Aqueous Liquids Comprising Hypochlorous Acid, Hypochlorite and Cyanuric Acid As briefly described in the Background above, use of the halogen chlorine as an antimicrobial agent is known in the art for its multiple mechanisms of microbial killing, thereby mitigating the spread of microorganisms such bacteria, fungi, viruses, parasites, and the like (Brady et al., 1963; Gardiner, 1973). For example, when used as an antimicrobial agent in aqueous liquids such as swimming pool water, chlorine is often introduced into the water in the form of hypochlorous acid (HOCl; or a salt thereof, NaOCl), which dissociates into the hypochlorite (ClO$^-$) anion, shown in Scheme 1.

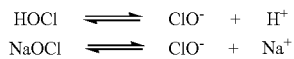

Scheme 1

Likewise, in order to mitigate the otherwise rapid photo degradation of the hypochlorite (ClO$^-$) in the water, chlorine stabilizers such as cyanuric acid (see, FIG. 1A-1C) are introduced into the water, thereby significantly slowing the chlorine/hypochlorite degradation process. For example, Trichloroisocyanuric acid (FIG. 1B) and Dichloroisocyanuric acid (FIG. 1C) are typical chlorinated cyanuric acid stabilizers introduced into the water to slow the chlorine/hypochlorite degradation process described above (i.e., thereby extending the chlorine "disinfection" properties in the water). Thus, to maintain proper chlorine levels for effective water disinfection processes (and slow the Cl degradation process), a balance must be struck between the level of cyanuric acid stabilizers in the water relative to the amount of free (unbound) chlorine in the water.

Addition of cyanuric acid (stabilizers) to the pool water slows the degradation process, but the chlorine still degrades over time and must be replenished continuously throughout the pool water operational period. Likewise, since the most common and convenient means of introducing and replenishing chlorine in the water is in the form of cyanuric acid (CYA) and derivatives thereof (FIG. 1), the level of the CYA stabilizer keeps rising with each cycle of chlorine replenishment. This scenario eventually results in the over stabilization of the chlorine (i.e., "chlorine lock"), with concomitant loss of chlorine disinfection properties in the water. For example, the over stabilization of chlorine, also referred to as "chlorine lock", generally occurs when the concentration of CYA (a stable and persistent compound), reaches over 100 ppm (parts per million, corresponding to an approximate 0.77 mM concentration), and its presence in this range signifies that the water (i.e., due to chlorine lock) is no longer safe for its original use.

Certain other methods described to remove (remediate) cyanuric acid in an aqueous solution when its concentration is too high include adding melamine to the water to cause the melamine cyanurate to precipitate and subsequently removing the precipitated melamine cyanurate from the pool water (U.S. Patent Publication No. US2013/0186837).

Certain other biological methods described in the art to remove (remediate) cyanuric acid in an aqueous solution when its concentration is too high include the use of immobilized whole cells expressing an endogenous cyanuric acid hydrolase (PCT Publication No. WO2017/021966; U.S. Patent Publication No. US2018/0257963). Certain other biological methods described in the art to remove (remediate) cyanuric acid in an aqueous solution when its concentration is too high include the use isolated cyanuric acid hydrolase enzymes (PCT Publication No. WO2007/107981; PCT Publication No. WO2016/141026; Seffernik et al., 2012). Thus, as briefly described above, although certain biological and enzymatic means of reducing CYA concentrations in aqueous liquids such as swimming pool water have been described, the current state of the art for removing high concentrations of cyanuric acid (e.g., >50 ppm CYA) continues to be partial or complete draining of the water and subsequently replacing with clean water.

More particularly, as described below, Applicant performed simulated swimming pool water experiments to test/screen enzymes comprising CAH activity in the presence of hypochlorite (ClO$^-$), (e.g., using (ClO$^-$) concentration (ranges) observed in swimming pool water disinfection processes, hot tub water disinfection processes and the like).

III. Screening Cyanuric Acid Hydrolase Activity in Simulated Swimming Pool Water Conditions As generally set forth below in the Examples section, Applicant tested/screened six (6) different proteins comprising CAH activity (e.g., SEQ ID NO: 2, SEQ ID NO: 4, SEQ ID NO: 6, SEQ ID NO: 8, SEQ ID NO: 10 and SEQ ID NO: 12) for sensitivity to hypochlorite. As further set forth below in Section IV, the CAH proteins (enzymes) tested/screened comprise a high degree of amino acid sequence diversity (see, TABLE 1, Section IV). For example, the experimental tests described herein were designed to simulate a swimming pool treatment process, and as such, the experiments were performed in the presence of hypochlorite (ClO⁻) concentration ranges typically found in chlorinated swimming pool water.

Figure 2A:
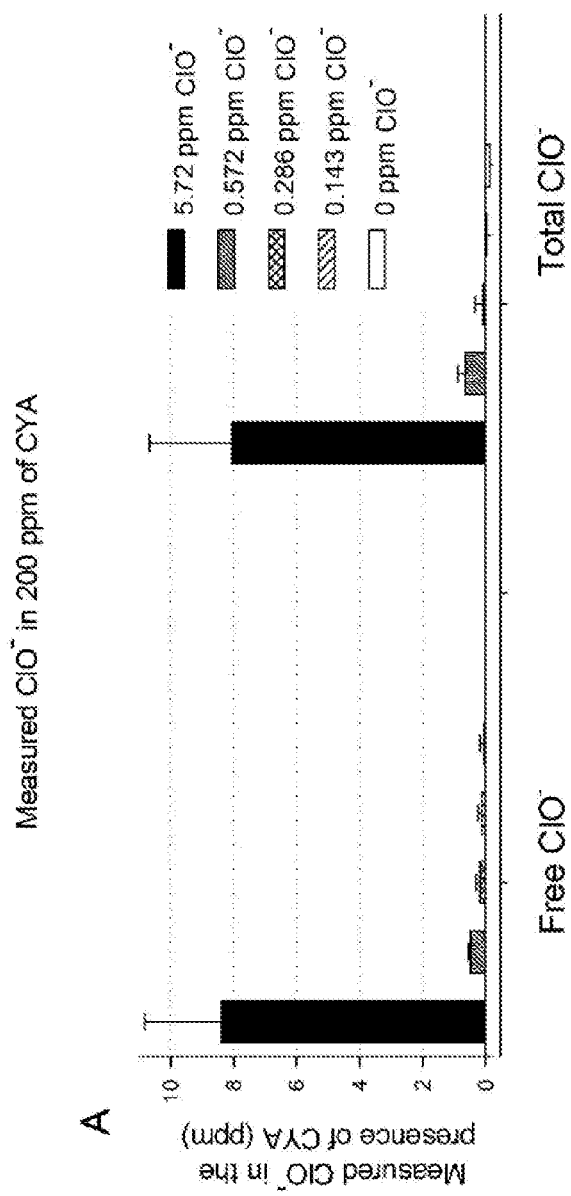
FIG. 2 shows the measured hypochlorite level (FIG. 2A) and the measured CAH activity (FIG. 2B) in the presence of 200 ppm cyanuric acid (CYA). For example, as presented in FIG. 2A, 5.72 ppm, 0.572 ppm, 0.286 ppm, 0.143 ppm and 0 ppm of hypochlorite (ClO$^-$, bleach) was mixed with 200 ppm of cyanuric acid (CYA) and 1 mM sodium bicarbonate (NaHCO$_3$; pH 7.33) at room temperature. The levels of free ClO$^-$ and total ClO$^-$ were measured by a modified DPD assay (Hot Tub Warehouse, Taylor K-1001; hottubwarehouse.com) (FIG. 2A).
FIG. 2B shows the enzymatic activity of CAH in the presence and absence of various added concentrations hypochlorite as indicated. The CAH proteins were diluted to an appropriate concentration required to hydrolyze about 200 ppm CYA when incubation was free of hypochlorite and with the indicated concentrations of hypochlorite (i.e., 5.72 ppm, 0.572 ppm, 0.286 ppm, and 0.143 ppm) at room temperature for sixteen (16) hours. Subsequently, one-hundred (100) ul of reaction sample was mixed with one-hundred (100) ul of melamine (2.5 mg/ml) to determine the amount of CYA remaining, wherein the consumed CYA was calculated by subtracting the remaining CYA from the 200 ppm CYA.
Figure 2B:
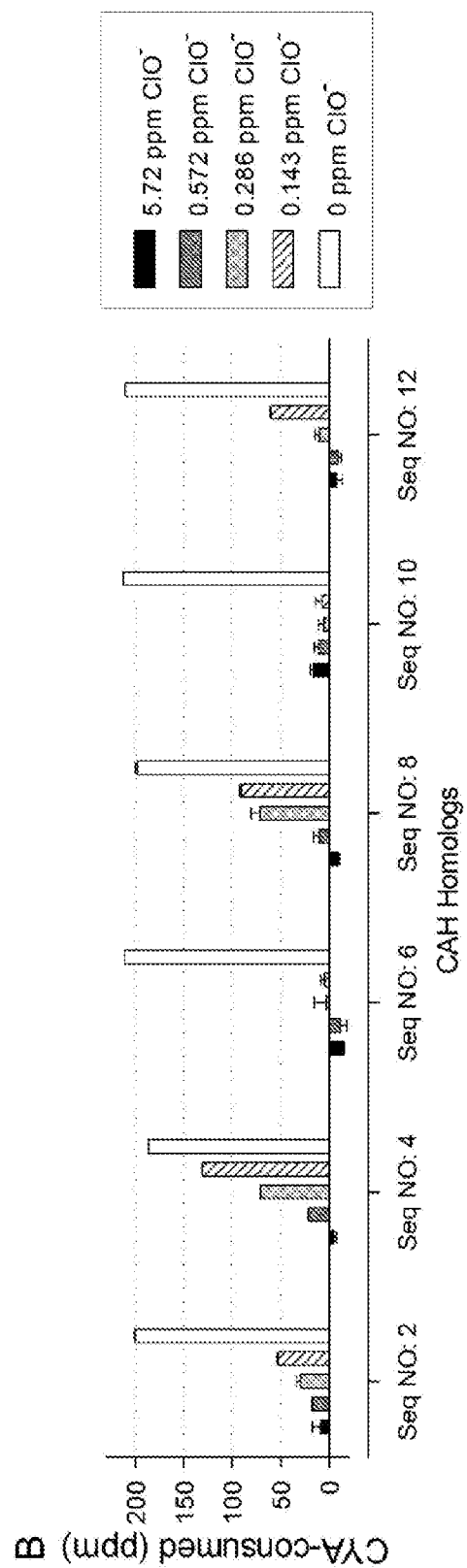

More particularly, as generally set forth in Example 3, hypochlorite can be detected with reproducibility at low levels in the presence of 200 ppm of cyanuric acid (CYA) (FIG. 2A). Likewise, as described in Example 3, it was surprisingly observed that the activity of all six (6) CAH (enzyme) proteins tested/screened were significantly inactivated in the presence of (swimming pool) relevant concentrations of hypochlorite (FIG. 2B). Thus, as observed in Example 3, the presence of even low amounts of hypochlorite (free chlorine) can significantly inactivate proteins comprising CAH activity, and as such, even under the most favourable of conditions, the total amount of CAH enzyme required to treat a swimming pool (i.e, to remediate [CYA]) would require many fold more CAH enzyme (product), taking longer to remediate the CYA, concomitantly increasing the costs for such CYA remediation processes.

As described below in Example 4, Applicant performed simulated swimming pool water experiments to remove (mitigate) the residual hypochlorite (ClO⁻) present in the water (FIG. 3). For example, the simulated swimming pool water conditions used were as follows: 1 mM sodium bicarbonate (NaHCO₃; pH 7.33) with 200 ppm of cyanuric acid (CYA) and 5.72 ppm of hypochlorite (ClO⁻). The samples were titrated with 0 ppm, 2.17 ppm, 4.34 ppm, 8.69 ppm, 17.38 ppm and 34.76 ppm of sodium thiosulfate (Na₂S₂O₃), and 200 ul of each sample was taken to measure the free ClO⁻ (FIG. 3A), and total ClO⁻ (FIG. 3B). In another example of simulated swimming pool water conditions, the same samples were titrated with 0 ppm, 3.46 ppm, 6.93 ppm, 13.86 ppm, 27.72 ppm, and 55.44 ppm of sodium sulfite (Na₂SO₃) to remove ClO⁻ (FIG. 3C and FIG. 3D). As presented in these figures, removal (mitigation) of the residual hypochlorite present in the swimming pool water was successfully accomplished using reductive compounds, such as sodium thiosulfate (Na₂S₂O₃; FIG. 3A/3B) or sodium sulfite (Na₂SO₃; FIG. 3C/3D).

As presented in Example 5, Applicant tested/screened CAH proteins of SEQ ID NO: 6 and SEQ ID NO: 10 in a simulated swimming pool water experiment. For example, the simulated swimming pool water conditions used were as follows: 1 mM sodium bicarbonate (NaHCO₃; pH 7.33) with 200 ppm of cyanuric acid (CYA) and 5.72 ppm of hypochlorite (ClO⁻). The CAH was incubated with 200 ppm cyanuric acid (CYA) in the simulated swimming pool water, before and after hypochlorite (ClO⁻) reduction with sodium sulfite (Na₂SO₃) (FIG. 4). The free ClO⁻ concentration was measured with and without sodium sulfite (FIG. 4A) and the total ClO⁻ concentration was measured with and without sodium sulfite (FIG. 4B). The enzymatic activity of the CAH proteins (SEQ ID NO: 6 and SEQ ID NO: 10) were tested under the same concentrations of hypochlorite (ClO⁻) and sodium sulfite (Na₂SO₃) (FIGS. 4C and 4D, respectively).

Figure 4C:
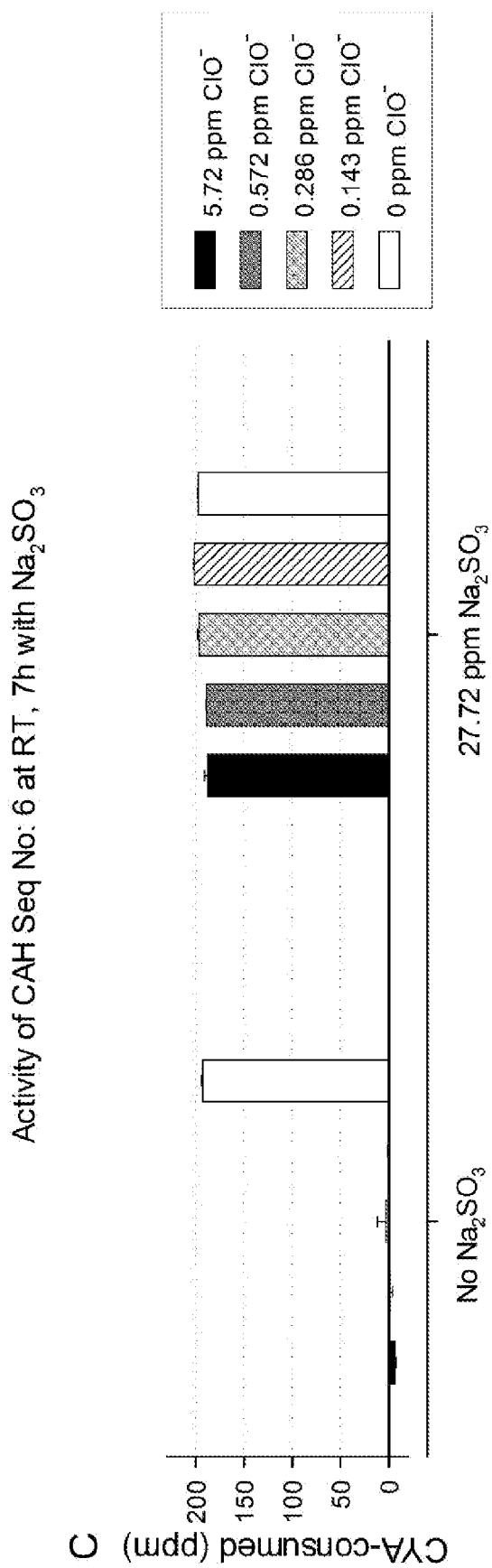
Figure 4D:
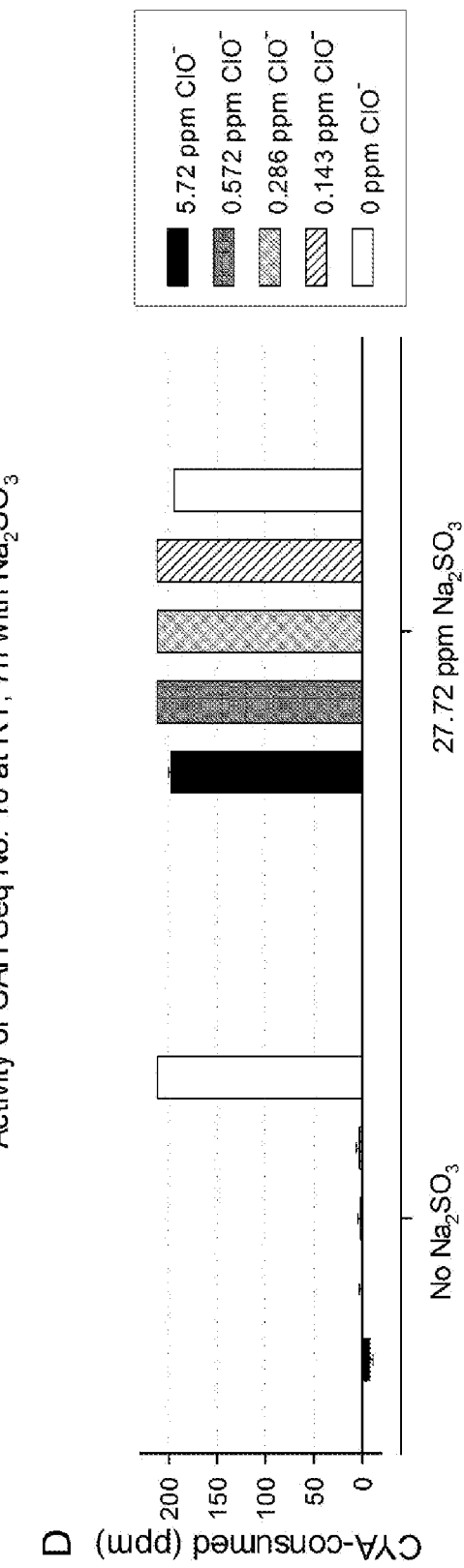

As described in Example 3, the CAH proteins of SEQ ID NO: 6 and SEQ ID NO: 10 were inactivated at different concentrations of hypochlorite (5.72 ppm to 0.143 ppm) (FIGS. 4C and 4D, left data panel). Some amount of hypochlorite (ClO⁻) resistance was observed at 0.143 ppm hypochlorite. More particularly, 27.72 ppm of reductant (Na₂SO₃) was sufficient to reduce 5.72 ppm of hypochlorite (ClO⁻), wherein both free (ClO⁻) and total (ClO⁻) levels are close to, or below zero. As shown in FIGS. 4C and 4D (right data panel), the CAH retained a significant amount of CYA activity following removal (mitigation) of the residual hypochlorite (ClO⁻) with the reductant (Na₂SO₃), as compared to the CAH activity without reductant (FIGS. 4C and 4D, left data panel). Applicant also tested and confirmed that other reductants can also be applied to reduce the ClO⁻ and maintain CAH activity under these conditions. For example, 17.38 ppm of sodium thiosulfate (Na₂S₂O₃) was sufficient to reduce 0.143 ppm to 5.72 ppm of ClO⁻ and maintain CAH (SEQ NO: 6) activity under this condition as shown in FIG. 5A-5C.

Example 6 of the disclosure describes testing/screening six (6) proteins comprising CAH activity in a simulated swimming pool water experiment (FIG. 6 and FIG. 7). For example, FIG. 6 shows the activity of the CAH proteins (enzymes) in simulated swimming pool water containing 5.72 ppm ClO⁻, before and after treating the water with thiosulfate. Six (6) different proteins comprising CAH activity were tested (i.e., SEQ ID NO: 2, SEQ ID NO: 4, SEQ ID NO: 6, SEQ ID NO: 8, SEQ ID NO: 10 and SEQ ID NO: 12). For example, 0.3-2.0 mg/L (i.e., to normalize experimental results the protein concentrations used were determined empirically) of each indicated CAH was mixed (in the simulated pool water) to digest 200 ppm of cyanuric acid (CYA) and incubated at room temperature for 6-8.5 hours, under one of the following conditions: positive control (FIG. 6, white bars), 5.72 ppm hypochlorite (FIG. 6, black bars) or 5.72 ppm hypochlorite and 17.38 ppm of reductant, sodium thiosulfate (FIG. 6, grey bars). The positive (+) control includes the indicated CAH protein with no hypochlorite present.

FIG. 7 shows the activity of proteins comprising CAH activity in simulated swimming pool water containing 5.72 ppm ClO⁻, before and after treating the water with sodium sulfite. Six (6) different CAH proteins (enzyme) were tested (i.e., SEQ ID NO: 2, SEQ ID NO: 4, SEQ ID NO: 6, SEQ ID NO: 8, SEQ ID NO: 10 and SEQ ID NO: 12). For example, 0.3-2.0 mg/L (i.e., to normalize experimental results the protein concentrations used were determined empirically) of each indicated CAH was mixed (in the simulated pool water) to digest 200 ppm of cyanuric acid (CYA) and incubated at room temperature for 6-8.5 hours, under one of the following conditions: positive control (FIG. 7, white bars), 5.72 ppm hypochlorite (FIG. 7, black bars) or 5.72 ppm hypochlorite and 27.72 ppm of reductant, sodium sulfite (FIG. 7, grey bars). The positive (+) control includes the indicated CAH protein with no hypochlorite present.

Example 7 of the disclosure describes the HPLC separation of CYA hydrolysis and products. For example, as presented in FIG. 8A, a CAH protein (enzyme) (SEQ ID NO: 6) was used to digest CYA (200 ppm), wherein the CYA peak area decreases in the sixty (60) minute reaction, with a simultaneous increase of the biuret peak, demonstrating CYA was digested by the CAH enzyme and converted to biuret. As further shown in FIG. 8B, a BH protein (enzyme) (SEQ ID NO: 14) was used to digest biuret (160 ppm), wherein the biuret peak decreased in the sixty (60) minute reaction, indicating hydrolysis of biuret by the BH enzyme. Furthermore, as presented and described in Example 7 (FIG. 8C), a CAH (SEQ ID NO: 6) and a BH (SEQ ID NO: 14) where used to digest CYA (200 ppm) and the resulting biuret product thereof. For example, in a sixty (60) minute reaction the CYA peak decreased and the biuret peak accumulated after five (5) minutes of reaction, but maintained at about 30% of maximum or below, during the incubation, indicating that the CAH protein (enzyme) hydrolyzed the CYA to biuret, which was then hydrolyzed by the BH protein (enzyme) to allophonate (FIG. 8C).

IV. Enzymes Comprising Cyanuric Acid Hydrolase or Biuret Hydrolase Activity

As generally set forth above, the present disclosure addresses certain ongoing and unmet needs in the art related to CYA remediation in aqueous liquids. More particularly, certain embodiments of the disclosure are related to novel methods and compositions for reducing CYA concentrations in aqueous liquids comprising hypochlorite. As described herein, certain embodiments of the disclosure are related to the use of proteins (enzymes) comprising cyanuric acid hydrolase (CAH) activity, and optionally biuret hydrolase (BH) activity.

More specifically, as described herein, the novel methods and compositions of the disclosure are suitable for use with any enzyme contemplated in reducing (remediating) CYA concentrations in aqueous liquids comprising hypochlorite, including, but not limited to protein (enzymes) comprising CAH activity and BH activity. In certain embodiments, the disclosure is related to enzymes comprising CAH activity (e.g., EC 3.5.2.15). In certain other embodiments, the disclosure is related to enzymes comprising BH activity (e.g., EC 3.5.1.84).

In certain other embodiments, an enzyme comprising CAH activity comprises about 45% amino acid sequence identity to a CAH enzyme selected from the group consisting of SEQ ID NO: 2, SEQ ID NO: 4, SEQ ID NO: 6, SEQ ID NO: 8, SEQ ID NO: 10 and SEQ ID NO: 12. For example, TABLE 1 below shows the amino acid sequence identity of certain cyanuric acid hydrolase family members and their relative amino acid sequence identities.

In other embodiments, an enzyme comprising CAH activity is derived or obtained from a *M. thermoacetica* (ATCC 39703) cell, a *Bradyrhizobium diazoefficiens* cell, a *Bradyrhizobium* sp. (WSM1253) cell, a *Pseudolabrys* sp. (Root1462) cell, an *Acidovorax citrulli* (122227) cell and the like.

In other embodiments, an enzyme having CAH activity comprises an amino acid consensus sequence set forth in SEQ ID NO: 15. More particularly, as described below in Example 11, Applicant identified a novel sixteen (16) amino acid consensus sequence set forth in SEQ ID NO: 15 (FIG. 10), near the C-terminus of the cyanuric acid hydrolase protein (e.g., see, FIG. 11, bold underlined residues). For example, as presented in FIG. 10, the CAH consensus sequence (SEQ ID NO: 15) includes one of the conserved serine (Ser) residues in the CAH active site and further includes amino acid (residues) in the region of the bound metal residue that has been identified in the X-ray structures of all cyanuric acid hydrolase to date (Bera et al., 2017; Shi et al., 2019).

In certain other embodiments, an enzyme comprising BH activity is derived or obtained from a *Herbaspirillum* sp. cell (e.g., *Herbaspirillum* sp., strain BH-1). In certain embodiments, an enzyme comprising BH activity comprises at least about 50%, 60%, 70%, 80%, 90%-99%, or 100% sequence to the BH enzyme of SEQ ID NO: 14. Thus, in certain embodiments, an enzyme comprising BH activity comprises Enzyme Commission Number EC 3.5.1.84, catalyzing the breakdown of biuret+$H_2O$ to allophonate+$NH_3$ (e.g., see, FIG. 1E).

V. Methods for Remediating Cyanuric Acid in Aqueous Liquids Comprising Hypochlorite As generally set forth in the preceding sections and the Examples section below, Applicant has identified certain inherent problems related to the activity of proteins (enzymes) comprising CAH activity and/or BH when used for CYA remediation in aqueous liquids comprising hypochlorite (i.e., as used in disinfecting aqueous liquids, e.g., chlorinated swimming pool water, treated waste water, etc.). More particularly, as presented in Example 3, it was surprisingly observed that the activity of all six (6) CAH proteins (enzymes) tested/screened were significantly inactivated in the presence of (swimming pool) relevant concentrations of hypochlorite (FIG. 2B). Thus, as described herein, the following methods, which should not be construed as limiting the disclosure, are particularly useful and well suited for use in reducing (remediating) CYA in aqueous liquids comprising hypochlorite via enzymes comprising CAH activity, and optionally enzymes comprising BH activity.

More particularly, certain embodiments the disclosure are related to methods and compositions for remediating CYA in an aqueous liquid comprising hypochlorite. In certain embodiments, the methods and compositions for remediating CYA in an aqueous liquid comprising hypochlorite include contacting the aqueous liquid with a reductant and an enzyme comprising cyanuric acid hydrolase (CAH) activity. For example, as described above and set forth in Example 3, all six (6) CAH proteins (enzymes) tested/screened in simulated swimming pool water were significantly inactivated in the presence of (swimming pool) relevant concentrations of hypochlorite (FIG. 2B). Thus, in certain embodiments, the disclosure is related to methods and compositions to remove or mitigate the hypochlorite present in the aqueous liquid (e.g., chlorinated swimming pool water). For example, in certain embodiments, an aqueous liquid comprising hypochlorite is contacted with a reductant, which removes or mitigates the hypochlorite present in the aqueous liquid. As generally set forth above,

TABLE 1

CYANURIC ACID HYDROLASES AND THEIR RELATIVE AMINO ACID SEQUENCE IDENTITY

| SID | Parental Cell (Source of CAH) | % ID to SID 2 | % ID to SID 4 | % ID to SID 6 | % ID to SID 8 | % ID to SID 10 | % ID to SID 12 |
|---|---|---|---|---|---|---|---|
| 2 | *M. thermoacetica* (WT) | 100 | 99.7 | 58.3 | 56.9 | 51 | 63.4 |
| 4 | *M. thermoacetica* (C46A) | 99.7 | 100 | 58.3 | 56.9 | 51 | 63.1 |
| 6 | *Bradyrhizobium diazoefficiens*, USDA 110 | 58.3 | 58.3 | 100 | 89.5 | 51.4 | 55.4 |
| 8 | *Bradyrhizobium* sp. (WSM1253) | 56.9 | 56.9 | 89.5 | 100 | 50.4 | 55.4 |
| 10 | *Pseudolabrys* sp. (Root1462) | 51 | 51 | 51.4 | 50.5 | 100 | 49.5 |
| 12 | *Acidovorax citrulli* (122227) | 63.4 | 63.1 | 55.4 | 55.4 | 49.5 | 100 |

The phrase "SEQ ID NO" is abbreviated "SID" in Table 1.

non-limiting examples of suitable reductants include, but are not limited to, thiosulfate, sulfite, sodium bisulfite, sodium metabisulfite, hydrogen peroxide, potassium iodide, iodate, ferrous iron salts, copper, nickel, molybdenum, manganese (reduced salts); organic molecules such as ascorbate, certain aldehydes and organosulfur compounds; polymers such as poly-vinyl-pyrrolidone (PVP), vulcanized rubber, electro-chemical reduction and the like.

In certain embodiments, an aqueous liquid comprising hypochlorite is contacted with a reductant for a sufficient period of time to lower the free chlorine/hypochlorite concentration in the aqueous liquid. Thus, in certain embodiments, a sufficient period of time to lower the hypochlorite concentration in an aqueous liquid may be between about four (4) hours to about twenty-four (24) hours (e.g., about 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 23 hours, 24 hours).

In other embodiments, a "sufficient period of time" to lower the hypochlorite concentration in an aqueous liquid is less than about six (6) hours, wherein the sufficient period of time is reduced (e.g., less than about 5.5 hours, 5.0 hours, 4.0 hours, 3.0 hours or less than 2.5 hours) by employing at least a second (auxiliary circulating) pumping system to increase the rate of mixing the enzyme(s) and/or reductant(s) in the aqueous liquid. For example, as described below, CYA remediation kits comprising such enzyme(s), and reductant(s), may further include one or more auxiliary pump(s) to further reduce the period of time to lower the hypochlorite concentration in the aqueous liquid.

In certain other embodiments, an aqueous liquid comprising hypochlorite is contacted with a reductant to lower the free chlorine/hypochlorite concentration in the aqueous liquid, wherein the reductant lowers the free chlorine/hypochlorite to below about 1 ppm. In other embodiments, the reductant lowers the free chlorine/hypochlorite concentration in the aqueous liquid to below about 0.1 ppm. In other embodiments, the reductant lowers the free chlorine/hypochlorite to an undetectable level.

In other embodiments, the aqueous liquid is contacted with a molar equivalent of the reductant relative to the hypochlorite in the aqueous liquid. In other embodiments, the aqueous liquid is contacted with a molar excess of the reductant relative to the hypochlorite in the aqueous liquid.

In certain embodiments, the aqueous liquid is contacted with a 1.2:1 ratio of reductant/hypochlorite. In other embodiments, the aqueous liquid is contacted with a 1.4:1 ratio of reductant/hypochlorite. In other embodiments, the aqueous liquid is contacted with a 1.6:1 ratio of reductant/hypochlorite. In other embodiments, the aqueous liquid is contacted with a 1.8:1 ratio of reductant/hypochlorite. In other embodiments, the aqueous liquid is contacted with a 2:1 ratio of reductant/hypochlorite As set forth above, certain embodiments of the disclosure are related to contacting an aqueous liquid comprising hypochlorite with a reductant and one or more enzymes comprising CAH and/or BH activity. For example, contacting the aqueous liquid includes administering or dispensing one or more molecules of the disclosure (e.g., enzymes, reducing agents, cyanuric acid, hypochlorite, hypochlorous acid, etc.), which may be in the form of solid, liquid or gel compositions, immobilized and/or granulated compositions thereof and formulations thereof.

As appreciated by one skilled in the art, the chemistry involved with the chlorination of water can be somewhat complex, and as such, proper measurement of chlorine concentrations in water is essential for accurately controlling chlorination processes (e.g., disinfection, biological control, etc.). For example, as briefly stated above, the hypochlorous acid (HOCl) and hypochlorite (ClO$^-$) ion are the oxidizing chemical species that are formed when chlorine (e.g., sodium hypochlorite; bleach) is added to the water, referred to as "free residual chlorine" or "free available chlorine". The proportion of hypochlorous acid and hypochlorite ion in water primarily depends on the pH of the water. Thus, the chlorine residual which exists in water, in combination with ammonia and/or organic nitrogen compounds is referred to as "combined chlorine". The "total residual chlorine" is therefore the sum of the "free chlorine" plus "combined chlorine".

A common method for measuring chlorine levels in water may be derived from colorimetric (photochemical) techniques and analysis known in the art. The colorimetric analyzers require chemical reagents to be added to the water, wherein a color change occurs that is proportional to the concentration of chlorine present in the water, and the resulting color measured photometrically to determine the chlorine level. In general, the reagent used in most colorimetric analysis methods is N,N-Diethyl-p-Phenylenediamine (abbreviated, "DPD"), which can be used to measure free chlorine or total chlorine. Other methods/techniques for measuring chlorine levels in water include amperometric (electrochemical) methods known in the art.

In certain embodiments, methods for remediating CYA in aqueous liquids include obtaining a sample of the aqueous liquid and determining the free hypochlorite concentration thereof, as generally described above. For example, after determining the (free) hypochlorite concentration in the aqueous liquid, a molar equivalent (or a molar excess) of the reductant may be added to the aqueous liquid, thereby mitigating (removing) the free hypochlorite present in the liquid.

In certain embodiments, methods for remediating CYA in aqueous liquids include one or more sealed or vented containers for mixing one or more components of the disclosure (e.g., enzymes, reductants, etc.).

In other embodiments, methods for remediating CYA in aqueous liquids include one or more auxiliary pumps (i.e., in addition to the reservoir's primary pump circulating system). For example, an auxiliary circulating pump can be implemented to supplement the reservoir's primary pump circulating system, thereby reducing the amount of time (rate) for complete mixing of the CYA remediation components (e.g., enzyme(s), reductant(s), buffers, etc.). Thus, in certain embodiments, a sufficient period of time to lower the hypochlorite concentration and remediate the CYA in the aqueous liquid is less than about six (6) hours to about two (2) hours via of one or more auxiliary circulating pumps with appropriate flow rates (GPM) to achieve adequate mixing in a desired time frame of the user.

VI. Protein Formulations

As generally set forth above, certain embodiments of the disclosure are related to the use of proteins (enzymes) comprising cyanuric acid hydrolase (CAH) activity, and optionally biuret hydrolase (BH) activity in the remediation of CYA in aqueous liquids. In certain embodiments, enzymes (proteins) comprising CAH activity (e.g., EC 3.5.2.15) and/or enzymes (proteins) comprising BH activity (e.g., EC 3.5.1.84) may be in the form of a solid or a liquid. The term "enzyme formulation" and/or "protein formulation" comprises all liquid and solid formulations in which the enzyme(s) may be commercialized. For example, a source of enzyme(s) for such a formulation may be a crude liquid preparation (e.g., as obtained from the fermentation broth), or the enzyme further purified and/or concentrated therefrom. Enzyme formulations are often utilized for maintaining enzyme activity (e.g., maintenance of conformation, preventing unfolding, aggregation, changes in the covalent structure and the like). For example, enzyme formulations may comprise additives, covalent modifications, immobilization of the enzyme and the like, as known and understood by one skilled in the art.

Solid supports and granules may be produced by a variety of fabrication techniques and from a variety of materials. Solid supports include inert solid material into or onto which the CAH and/or BH are incorporated (e.g., by spraying, mixing, absorbing, or otherwise forming into particles such as granules or powders). Examples of solid supports include, but are not limited to, sodium sulfate, magnesium sulfate, granulated sucrose, starch-sucrose non-pareils (ASNP) and maltodextrin. The materials used in the core should be suitable for use in foods and/or animal feeds.

Granules may be made by, e.g., rotary atomization, wet granulation, dry granulation, spray drying, disc granulation, extrusion, pan coating, spheronization, drum granulation, fluid-bed agglomeration, high-shear granulation, fluid-bed spray coating, crystallization, precipitation, emulsion gelation, spinning disc atomization and other casting approaches, and prilling processes (e.g., see U.S. Pat. Nos. 4,689,297 5,324,649, 454,332, 6,248,706, 6,534,466, and European Patent Nos. 656,058 and 804,532). The core of the granule may be the granule itself, or the inner nucleus of a layered granule. The materials used in the core should be suitable for use in CYA remediation processes.

The core particle may comprise one or more water soluble or dispersible agent(s), including but not limited to, sodium sulfate, sodium chloride, magnesium sulfate, zinc sulfate, and ammonium sulfate), citric acid, sugars (e.g., sucrose, lactose, glucose, granulated sucrose, maltodextrin and fructose), plasticizers (e.g., polyols, urea, dibutyl phthalate, and dimethyl phthalate), fibrous material (e.g., cellulose and cellulose derivatives such as hydroxyl-propyl-methyl cellulose, carboxy-methyl cellulose, and hydroxyl-ethyl cellulose), phosphate, and combinations thereof. Suitable dispersible agents include, but are not limited to, clays, nonpareils (combinations of sugar and starch; e.g., starch-sucrose non-pareils-ASNP), talc, silicates, carboxymethyl cellulose, starch, and combinations thereof.

In some embodiments, the core comprises mainly sodium sulfate. In some embodiments, the core consists essentially of sodium sulfate. In a particular embodiment, the core consists of only sodium sulfate.

In some embodiments, the core is an enzyme powder, including UFC (ultrafiltration concentrate) containing an enzyme. The enzyme powder may be spray dried and may optionally be admixed with any of the water soluble or dispersible agents listed, herein.

In some embodiments the core is coated with at least one coating layer. In a particular embodiment, the core is coated with at least two coating layers. In another particular embodiment the core is coated with at least three coating layers. The materials used in the coating layer(s) can be suitable for use in aqueous liquids such a swimming pool water (e.g., see US Patent Publication No. 2010/0124586, PCT Publication No. WO1999/32595 and U.S. Pat. No. 5,324,649).

In some embodiments, a coating layer comprises one of more of the following materials: an inorganic salt (e.g., sodium sulfate, sodium chloride, magnesium sulfate, zinc sulfate, and ammonium sulfate), citric acid, a sugar (e.g., sucrose, lactose, glucose, and fructose), a plasticizer (e.g., polyols, urea, dibutyl phthalate, and dimethyl phthalate), fibrous material (e.g., cellulose and cellulose derivatives such as hydroxyl-propyl-methyl cellulose, carboxy-methyl cellulose, and hydroxyl-ethyl cellulose), clay, nonpareil (a combination of sugar and starch), silicate, carboxymethyl cellulose, phosphate, starch (e.g., corn starch), fats, oils (e.g., rapeseed oil, and paraffin oil), lipids, vinyl polymers, vinyl copolymers, polyvinyl alcohol (PVA), plasticizers (e.g., polyols, urea, dibutyl phthalate, dimethyl phthalate, and water), anti-agglomeration agents (e.g., talc, clays, amorphous silica, and titanium dioxide), anti-foam agents (such as FOAMBLAST 882® and EROL 6000K®) and talc. Likewise, U.S. Patent Publication No. 2010/0124586, PCT Publication No. WO1999/32595 and U.S. Pat. No. 5,324,649, describe suitable components for the coating layers.

In some embodiments, the coating layer comprises sugars (e.g., sucrose, lactose, glucose, granulated sucrose, maltodextrin and fructose). In some embodiments, the coating layer comprises a polymer such as polyvinyl alcohol (PVA). Suitable PVA for incorporation in the coating layer(s) of the multi-layered granule include partially hydrolyzed, fully hydrolyzed and intermediately hydrolyzed having low to high degrees of viscosity. In some embodiments, the coating layer comprises an inorganic salt, such as sodium sulfate. In some embodiments, the coating layer comprises phosphate.

In some embodiments, at least one coating layer is an enzyme coating layer. In some embodiments the core is coated with at least two enzyme layers. In another embodiment the core is coated with at least three or more enzyme layers. In some embodiments, the enzymes are CAH and/or BH. Generally, at least one enzyme coating layer comprises at least one CAH, and optionally a reductant.

In some embodiments, the enzyme coating layer may further comprise one or more additional materials selected from the group consisting of: sugars (e.g., sucrose, lactose, glucose, granulated sucrose, maltodextrin and fructose), starch (e.g., corn starch), fats, oils (e.g., rapeseed oil, and paraffin oil), lipids, vinyl polymers, vinyl copolymers, polyvinyl alcohol (PVA), plasticizers (e.g., polyols, urea, dibutyl phthalate, dimethyl phthalate, and water), anti-agglomeration agents (e.g., talc, clays, amorphous silica, and titanium dioxide), anti-foam agents (such as FOAMBLAST 882® and EROL 6000K® available from Ouvrie PMC, Lesquin, France), and talc. Suitable components for granules are described in U.S. Patent Publication No. 2010/0124586, PCT Publication No. WO1999/32595 and U.S. Pat. No. 5,324,649. FOAMBLAST 882® is a de-foamer made with food grade ingredients and is available from Emerald Foam Control, LLC.

VII. CYA Remediation Kits

Certain embodiments of the disclosure are directed to CYA remediation kits, methods of use and compositions thereof. In certain embodiments, a CYA remediation kit comprises, but is not limited to, components such as enzyme(s), reductant(s), chlorine measuring/detecting means, one or more mixing containers, one or more auxiliary pumps, instructions for use and the like.

VIII. Exemplary Embodiments

Certain exemplary embodiments include:
1. A method for remediating cyanuric acid (CYA) in an aqueous liquid comprising hypochlorite, the method comprising contacting the liquid with a reductant and an enzyme comprising cyanuric acid hydrolase (CAH) activity.
2. The method of embodiment 1, wherein the liquid is simultaneously contacted with a reductant and an enzyme comprising CAH activity, or the liquid is first contacted with a reductant followed by contacting the liquid with an enzyme comprising CAH activity.
3. The method of embodiment 1 or embodiment 2, wherein the liquid is first contacted with a reductant for a sufficient period of time to lower the free hypochlorite concentration in the liquid, followed by contacting the liquid with an enzyme comprising CAH activity.
4. The method of any one of embodiments 1 to 3, wherein the free hypochlorite concentration in the liquid is lowered to about 0.5 ppm.
5. The method of any one of embodiments 1-4, wherein the free hypochlorite concentration in the liquid is lowered to an undetectable level.
6. The method of any one of embodiments 1-5, wherein a sufficient period of time to lower the free hypochlorite concentration in the liquid is between about 4 hours to about 24 hours.
7. The method of any one of embodiments 1-6, wherein the enzyme comprising CAH activity is a solid enzyme or a liquid enzyme.
8. The method of any one of embodiments 1-7, further comprising an enzyme having BH activity, wherein the enzyme comprising BH activity is a solid enzyme or a liquid enzyme.
9. The method of any one of embodiments 1-8, wherein the enzyme comprising CAH activity comprises about 45% amino acid sequence identity to an amino acid sequence selected from the group consisting of SEQ ID NO: 2, SEQ ID NO: 6, SEQ ID NO: 8, SEQ ID NO: 10 and SEQ ID NO: 12.
10. The method of any one of embodiments 1-8, wherein the enzyme comprising CAH activity is obtained or derived from a cell selected from the group consisting of *M. thermoacetica* cell, a *Bradyrhizobium diazoefficiens* cell, a *Bradyrhizobium* sp. cell, a *Pseudolabrys* sp. cell and an *Acidovorax citrulli* cell.
11. The method of any one of embodiments 1-8, wherein the enzyme comprising CAH activity comprises an amino acid sequence of SEQ ID NO: 15 near the C-terminus.
12. The method of any one of embodiments 1-11, wherein the reductant is selected from sulfate, sulfite, thiosulfate, sodium bisulfite, sodium metabisulfite, hydrogen peroxide, potassium iodide, iodate, ferrous iron (salts), copper, nickel, molybdenum, manganese (reduced salts), ascorbate, aldehydes, organosulfur compounds, poly-vinyl-pyrrolidone (PVP), vulcanized rubber, and electrochemical reduction.
13. The method of any one of embodiments 1-12, wherein reductant is sulfite.
14. The method of any one of embodiments 1-13, wherein the aqueous liquid is contacted with a molar equivalent of the reductant relative to the concentration of the free hypochlorite in the aqueous liquid.
15. The method of any one of embodiments 1-13, wherein the aqueous liquid is contacted with a molar excess of the reductant relative to the concentration of the free hypochlorite in the aqueous liquid.
16. The method of any one of embodiments 1-13, wherein the aqueous liquid is contacted with a 1.2:1 ratio of reductant/hypochlorite, a 1.4:1 ratio of reductant/hypochlorite, a 1.6:1 ratio of reductant/hypochlorite, a 1.8:1 ratio of reductant/hypochlorite or a 1:2 ratio of reductant/hypochlorite.
17. The method of any one of embodiments 1-16, wherein the enzyme comprising CAH activity is a formulated granule.
18. The method of any one of embodiments 1-16, wherein the enzyme comprising BH activity is a formulated granule.
19. The method of any one of embodiments 1-18, wherein the granule comprises at least an outer core and an inner core of active enzyme or reagent.
20. The method of any one of embodiments 1-19, wherein the inner core comprises an enzyme comprising CAH activity and the outer core comprises a reductant.
21. The method of any one of embodiments 1-20, wherein is the aqueous liquid is further defined as chlorinated swimming pool water or chlorinated hot tub water.
22. The method of any one of embodiments 1-21, wherein the enzyme comprising CAH activity retains at least 25% or greater activity relative to the same CAH enzyme in the absence of reductant.
23. The method of any one of embodiments 1-22, wherein the enzyme comprising CAH activity retains at least 50% or greater activity relative to the same CAH enzyme in the absence of reductant.
24. The method of any one of embodiments 1-23, wherein the enzyme comprising CAH activity retains at least 75% or greater activity relative to the same CAH enzyme in the absence of reductant.
25. A composition for remediating cyanuric acid (CYA) in an aqueous liquid comprising hypochlorite, the composition comprising a reductant and an enzyme comprising cyanuric acid hydrolase (CAH) activity.
26. The composition of embodiment 25, wherein the liquid is simultaneously contacted with a reductant and an enzyme comprising CAH activity, or the liquid is first contacted with a reductant followed by contacting the liquid with an enzyme comprising CAH activity.
27. The composition of embodiment 25 or embodiment 26, wherein the liquid is first contacted with a reductant for a sufficient period of time to lower the free hypochlorite concentration in the liquid, followed by contacting the liquid with an enzyme comprising CAH activity.
28. The composition of any one of embodiments 25-27, wherein the free hypochlorite concentration in the liquid is lowered to about 0.5 ppm.
29. The composition of any one of embodiments 25-28, wherein the free hypochlorite concentration in the liquid is lowered to an undetectable level.
30. The composition of any one of embodiments 25-29, wherein a sufficient period of time to lower the free hypochlorite concentration in the liquid is between about 4 hours to about 24 hours.
31. The composition of any one of embodiments 25-30, wherein the enzyme comprising CAH activity is a solid enzyme or a liquid enzyme.
32. The composition of any one of embodiments 25-31, further comprising an enzyme having BH activity, wherein the enzyme comprising BH activity is a solid enzyme or a liquid enzyme.

27

33. The composition of any one of embodiments 25-32, wherein the enzyme comprising CAH activity comprises about 45% amino acid sequence identity to an amino acid sequence selected from the group consisting of SEQ ID NO: 2, SEQ ID NO: 6, SEQ ID NO: 8, SEQ ID NO: 10 and SEQ ID NO: 12.
34. The composition of any one of embodiments 25-32, wherein the enzyme comprising CAH activity is obtained or derived from a cell selected from the group consisting of *M. thermoacetica* cell, a *Bradyrhizobium diazoefficiens* cell, a *Bradyrhizobium* sp. cell, a *Pseudolabrys* sp. cell and an *Acidovorax citrulli* cell.
35. The composition of any one of embodiments 25-32, wherein the enzyme comprising CAH activity has an amino acid sequence comprising SEQ ID NO: 15 near the C-terminus.
36. The composition of any one of embodiments 25-35, wherein the reductant is selected from sulfate, sulfite, thiosulfate, sodium bisulfite, sodium metabisulfite, hydrogen peroxide, potassium iodide, iodate, ferrous iron (salts), copper, nickel, molybdenum, manganese (reduced salts), ascorbate, aldehydes, organosulfur compounds, poly-vinyl-pyrrolidone (PVP), vulcanized rubber and electrochemical reduction.
37. The composition of any one of embodiments 25-36, wherein the aqueous liquid is contacted with a molar equivalent of the reductant relative to the concentration of the free hypochlorite in the aqueous liquid.
38. The composition of any one of embodiments 25-36, wherein the aqueous liquid is contacted with a molar excess of the reductant relative to the concentration of the free hypochlorite in the aqueous liquid.
39. The composition of any one of embodiments 25-36, wherein the aqueous liquid is contacted with a 1.2:1 ratio of reductant/hypochlorite, a 1.4:1 ratio of reductant/hypochlorite, a 1.6:1 ratio of reductant/hypochlorite, a 1.8:1 ratio of reductant/hypochlorite or a 1:2 ratio of reductant/hypochlorite.
40. The composition of any one of embodiments 25-39, wherein the enzyme comprising CAH activity is a formulated granule, and optionally, wherein the enzyme comprising BH activity is a formulated granule.
41. The composition of any one of embodiments 25-40, wherein the granule comprises at least an outer core and an inner core of active enzyme or reagent.
42. The composition of any one of embodiments 25-41, wherein the inner core comprises an enzyme comprising CAH activity and the outer core comprises a reductant.
43. The composition of any one of embodiments 25-42, wherein the outer core and the inner core of comprise active enzyme or reagent.
44. The composition of any one of embodiments 25-43, wherein the reductant comprised in the outer core of the granule is a molar equivalent of a 5 ppm to 20 ppm hypochlorite concentration.
45. The composition of any one of embodiments 25-44, wherein is the aqueous liquid is further defined as chlorinated swimming pool water or chlorinated hot tub water.
46. The composition of any one of embodiments 25-45, wherein the enzyme comprising CAH activity retains at least 25% or greater activity relative to the same CAH enzyme in the absence of reductant.
47. The composition of any one of embodiments 25-46, wherein the enzyme comprising CAH activity retains at least 50% or greater activity relative to the same CAH enzyme in the absence of reductant.
48. The composition of any one of embodiments 25-47, wherein the enzyme comprising CAH activity retains at least 75% or greater activity relative to the same CAH enzyme in the absence of reductant.

EXAMPLES

Certain aspects of the present disclosure may be further understood in light of the following examples, which should not be construed as limiting. Modifications to materials and methods will be apparent to those skilled in the art Example 1

Heterologous Expression and Isolation of Cyanuric Acid Hydrolase Proteins

The six (6) cyanuric acid hydrolase (CAH) proteins (enzymes) tested, screened and described in following examples were recombinantly expressed in a *Bacillus subtilis* host cells, wherein genes (ORFs) encoding the six CAH proteins included a *M. thermoacetica* (strain ATCC 39703) gene (SEQ ID NO: 1) encoding a CAH protein (SEQ ID NO: 2), a variant *M. thermoacetica* (strain ATCC 39703) gene (SEQ ID NO: 3) encoding a variant CAH (C46A) protein (SEQ ID NO: 4), a *Bradyrhizobium diazoefficiens* (strain USDA 110) gene (SEQ ID NO: 5) encoding a CAH protein (SEQ ID NO: 6), a *Bradyrhizobium* sp. (strain WSM1253) gene (SEQ ID NO: 7) encoding a CAH protein (SEQ ID NO: 8), a *Pseudolabrys* sp. (strain Root1462) gene (SEQ ID NO: 9) encoding a CAH protein (SEQ ID NO: 10) and an *Acidovorax citrulli* (strain 122227) gene (SEQ ID NO: 11) encoding a CAH protein (SEQ ID NO: 12).

For example, the *B. subtilis* host cells were constructed using standard molecular biology techniques known to in the art, wherein the six (6) genes encoding the CAH proteins were codon optimized for expression in a *B. subtilis* host cell and integrated (with no antibiotic resistant marker) into the *B. subtilis* aprE genomic locus. More particularly, PCR products comprising the CAH genes (SEQ ID NO: 1, SEQ ID NO: 3, SEQ ID NO: 5, SEQ ID NO: 7, SEQ ID NO: 9 and SEQ ID NO: 11) were transformed into the *B. subtilis* host, as generally described in PCT Publication No: WO2018/187524 (incorporated herein by referenced in its entirety). One (1) µg of the PCR product was mixed with 200 µl of competent *B. subtilis* cells comprising and expressing a comK gene (0.3% xylose-induced) and comprising a deletion of alrA. The transformant was spread onto LB plates after incubation at 37° C., 250 rpm for one (1) hour. Single colonies were selected after incubation of the transformant at 37° C. overnight. The genomic region containing the gene of interest (i.e., SEQ ID NO: 1, SEQ ID NO: 3, SEQ ID NO: 5, SEQ ID NO: 7, SEQ ID NO: 9 or SEQ ID NO: 11) was confirmed by Sanger sequencing.

Transformants expressing the heterologous CAH in *B. subtilis* were grown in a stirred aerobic bioreactor on LB medium. After growth at 30° C., 220 rpm for twenty-four (24) hours, fifty (50) µl of cells were harvested and lysed by 0.1 mg/ml of lysozyme at 37° C. for one (1) hour. Samples were mixed with 2×SDS sample buffer and boiled for ten (10) minutes before being analyzed by SDS-PAGE. Standard aerobic stirred cell cultures were performed and fermentation samples were analyzed for expression levels of CAH, using CAH activity assays as previously described (Seffernick et al., 2012) and the determination of CYA levels in simulated swimming pool water was by UV absorbance, HPLC, and melamine cyanurate precipitation (as previously described Downes et al., (1984)). After the specific protein production phase of culture, the fermentation was stopped.

Standard large scale purification steps were implemented to isolate the CAH proteins expressed, which included filtration, the use of a polycationic polymer, and ultrafiltration (UF). This process is flexible and may proceed via any of a number of standard scalable purification procedures known in the art to yield a highly purified CAH (enzyme) protein.

Example 2

Heterologous Expression and Isolation of a Biuret Hydrolase

As described herein, SEQ ID NO: 13 is a nucleic acid sequence encoding a *Herbaspirillum* sp. (strain BH-1) biuret hydrolase (BH), which nucleic acid sequence (SEQ ID NO: 13) has been codon-optimized for expression in a *Bacillus subtilis* cell. Thus, the amino acid sequence of the *Herbaspirillum* sp. (strain BH-1) BH is set forth in SEQ ID NO: 14. Following the general procedures described above in Example 1 above, the nucleic acid (SEQ ID NO: 13) was integrated (with no antibiotic resistant marker) into the *Bacillus subtilis* aprE genomic locus in *B. subtilis* host. The genomic region containing the gene of interest (i.e., SEQ ID NO: 13) was confirmed by Sanger sequencing. The transformant was grown in a stirred aerobic bioreactor on LB medium. After growth at 30° C., 220 rpm for twenty-four (24) hours, fifty (50) μl of cells were harvested and lysed by 0.1 mg/ml of lysozyme at 37° C. for one (1) hour. Samples were mixed with 2×SDS sample buffer and boiled for ten (10) minutes before being analyzed by SDS-PAGE. The activity of the BH was demonstrated by hydrolysis of biuret and followed by loss of biuret by HPLC (FIG. 6B).

Example 3

Diversity of Cyanuric Acid Hydrolase Proteins Sensitive to Hypochlorite

In the instant example, Applicant tested six (6) different CAH enzymes (e.g., SEQ ID NO: 2, SEQ ID NO: 4, SEQ ID NO: 6, SEQ ID NO: 8, SEQ ID NO: 10 and SEQ ID NO: 12) for sensitivity to hypochlorite; the CAH enzymes tested comprise a high degree of amino acid sequence diversity (see, TABLE 1, Section III). More particularly, the experimental tests described herein were designed to simulate a swimming pool treatment process, and as such, the experiments were performed in the presence of hypochlorite ($ClO^-$) concentration ranges typically found in chlorinated swimming pool water. For example, as shown in FIG. 2A, hypochlorite can be detected with reproducibility at low levels in the presence of 200 ppm of cyanuric acid (CYA). These solutions contain no CAH enzyme and are control mixtures prepared and verified by analysis with the DPD assay using a Taylor kit for chlorine analysis (Hot Tub Warehouse, Taylor K-1001; hottubwarehouse.com)

As presented in FIG. 2B, 0.3-2 mg/L of each CAH enzyme (i.e., SEQ ID NO: 2, SEQ ID NO: 4, SEQ ID NO: 6, SEQ ID NO: 8, SEQ ID NO: 10 and SEQ ID NO: 12) was incubated for sixteen (16) hours at room temperature in water containing 1 mM sodium bicarbonate ($NaHCO_3$; pH 7.33), 200 ppm cyanuric acid (CYA) and various (indicated) concentrations of hypochlorite ($ClO^-$). More particularly, as shown in FIG. 2B, it was surprisingly observed herein that the activity of all CAH enzymes tested (SEQ ID NO: 2, SEQ ID NO: 4, SEQ ID NO: 6, SEQ ID NO: 8, SEQ ID NO: 10 and SEQ ID NO: 12) were significantly inactivated in the presence of (swimming pool) relevant concentrations of hypochlorite ($ClO^-$).

Example 4

Mitigating Hypochlorite Inactivation of Cyanuric Acid Hydrolases

As described above in Example 3, the presence of even low amounts of hypochlorite (free chlorine) can significantly inactivate CAH enzymes (see, FIG. 2B). For example, all CAH enzymes tested in Example 1 were sensitive to hypochlorite to varying degrees, but even in the most favourable of conditions, the amount of CAH enzyme required to treat a swimming pool (i.e, to remediate [CYA]) would require many fold more CAH enzyme, taking longer to remediate CYA and as such, the overall CYA remediation cost would be much higher.

In the instant example, Applicant performed simulated swimming pool water experiments to remove (mitigate) the residual hypochlorite ($ClO^-$) present in the water (FIG. 3). More particularly, the simulated swimming pool water conditions used in the instant examples were as follows: 1 mM sodium bicarbonate ($NaHCO_3$; pH 7.33) with 200 ppm of cyanuric acid (CYA) and 5.72 ppm of hypochlorite ($ClO^-$). As described below, removal of the residual hypochlorite (present in the swimming pool water) was successfully accomplished herein using reductive compounds to "reduce" the chlorine atom to an inactive form (e.g., thereby leaving the swimming pool water in a more favourable state for CAH enzymatic activity thereof). As shown in FIG. 3, samples were titrated with 0 ppm, 2.17 ppm, 4.34 ppm, 8.69 ppm, 17.38 ppm and 34.76 ppm of sodium thiosulfate ($Na_2S_2O_3$); and 200 ul of each sample was taken to measure the free $ClO^-$ (FIG. 3A) and total $ClO^-$ (FIG. 3B), by the modified DPD assay on 96-well plate (Corning 3641) with $ClO^-$ standard in $H_2O$. The titration for sodium sulfite ($Na_2SO_3$) is shown in FIG. 3C and FIG. 3D using: 0 ppm, 3.46 ppm, 6.93 ppm, 13.86 ppm, 27.72 ppm, and 55.44 ppm of sodium sulfite.

As described in the instant example, sodium sulphite ($Na_2SO_3$) and sodium thiosulfate ($Na_2S_2O_3$) were the reductants tested to remove (mitigate) the residual hypochlorite ($ClO^-$) present in the water, as thiosulfate, or sulfite, are standard chemicals used in recreational water treatment, are convenient and readily available. However, the use of sodium sulphite ($Na_2SO_3$) and/or sodium thiosulfate ($Na_2S_2O_3$) should not be construed as limiting, as variety of reductants (reducing compounds) are known in the art and are suitable for use herein (e.g., to react with hypochlorite ($ClO^-$) to reduce its redox potential.

Example 5

Cyanuric Acid Hydrolase Activity in Simulated Swimming Pool Water after Reducing Hypochlorite In the instant example, CAH proteins (SEQ ID NO: 6 and SEQ ID NO: 10) were incubated with 200 ppm cyanuric acid (CYA) in simulated swimming pool water, before and after hypochlorite ($ClO^-$) reduction with sodium sulfite ($Na_2SO_3$; FIG. 4). For example, the free $ClO^-$ concentration was measured with and without sodium sulfite ($Na_2SO_3$; FIG.

4A) and the total ClO⁻ concentration was measured with and without sodium sulfite ($Na_2SO_3$; FIG. 4B). The enzymatic activity of the CAH proteins (SEQ ID NO: 6 and SEQ ID NO: 10) were tested under the same concentrations of hypochlorite (ClO⁻) and sodium sulfite ($Na_2SO_3$).

Thus, as shown in FIG. 4C, 0.4-0.45 mg/L of the CAH proteins (SEQ ID NO: 6 and SEQ ID NO: 10) were mixed (in 1 mL of simulated pool water) to digest 200 ppm of cyanuric acid (CYA), in the presence of 10.33 ppm sodium sulfite ($Na_2SO_3$; FIG. 4C and FIG. 4D, respectively; right data panel) or absence (0 ppm) sodium sulfite ($Na_2SO_3$; FIG. 4C and FIG. 4D; left data panel), at the indicated hypochlorite (ClO⁻) ranges (0 ppm, 0.143 ppm, 0.286 ppm, 0.572 ppm and 5.72 ppm) and incubated at room temperature for seven (7) hours.

As shown in FIGS. 4C and 4D, the CAH proteins (SEQ ID NO: 6 and SEQ ID NO: 10) were inactivated at different concentrations of hypochlorite (5.72 ppm to 0.143 ppm). More particularly, as shown in FIG. 4C and FIG. 4D, 27.72 ppm of reductant ($Na_2SO_3$) was sufficient to reduce 5.72 ppm of hypochlorite, wherein both free ClO⁻ and total ClO⁻ levels are close to, or below zero, as determined by DPD assay. Thus, when the amount of sodium sulfite ($Na_2SO_3$) was overdosed for 0.572 ppm to 0.143 ppm of hypochlorite (ClO⁻), no negative effect was observed (FIG. 4C and FIG. 4D).

In the instant example, a CAH (SEQ ID NO: 6) was incubated with 200 ppm cyanuric acid (CYA) in simulated swimming pool water, before and after hypochlorite (ClO⁻) reduction with sodium thiosulfate ($Na_2S_2O_3$; FIG. 5). For example, the free ClO⁻ concentration was measured with and without sodium thiosulfate ($Na_2S_2O_3$; FIG. 5A) and the total ClO⁻ concentration was measured with and without sodium thiosulfate ($Na_2S_2O_3$; FIG. 5B). The enzymatic activity of the CAH (SEQ ID NO: 6) was tested under the same concentrations of hypochlorite (ClO⁻) and sodium thiosulfate ($Na_2S_2O_3$).

Thus, as shown in FIG. 5C, 0.4 mg/L of the CAH (SEQ ID NO: 6) was mixed (in 1 mL of simulated pool water) to digest 200 ppm of cyanuric acid (CYA), in the presence of 10.33 ppm sodium thiosulfate ($Na_2S_2O_3$; FIG. 5C, right data panel) or absence (0 ppm) sodium thiosulfate (FIG. 5C, left data panel), at the indicated hypochlorite (ClO⁻) ranges (0 ppm, 0.143 ppm, 0.286 ppm, 0.572 ppm and 5.72 ppm) and incubated at room temperature for seven (7) hours.

As shown in FIG. 5C, the CAH (SEQ ID NO: 6) was inactivated at different concentrations of hypochlorite (5.72 ppm to 0.143 ppm). Some amount of hypochlorite (ClO⁻) resistance was observed at 0.143 ppm hypochlorite (FIG. 5C). More particularly, as shown in FIG. 5C, 17.38 ppm of reductant ($Na_2S_2O_3$) was sufficient to reduce 5.72 ppm of hypochlorite (ClO⁻), wherein both free ClO⁻ and total ClO⁻ levels are close to, or below zero. Thus, when the amount of sodium thiosulfate ($Na_2S_2O_3$) was overdosed for 0.572 ppm to 0.143 ppm of hypochlorite (ClO⁻), no negative effect was observed (FIG. 5C).

Example 6

Cyanuric Acid Hydrolases Maintain Activity after Hypochlorite Reduction in Simulated Swimming Pool Water In the instant example, all six (6) proteins comprising CAH activity (i.e., SEQ ID NO: 2, SEQ ID NO: 4, SEQ ID NO: 6, SEQ ID NO: 8, SEQ ID NO: 10 and SEQ ID NO: 12) were screened in simulated swimming pool conditions (FIG. 6 and FIG. 7). More particularly, to normalize the results to be on a common scale (i.e., compensating for the different specific activity of each CAH protein screened), 0.3-2.0 mg/L of each indicated CAH was mixed (in the simulated pool water) to digest 200 ppm of cyanuric acid (CYA) and incubated at room temperature for 6-8.5 hours, under one of the following conditions: positive control (FIG. 6 and FIG. 7, white bars), 5.72 ppm hypochlorite (ClO⁻) (FIG. 6 and FIG. 7, black bars) or 5.72 ppm hypochlorite (ClO⁻) and 17.38 ppm of reductant sodium thiosulfate ($Na_2S_2O_3$; FIG. 6, grey bars), or 27.72 ppm of reductant sodium sulfite ($Na_2SO_3$; FIG. 7, grey bars). The positive (+) control in the instant example (FIG. 6 and FIG. 7) includes the indicated CAH protein with no hypochlorite (ClO⁻) present.

As shown in FIG. 6 and FIG. 7, all six (6) of the CAH enzymes tested were inactivated at high hypochlorite (ClO⁻) concentrations (e.g., 5.72 ppm), wherein 17.38 ppm sodium thiosulfate ($Na_2S_2O_3$) or 27.72 ppm of sodium sulfite ($Na_2SO_3$) was sufficient to reduce (mitigate) 5.72 ppm of hypochlorite (ClO⁻), and brought both free ClO⁻ and total ClO⁻ levels close to zero. For example, the activity of CAH proteins (enzymes) were maintained at, or near, the positive (+) control levels, after reducing the hypochlorite (ClO⁻) with sodium thiosulfate ($Na_2S_2O_3$) or sodium sulfite ($Na_2SO_3$). The CAH proteins comprising amino acid SEQ ID NO: 2, SEQ ID NO: 4, SEQ ID NO: 6 SEQ ID NO: 8 and SEQ ID NO: 12, maintained the same level of activity as the positive (+) control under these conditions, while the CAH protein comprising amino acid SEQ ID NO: 10, maintained partial activity in the presence of sodium thiosulfate ($Na_2S_2O_3$), with a higher activity in the presence of sodium sulfite ($Na_2SO_3$).

Example 7

CYA Converted to Biuret and Allophanic Acid by a Cyanuric Acid Hydrolase and Biuret Hydrolase in Time Course The instant example describes the enzymatic conversion (i.e., hydrolysis) of cyanuric acid (CYA) to biuret using a CAH protein and enzymatic conversion of biuret to allophanic acid using a BH protein, in time course at room temperature. For example, a CAH (SEQ ID NO: 6) was used to digest CYA (200 ppm) in a sixty (60) minute reaction at room temperature and analyzed via HPLC (FIG. 8A). More particularly, 20 mg/L of the CAH (SEQ ID NO: 6) was incubated with 200 ppm of CYA (at room temperature) and for all samples described, 0.1 ml of 0.1 N sulfuric acid ($H_2SO_4$) was added to 1 ml of sample at 0 minutes, 5 minutes, 30 minutes and 60 minutes and frozen on dry ice to terminate the reaction. The samples were thawed and clarified at 14000 rpm before column analysis (Bio-Rad, Aminex HPX-87H), wherein the HPLC column was developed isocratically at 0.6 ml/min in 5 mM sulfuric acid, and the temperature of the column and RID maintained at 55° C. and 35° C., respectively. As set forth in FIG. 8A, the CYA peak area decreases in the sixty (60) minute reaction, with a simultaneous increase of the biuret peak, demonstrating CYA was digested by the CAH (SEQ ID NO: 6) and converted to biuret.

Similarly, a BH (SEQ ID NO: 14) was used to digest biuret (160 ppm) in a sixty (60) minute reaction (at room temperature) and analyzed via HPLC (FIG. 8B). Proper amount of the BH (SEQ ID NO: 14) was incubated with 160 ppm of biuret (at room temperature) and for all samples described, 0.1 ml of 0.1 N sulfuric acid was added to 1 ml of sample at 0 minutes, 5 minutes, 30 minutes and 60 minutes and frozen on dry ice to terminate the reaction. The samples were thawed and clarified at 14000 rpm before column analysis (Bio-Rad, Aminex HPX-87H), wherein the HPLC column was developed isocratically at 0.6 ml/min in 5 mM sulfuric acid, and the temperature of the column and RID maintained at 55° C. and 35° C., respectively. As shown in FIG. 8B, the biuret peak decreased in the sixty (60) minute reaction, indicating hydrolysis of biuret by the BH.

In addition, Applicant further screened CYA digestion in the presence of both a CAH (SEQ ID NO: 6) and a BH (SEQ ID NO: 14) and analyzed via HPLC (FIG. 8C). More particularly, 20 mg/L the CAH (SEQ ID NO: 6) and proper amount of the BH (SEQ ID NO: 14) were incubated with 200 ppm CYA (at room temperature) and for all samples described, 0.1 ml of 0.1 N sulfuric acid was added to 1 ml of sample at 0 minutes, 5 minutes, 30 minutes and 60 minutes and frozen on dry ice to terminate the reaction. The samples were thawed and clarified at 14000 rpm before column analysis (Bio-Rad, Aminex HPX-87H), wherein the HPLC column was developed isocratically at 0.6 ml/min in 5 mM sulfuric acid, and the temperature of the column and RID maintained at 55° C. and 35° C., respectively. As shown in FIG. 8C, in a sixty (60) minute reaction the CYA peak decreased and the biuret peak accumulated after 5 minutes of reaction, but maintained at about 30% of maximum or below, during the incubation, indicating that the CAH hydrolyzed the CYA to biuret, which was then hydrolyzed by the BH to allophonate.

Example 8

Cyanuric Acid Hydrolase Immobilization in Cross-Linked, Non-Dissolvable Granules In the instant example, an exemplary microbial host cell (*Bacillus subtilis*) was constructed and used for the heterologous expression of a *Pseudolabrys* sp. CAH (SEQ ID NO: 10), wherein the *B. subtilis* cells were fermented in fed batch culture. More particularly, the whole broth was lysed by addition of egg white lysozyme with stirring at 37° C. for one (1) hour. The resulting lysed broth was used as is for immobilization described herein. The generalized procedure (see, U.S. Pat. No. 7,297,510; incorporated herein by reference in its entirety) was to mix an aqueous slurry of bentonite, 4.573 ml of 3.3% (w/w) solution and diatomaceous earth, 272 mg. followed by addition with continued stirring of a 9% aqueous solution of polyethyleneimine (Epomin P-1050), 234 mg; followed by addition with stirring, of 282 mg of a 5% solution of glutaraldehyde. Five (5) ml of lysed whole broth was added with stirring. After mixing, an additional 691 mg of a 9% aqueous solution of polyethyleneimine was added with stirring, followed by an additional 847 mg of 5% glutaraldehyde. This crosslinked material, in the form of granules, was washed with water twice and dried at room temperature for 48 hours. The dried granules were re-hydrated, re-washed, and assayed for CAH activity. Analysis of the CAH activity showed that in this particular experiment, 9.1% of the whole broth CAH activity remained in the fresh washed, granules. After drying and re-hydration, the granules retained 6.4% of the total whole broth activity. In addition, this granulation procedure was conducted with crude and purified CAH from *Moorella thermoacetica* (SEQ ID NO: 2) with similar results.

Example 9

Immobilization of Cyanuric Acid Hydrolase on Dry Granules which Completely Dissolve in Water A dry granule formulation of a CAH was prepared by coating sodium sulfate granules, 200-350 µm diameter, with a concentrated solution of CAH (SEQ ID NO: 10) comprising: CAH, ~100 g/L; PVA, 15%; in a fluid bed dryer to less than 1.0% humidity. To these granules a second coating was added of sodium sulfate in the fluid bed dryer to less than 1.0% humidity. A third coat of Talc 5%, PVA 5% and Neodol 1.5% was again coated in the fluid bed dryer, and the final granule was dried. Granules were formulated with a second CAH (SEQ ID NO: 6) under the identical conditions, with CAH activities set forth below in Table 2.

TABLE 2

| RETAINED CAH ACTIVITY POST-GRANULATION | |
|---|---|
| | CAH Activity |
| Before Granulation | 100% |
| CAH Seq No: 6 | 61.7% ± 5.5% |
| CAH Seq No: 10 | 94.3% ± 4.2% |

Example 10

Rate of CYA Hydrolysis by CAH at Several CYA Concentrations

Although the examples described herein generally use 100 ppm to 200 ppm CYA, the use of enzymatic CYA hydrolysis to reduce (remediate) CYA is not limited or restricted to these values. The results of enzymatically hydrolyzing various concentrations of CYA, up to 6000 ppm, is shown in FIG. 9. CYA hydrolysis proceeds at a constant rate that is CAH dependent and is consistent with observations that the reaction is not product (biuret) inhibited. The loss of $CO_2$ during the forward CAH hydrolysis reaction (see, FIG. 1D) leaves the reaction effectively irreversible. CAH enzymes generally have a Km value of about 6 to 15 ppm, so again for the reactions being considered for CYA remediation, the reactions proceed linearly to low concentrations. For example, the reactions described herein all contained 7.5 mg/L of CAH (SED ID NO: 10) with (one) 1 mL of CYA at 6000 ppm, 3000 ppm, 1500 ppm, 750 ppm, and 200 ppm at room temperature. The reactions were terminated at the indicated times, by addition of 5.72 ppm $ClO^-$, and frozen on dry ice. All samples were thawed and diluted to about 200 ppm CYA for melamine assay to determine the remaining un-hydrolyzed CYA.

Example 11

A Novel Amino Acid Consensus Sequence to Identify Proteins Comprising Cyanuric Acid Hydrolase Activity CAH enzymes are members of a protein family that includes barbiturase, and other proteins that have been shown not to react with cyanuric acid or barbituric acid. For example, all members of the protein family, in a BLAST algorithm pairwise sequence alignment with any other member of the family, show amino acid sequence identity of at least 30%, and an e-value of $e^{-10}$ (or lower). In light of this, the use of a BLAST search algorithm, or other standard protein sequence analysis methods, do not firmly identify a protein as a cyanuric acid hydrolase (i.e., a protein comprising CAH activity).

In the instant example, Applicant has analyzed the primary (1°) amino acid sequence of known proteins comprising CAH activity and identified a novel amino acid sequence motif (e.g., SEQ ID NO: 15) conserved among all proteins known to comprise CAH activity. As shown in FIG. 10, the identified consensus sequence of SEQ ID NO: 15 is a collection of sixteen (16) consecutive amino acid residues in the primary (1°) sequence, wherein the amino acid "Xaa" in the first (1) position of SEQ ID NO: 15 is a "Tyr" or "Phe", the amino acid "Xaa" in the second (2) position of SEQ ID NO: 15 may be any amino acid, the amino acid "Xaa" in the sixth (6) position of SEQ ID NO: 15 may be any amino acid, the amino acid "Xaa" in the eight (8) position of SEQ ID NO: 15 is a "His" or "Asn", the amino acid "Xaa" in the twelfth (12) position of SEQ ID NO: 15 may be any amino acid, and the amino acid "Xaa" in the six-tenth (16) position of SEQ ID NO: 15 is a "Pro" or "Ser". More particularly, the serine (S) residue (FIG. 10, position 3 of the SEQ ID NO: 15) of the consensus sequence is one of the conserved serine residues in the active site of proteins comprising CAH activity, and other amino acid residues of the SEQ ID NO: 15 consensus sequence are in the region of the bound metal residue, which has been identified in the X-ray structures of all cyanuric acid hydrolase to date (Bera et al., 2017; Shi et al., 2019).

Applicant further tested and validated the consensus sequence of SEQ ID NO: 15 by sequence comparison/analysis to proteins known to have CAH activity (FIG. 11) versus proteins known not to have CAH activity (FIG. 12). For example, the names associated with a specified protein in FIG. 11 and FIG. 12 come from genome annotations, which annotations are often incorrect, reflecting the difficulty for one skilled in the art in discerning cyanuric acid hydrolases versus barbiturase and/or general ring opening amidohydrolases. More particularly, the proteins comprising the specific amino acid sequences presented in FIG. 11 have an exact match to the consensus sequence (SEQ ID NO: 15) at their C-terminus, and such proteins have been experimentally verified by Applicant, or in the scientific literature, to comprise CAH activity. In contrast, the proteins comprising the specific amino acid sequences presented in FIG. 12 have been experimentally verified by Applicant, or in the scientific literature, as not having (not comprising) CAH activity, wherein these proteins not having CAH activity do not have an exact match to the consensus sequence (SEQ ID NO: 15) at their C-terminus. The novel consensus sequence of SEQ ID NO: 15 is therefore particularly useful in identifying proteins (enzymes) comprising CAH activity, which proteins comprising CAH activity are particularly suitable for use in the CYA remediation methods and compositions of the instant disclosure.

REFERENCES

European Patent No. EP656058
European Patent No. EP804532
PCT International Publication No WO2016/141026
PCT International Publication No. WO1999/32595
PCT International Publication No. WO2007/107981
PCT International Publication No. WO2017/021966
U.S. Pat. No. 4,689,297
U.S. Pat. No. 5,324,649
U.S. Pat. No. 5,324,649
U.S. Pat. No. 6,248,706
U.S. Pat. No. 6,534,466
U.S. Patent Publication No. US2010/0124586
U.S. Patent Publication No. US2013/0186837
U.S. Patent Publication No. US2018/0257963
Bera et al., "Structure of the Cyanuric Acid Hydrolase TrzD Reveals Product Exit Channel", *Scientific Reports*, Volume 7, No. 45277, pgs. 1-9, 2017.
Brady et al., "Equilibria in Solutions of Cyanuric Acid and its Chlorinated Species", *J. Am. Chem. Soc.*, 85(20): 3101-3104, 1963.
Gardner, "Chloroisocyanurates in the Treatment of Swimming Pool Water", *Water Research*, 7; 823-833, 1973.
Knox et al., "The Inhibition of Sulfhydryl Enzymes as the Basis of Bactericidal Action of Chlorine", *J. Bacteriology*, 55(4): 451-459, 1948.
Seffernik et al., "Defining Sequence Space and Reaction Products within the Cyanuric Acid Hydrolase (AtzD)/Barbiturase Protein Family", *J. Bacteriology*, 194(17): 4579-4588, 2012.
Shi et al., "Crystal structures of *Moorella thermoacetica* cyanuric acid hydrolase reveal conformational flexibility and asymmetry important for catalysis", *PLoS ONE* 14(6), 2019.
Sugawara et al., "Complete genome sequence of *Bradyrhizobium diazoefficiens* USDA 122, a nitrogen-fixing soybean symbiont", *Genome Announcements*, 5(9): 1-2, 2017.
US Centers for Disease Control and Prevention, Jun. 22, 2018 "HEALTHY SWIMMING, Hyperchlorination to Kill *Cryptosporidium* When Chlorine Stabilizer is in Water".

The invention claimed is:

1. A method for remediating cyanuric acid (CYA) in an aqueous liquid comprising at least 1.0 ppm free hypochlorite, the method comprising contacting the liquid with a reductant and an enzyme comprising cyanuric acid hydrolase (CAH) activity, wherein the liquid is first contacted with a reductant followed by an enzyme having CAH activity, or the liquid is simultaneously contacted with a reductant and an enzyme having CAH activity, wherein contacting the liquid with the reductant lowers the free hypochlorite concentration to 0.5 ppm or less.

2. The method of claim 1, wherein the liquid is first contacted with a reductant for a sufficient period of time to lower the free hypochlorite concentration in the liquid, followed by contacting the liquid with an enzyme comprising CAH activity.

3. The method of claim 1, wherein the enzyme comprising CAH activity is a solid enzyme or a liquid enzyme.

4. The method of claim 1, further comprising the addition of an enzyme having BH activity, wherein the enzyme comprising BH activity is a solid enzyme or a liquid enzyme.

5. The method of claim 4, wherein the enzyme comprising BH activity is a formulated granule.

6. The method of claim 1, wherein the enzyme comprising CAH activity is obtained or derived from a cell selected from the group consisting of *M. thermoacetica* cell, a *Bradyrhizobium diazoefficiens* cell, a *Bradyrhizobium* sp. cell, a *Pseudolabrys* sp. cell and an *Acidovorax citrulli* cell.

7. The method of claim 1, wherein the enzyme comprising CAH activity comprises an amino acid sequence of SEQ ID NO: 15 near the C-terminus.

8. The method of claim 1, wherein the reductant is selected from sulfate, sulfite, thiosulfate, sodium bisulfite, sodium metabisulfite, hydrogen peroxide, potassium iodide, iodate, ferrous iron (salts), copper, nickel, molybdenum, manganese (reduced salts), ascorbate, aldehydes, organosulfur compounds, poly-vinyl-pyrrolidone (PVP), vulcanized rubber, and electrochemical reduction.

9. The method of claim 1, wherein the enzyme comprising CAH activity is a formulated granule.

10. The method of claim 1, wherein contacting the liquid with the reductant lowers the free hypochlorite concentration to an undetectable level.

\* \* \* \* \*